(12) United States Patent
Yamasaki et al.

(10) Patent No.: US 8,432,782 B2
(45) Date of Patent: Apr. 30, 2013

(54) OBJECTIVE LENS, OPTICAL HEAD, OPTICAL DISK APPARATUS, AND INFORMATION PROCESSING APPARATUS

(75) Inventors: Fumitomo Yamasaki, Nara (JP); Kazuhiro Minami, Osaka (JP); Yoshiaki Komma, Osaka (JP); Junichi Asada, Hyogo (JP); Osamu Kajino, Osaka (JP); Noriaki Terahara, Osaka (JP); Toshiyasu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/498,270

(22) PCT Filed: Jul. 22, 2011

(86) PCT No.: PCT/JP2011/004148
§ 371 (c)(1), (2), (4) Date: Mar. 26, 2012

(87) PCT Pub. No.: WO2012/014423
PCT Pub. Date: Feb. 2, 2012

(65) Prior Publication Data
US 2012/0182852 A1 Jul. 19, 2012

(30) Foreign Application Priority Data

Jul. 26, 2010 (JP) ................................. 2010-166753
Oct. 29, 2010 (JP) ................................. 2010-243188

(51) Int. Cl.
*G11B 7/135* (2012.01)
*G02B 13/00* (2006.01)

(52) U.S. Cl.
USPC .................................................. 369/112.08

(58) Field of Classification Search .................. None
See application file for complete search history.

(56) References Cited

U.S. PATENT DOCUMENTS

| 6,118,594 | A  | * | 9/2000  | Maruyama ..................... 359/719 |
| 6,337,841 | B1 | * | 1/2002  | Kim et al. ................ 369/112.06 |
| 6,449,237 | B1 | * | 9/2002  | Yoo et al. ................ 369/112.05 |
| 2001/0000310 | A1 | * | 4/2001  | Yoo et al. ................ 369/112.26 |
| 2002/0172132 | A1 | * | 11/2002 | Takeuchi et al. ......... 369/112.08 |
| 2003/0123369 | A1 | * | 7/2003  | Fujita et al. .............. 369/112.08 |
| 2003/0234987 | A1 | * | 12/2003 | Honda .......................... 359/719 |
| 2004/0047269 | A1 | * | 3/2004  | Ikenaka et al. ........... 369/112.08 |
| 2004/0062180 | A1 | * | 4/2004  | Mimori et al. ........... 369/112.08 |
| 2004/0170106 | A1 | * | 9/2004  | Komma ..................... 369/112.1 |
| 2005/0281173 | A1 | * | 12/2005 | Koreeda et al. .......... 369/112.23 |
| 2011/0097981 | A1 | * | 4/2011  | Sato ............................. 454/49 |
| 2012/0182852 | A1 | * | 7/2012  | Yamasaki et al. ........ 369/112.05 |

* cited by examiner

*Primary Examiner* — Peter Vincent Agustin
(74) *Attorney, Agent, or Firm* — Wenderoth, Lind & Ponack, L.L.P.

(57) ABSTRACT

An objective lens, an optical head, an optical disk apparatus and an information processing apparatus which can suppress deterioration of a focal spot caused by a drop in the diffraction efficiency. Inner and outer circumference areas converge a laser beam, out of laser beams having a wavelength λ1 which are diffracted by the inner and outer circumference areas, on a first information recording medium; the inner circumference area and a mid-circumference area converge a laser beam, out of the laser beams having a wavelength λ2 which are diffracted by the inner circumference area and the mid-circumference area, on a second information recording medium; and the diffraction efficiency of the laser beam having the wavelength λ2 is greater than the diffraction efficiency of the laser beam having the wavelength λ1.

40 Claims, 20 Drawing Sheets

OBJECTIVE LENS, OPTICAL HEAD, OPTICAL DISK APPARATUS, AND INFORMATION PROCESSING APPARATUS

TECHNICAL FIELD

The present invention relates to an objective lens for converging laser beams emitted from the laser power supply onto information recording surfaces of a plurality of types of information recording media such as optical disks, to an optical head which is provided with the objective lens and optically records or reproduces information on or from information recording media, to an optical disk apparatus provided with the optical head, and to an information processing apparatus provided with the optical disk apparatus.

An objective lens, an optical head, an optical disk apparatus and an information processing apparatus which can suppress deterioration of a focal spot caused by a drop in the diffraction efficiency are provided. An inner circumference area (111) and an outer circumference area (113) converge a laser beam having an order of diffraction with which diffraction efficiency is highest, out of laser beams having a wavelength $\lambda 1$ which are diffracted by the inner circumference area (111) and the outer circumference area (113), on an information recording surface of a first information recording medium; the inner circumference area (111) and a mid-circumference area (112) converge a laser beam having an order of diffraction with which diffraction efficiency is highest, out of the laser beams having a wavelength $\lambda 2$ which are diffracted by the inner circumference area (111) and the mid-circumference area (112), on an information recording surface of a second information recording medium; and the diffraction efficiency of the laser beam having the wavelength $\lambda 2$, which is diffracted by the mid-circumference area (112) and converges on the information recording surface of the second information recording medium, is greater than the diffraction efficiency of the laser beam having the wavelength $\lambda 1$ which is diffracted by the mid-circumference area (112), and converges on the information recording surface of the first information recording medium.

BACKGROUND ART

As a blue-violet semiconductor laser has been put into practical use, a Blu-ray disc (hereafter BD), as a high-density and large-capacity optical information recording medium (hereinafter, also called as an optical disk) and having substantially the same size as a CD (Compact Disc) and a DVD (Digital Versatile Disc), has been put into practical use. BD is an optical disk for recording or reproducing information on or from an information recording surface of which thickness of the light transmission layer is substantially 0.1 mm, using a blue-violet laser source which emits a laser beam having substantially a 400 nm wavelength, and an objective lens of which numerical aperture (NA) is substantially 0.85. In this description, the light transmission layer refers to a layer between the surface of the information recording medium and the information recording surface.

Many types of compatible objective lens are known, which is a single objective lens for recording or reproducing information on or from a plurality of types of optical disks having a different thickness of the light transmission layer. For example, Patent Literature 1 discloses an objective lens having a first area, a second area and a third area, which are substantially concentric with respect to the optical axis, at least on one surface of the objective lens.

This objective lens records or reproduces information on or from a first optical disk having a transparent substrate (light transmission layer) of which thickness is t1 (t1=0.6 mm), using a laser beam having the wavelength $\lambda 1$ ($\lambda 1$=635 nm), which passes through the first area and the third area, and records or reproduces information on or from a second optical disk having a transparent substrate of which thickness is t2 (t2=1.2 mm), using a laser beam having the wavelength $\lambda 2$ ($\lambda 2$=780 nm), which passes through the first area and the second area.

If this compatible objective lens is used, information can be recorded on or reproduced from a plurality of types of optical disks, such as a CD and a DVD, having a different thickness of the light transmission layer and a different NA, using one objective lens.

Many types of compatible objective lenses are also known, where a diffraction structure is formed on the objective lens whereby spherical aberration, generated by the difference of thickness of the light transmission layer among a plurality of types of optical disks, is corrected using the difference of the light source wavelength.

For example, Patent Literature 2 discloses an objective lens, which generates a function of a convex lens by diffracting the blue-violet laser beam having the wavelength $\lambda 1$, so as to converge the focal spot on the information recording surface of the BD of which thickness of the light transmission layer is substantially 0.1 mm, and which generates a function of a concave lens by diffracting the red laser beam having the wavelength $\lambda 2$, and converges the red laser beam on the information recording surface of the DVD of which thickness of the light transmission layer is substantially 0.6 mm.

FIG. 21 is a diagram depicting a configuration of a conventional objective lens. The left drawing in FIG. 21 is a schematic plan view depicting a configuration of a conventional objective lens 90, and the right drawing in FIG. 21 is a schematic cross-sectional view depicting the configuration of the conventional objective lens 90. A zonal diffraction structure (hologram) is formed on the entrance surface 91 on the light source side (side where laser beam enters) of the objective lens 90, centering around the optical axis OA of the objective lens 90. The diffraction structure is different between the inner circumference area 911 including the optical axis OA and the outer circumference area 912 which is a peripheral area of the inner circumference area 911.

The inner circumference area 911 is a compatible area which is used for recording or reproducing the DVD using a red laser beam, and recording or reproducing the BD using a blue-violet laser beam. The inner circumference area 911 is designed so that the plus first-order diffracted light of the blue-violet laser beam is converged on the information recording surface of the BD, and the minus first-order diffracted light of the red laser beam is converted on the information recording surface of the DVD.

On the other hand, the NA upon recording or reproducing information on or from the BD using the blue-violet laser beam (substantially 0.85) is greater than the NA upon recording or reproducing information on or from the DVD using a red laser beam (substantially 0.60). Therefore it is designed such that the outer circumference area 912 is an area dedicated to the BD, and only the blue-violet laser beam is converged on the information recording surface of the BD, and the red laser beam generates an aberration on the information recording surface of the DVD.

One unit of the step difference of the diffraction structure of the inner circumference area 911 is an amount to generate substantially a 1.25×$\lambda 1$ [nm] of optical path difference for the blue-violet laser beam having the wavelength $\lambda 1$ ($\lambda 1$=405 nm), and the phase modulation amount is π/2 per step. In this case, the diffraction efficiency of the plus first order diffracted light is substantially 80% based on the scalar calculation, which is highest among the orders of diffraction.

One unit of the step difference of the diffraction structure in the inner circumference area 911 is an amount to generate substantially a 0.75×λ2 [nm] of optical path difference for the red laser beam having the wavelength λ2 (λ2=660 nm), and the phase modulation quantity −π/2 per step. In this case, the diffraction efficiency of the minus first-order diffracted light is substantially 80% based on the scalar calculation, which is highest among the orders of diffraction.

If the inner area 911 has this diffraction structure, a compatible recording or compatible reproduction of information can be implemented at high light utilization efficiency for the DVD having a 0.6 mm thick light transmission layer, and for the BD having substantially a 0.1 mm thick light transmission layer.

If a lens having a diffraction structure, which is not limited to a compatible objective lens, is used, the diffraction efficiency may change depending on the radius position of the lens. This is because the pitch of the diffraction structure in the effective diameter of the lens is different depending on the radius position. Generally if the lens power is generated by the diffraction structure, the pitch of the diffraction structure decreases and diffraction efficiency decreases as the radius position approaches from the inner circumference near the optical axis to the outer circumference.

The intensity distribution of the semiconductor laser used for the optical head for the optical disk, on the other hand, decreases Gaussian-functionally as the distance from the optical axis increases, hence the intensity of the laser beam is lower in the outer circumference than in the inner circumference. If the intensity of the laser beam, which enters the objective lens, decreases dramatically in the outer circumference, the effective NA of the objective lens decreases. As a result, the focal spot on the information recording surface of the optical disk cannot be sufficiently focused.

For example, Patent Literature 1 discloses a configuration of a refraction type compatible objective lens that has no diffraction structure, where a second area is a dedicated area for the red laser beam having the wavelength λ2, and a third area is a dedicated area for the infrared laser beam having the wavelength λ1.

However the conventional objective lens is a refraction type compatible objective lens that has no diffraction structure, hence if it is designed to converge the laser beam having the wavelength λ2 on the information recording surface of the CD in the second area, the laser beam having the wavelength λ1 is not converged at all on the information recording surface of the DVD. In other words, absolutely no laser beam having the wavelength λ1 is converged on the information recording surface of the DVD in the second area.

If diffraction efficiency of the laser beam which enters the objective lens becomes completely zero in a part of the area like this, deterioration of the focal spot on the information recording surface becomes enormous.

Furthermore according to the conventional objective lens disclosed in Patent Literature 2, for example, the inner circumference area is used for recording or reproduction for both the DVD and the BD. Therefore the pitch of the diffraction structure becomes small in the area near the outermost circumference of the inner circumference area, and diffraction efficiency drops.

FIG. 22 is a graph depicting a diffraction efficiency of the conventional objective lens. In FIG. 22, in the conventional objective lens 90 disclosed in Patent Literature 2, the diffraction efficiency of the blue-violet laser beam having the wavelength λ1 and that of the red laser beam having the wavelength λ2 are calculated based on the wave calculation (vector calculation). In FIG. 22, the abscissa is the entrance position of the laser beam, that is the distance from the optical axis OA (radius of objective lens), and the ordinate is the diffraction efficiency corresponding to the entrance position.

As FIG. 22 shows, in the case of the wavelength λ2, the diffraction efficiency is 70% or more in a position near the optical axis in the inner circumference area (point α), whereas the diffraction efficiency drops to 50% or less in a position near the outermost circumference of the inner circumference area (point β). This is because the pitch of the diffraction structure is smaller in the position of the point β than the position of the point α, and in addition, the inclination angle of the entrance surface 91 increases and the incidence angle of the laser beam which enters the objective lens 90 substantially parallel increases as the distance from the optical axis OA increases. The diffraction efficiency in the position of the point β can further drop by the dispersion in molding, for example.

If the intensity of the laser beam which enters the objective lens drops dramatically in the outer circumference, as mentioned above, the focal spot on the information recording surface of the optical disk cannot be sufficiently focused, but this problem of the conventional compatible objective lens is not mentioned in Patent Literature 2.

CITATION LIST

Patent Literature
Patent Literature 1: Japanese Patent Application Laid-Open No. H11-86319
Patent Literature 2: Japanese Patent Application Laid-Open No. 2005-129227

SUMMARY OF INVENTION

With the foregoing in view, it is an object of the present invention to provide an objective lens, an optical head, an optical disk apparatus and an information processing apparatus which can suppress deterioration of a focal spot caused by a drop in diffraction efficiency.

An objective lens according to an aspect of the present invention is an objective lens for converging a laser beam emitted from a laser light source on an information recording surface of an information recording medium, including: a first area which has a diffraction structure which is formed on a surface on the laser light source side; a second area which has a diffraction structure which is formed outside the first area; and a third area which has a diffraction structure which is formed outside the second area; wherein the first area and the third area converge a laser beam having an order of diffraction with which diffraction efficiency is highest, out of laser beams having a wavelength λ1 (390 nm≦λ1≦430 nm) which are diffracted by the first area and the third area, on an information recording surface of a first information recording medium having a light transmission layer with a thickness t1, and the first area and the second area converge a laser beam having an order of diffraction with which diffraction efficiency is highest, out of laser beams having a wavelength λ2 (630 nm≦λ2≦680 nm) which are diffracted by the first area and the second area, on an information recording surface of a second information recording medium having a light transmission layer with a thickness t2, which is greater than the thickness t1, and the diffraction efficiency of the laser beam having the wavelength λ2, which is diffracted by the second area and converges on the information recording surface of the second information recording medium, is greater than the diffraction efficiency of the laser beam having the wavelength λ1, which is diffracted by the second area, and converges on the information recording surface of the first information recording medium.

According to this configuration, the objective lens has a first area which has a diffraction structure which is formed on the surface on the laser light source side, a second area which has a diffraction structure which is formed outside the first area, and a third area which has a diffraction structure which is formed outside the second area. The first area and the third area converge a laser beam having an order of diffraction with which diffraction efficiency is highest, out of the laser beams having a wavelength λ1 (390 nm≦λ1≦430 nm) which are diffracted by the first area and the third area on an information recording surface of a first information recording medium having a light transmission layer with a thickness t1. The first area and the second area converge a laser beam having an order of diffraction with which diffraction efficiency is highest, out of laser beams having a wavelength λ2 (630 nm≦λ2≦680 nm) which are diffracted by the first area and the second area, on an information recording surface of a second information recording medium having a light transmission layer with the thickness t2, which is greater than the thickness t1. The diffraction efficiency of the laser beam having the wavelength λ2, which is diffracted by the second area and converges on the information recording surface of the second information recording medium, is greater than the diffraction efficiency of the laser beam having the wavelength λ1 which is diffracted by the second area and converges on the information recording surface of the first information recording medium.

According to the present invention, the diffraction efficiency of the laser beam having the wavelength λ2, which is diffracted by the second area and converges on the information recording surface of the second information recording medium, is greater than the diffraction efficiency of the laser beam having the wavelength λ1 which is diffracted by the second area and converges on the information recording surface of the first information recording medium, hence when information is recorded or reproduced on or from the second information recording medium, the intensity of the laser beam, which decreases as the distance from the optical axis increases, can be corrected by increasing the diffraction efficiency of the laser beam having the wavelength λ2 which enters the objective lens in an area near the edge of the objective lens, whereby the deterioration of the focal spot caused by a drop in the diffraction efficiency can be suppressed.

The objects, characteristics and advantages of the present invention will be further clarified by the following detailed description and the accompanying drawings.

DESCRIPTION OF EMBODIMENTS

Figure 1:
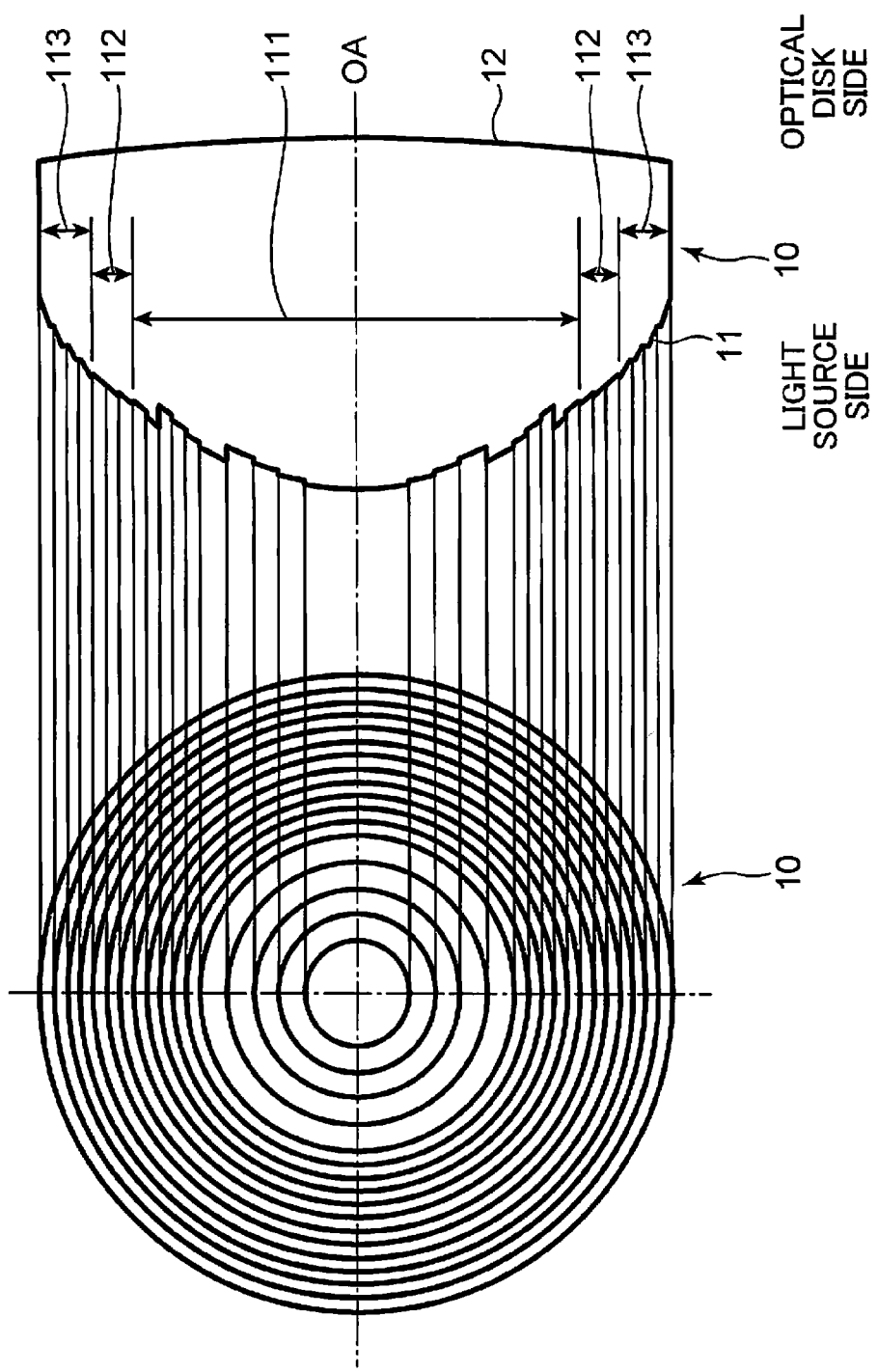
FIG. 1 is a diagram depicting a configuration of an objective lens according to Embodiment 1 of the present invention.

Embodiments of the present invention will now be described with reference to the drawings. The following embodiments are examples to carry out the invention, and are not for limiting the technical scope of the present invention.
(Embodiment 1)
FIG. 1 is a diagram depicting a configuration of an objective lens according to Embodiment 1 of the present invention. The left drawing in FIG. 1 is a schematic plan view depicting a configuration of an objective lens 10 of Embodiment 1, and the right drawing in FIG. 1 is a schematic cross-sectional view depicting the configuration of the objective lens 10 of Embodiment 1.

The objective lens 10 of Embodiment 1 is used as a compatible objective lens which can support both the BD for recording or reproducing information using a blue-violet laser beam having a wavelength λ1, and the DVD for recording or reproducing information using a red laser beam having the wavelength λ1 which is longer than the wavelength λ1.

The objective lens 10 has a spherical surface or an aspherical surface to be a base on an entrance surface 11 on the light source side (side where the laser beam enters). On the spherical surface or the aspherical surface to be a base (hereafter generically called "base aspherical surface"), a zonal diffraction structure is formed with the optical axis OA of the objective lens 10 as the center. An emission surface 12 on the optical disk side (side where the laser beam is emitted), which faces the entrance surface 11, is a spherical surface or an aspherical surface.

The objective lens 10 converges a laser beam emitted from the laser light source on an information recording surface of an information recording medium (optical disk). The objective lens 10 has an inner circumference area (first area) 111 which has a diffraction structure which is formed on the entrance surface 11 on the laser light source side, a mid-circumference area (second area) 112 which has a diffraction structure which is formed outside the inner circumference area 111, and an outer circumference area (third area) 113 which has a diffraction structure which is formed outside the mid-circumference area 112.

The inner circumference area 111 which includes the optical axis OA, the mid-circumference area 112 located on the periphery of the inner circumference area 111, and the outer circumference area 113 located on the periphery of the mid-circumference area 112 have a different diffraction structure from one another.

The inner circumference area 111 and the outer circumference area 113 converge a laser beam having an order of diffraction with which diffraction efficiency is highest, out of the laser beams having the wavelength λ1 (390 nm≦λ1≦430 nm) which are diffracted by the inner circumference area 111 and the outer circumference area 113, on an information recording surface of the BD (first information recording medium) having a light transmission layer with a thickness t1. The mid-circumference area 112 does not converge a laser beam having an order of diffraction with which diffraction efficiency is highest, out of the laser beams having the wavelength λ1 which are diffracted by the mid-circumference area 112, on the information recording surface of the BD (first information recording medium), and converges a laser beam having an order of diffraction, which is different from the order of diffraction with which diffraction efficiency is highest, out of the laser beams having the wavelength λ1 which are diffracted by the mid-circumference area 112, on the information recording surface of the BD (first information recording medium).

The inner circumference area 111 and the mid-circumference area 112 converge a laser beam having an order of diffraction with which diffraction efficiency is highest, out of the laser beams having a wavelength λ2 (630≦λ2≦680 nm) which are diffracted by the inner circumference area 111 and the mid-circumference area 112, on an information recording surface of the DVD (second information recording medium) having a light transmission layer with a thickness t2, which is greater than the thickness t1.

The diffraction efficiency of the laser beam having the wavelength λ2, which is diffracted by the mid-circumference area 112 and converges on the information recording surface of the DVD, is higher than the diffraction efficiency of the laser beam having the wavelength λ1, which is diffracted by the mid-circumference area 112, and converges on the information recording surface of the BD.

The inner circumference area 111 has a diffraction structure which has a step profile of which one cycle is three steps—four levels, and is a compatible area which can be used for both recording or reproducing the DVD using the red laser beam having the wavelength λ2, and recording or reproducing the BD using the blue-violet laser beam having the wavelength λ1. The inner circumference area 111 is designed to converge a plus first order diffracted light of the blue-violet laser beam on the information recording surface of the BD via the light transmission layer with substantially a 0.1 mm thickness, and converge a minus first order diffracted light of the red laser beam on the information recording surface of the DVD via the light transmission layer with substantially a 0.6 mm thickness. The inner circumference area 111 is an area corresponding to an NA smaller than the NA of the DVD (substantially 0.60 to 0.65), such as 0.57.

The mid-circumference area 112 is a priority area used for recording or reproducing the DVD with priority, and has a diffraction structure in a step profile of which cycle is three steps—four levels, for example, but is different from that of the inner circumference area 111. The mid-circumference area 112 is designed so that mainly the red laser having the wavelength λ2 is converged on the information recording surface of the DVD. The mid-circumference area 112 converges the plus second order diffracted light of the blue-violet laser beam on the information recording surface of the BD via the light transmission layer with substantially a 0.1 mm thickness, and converges the minus first order diffracted light of the red laser beam on the information recording surface of the DVD via the light transmission layer with substantially a 0.6 mm thickness. This mid-circumference area 112 is an area corresponding to the NA of the DVD (substantially 0.60 to 0.65).

The NA used when information is recorded on or reproduced from the BD using the blue-violet laser beam (substantially 0.85) is greater than the NA used when information is recorded on or reproduced from the DVD using the red laser beam (substantially 0.60 to 0.65). Therefore the outer circumference area 113 is designed to be a dedicated area for the BD and to converge only the blue-violet laser beam having the wavelength λ1 on the information recording surface of the BD. The outer circumference area 113 is designed so that an aberration is generated in the red laser beam having the wavelength λ2, that is, the focal point of the focal spot of the red laser beam shifts considerably, on the information recording surface of the DVD. The outer circumference area 113 does not converge the laser beam having the wavelength λ2, which passes through the outer circumference area 113, on the information recording surface of the DVD. Therefore the outer circumference area 113 substantially functions as an aperture stop upon recording or reproducing the DVD.

One unit of the step difference of the diffraction structure of the inner circumference area 111 is an amount to generate substantially a 1.25×λ1 [nm] of optical path difference for the blue-violet laser beam having the wavelength λ1 (e.g. λ1=405 nm), and the phase modulation amount is π/2 per step. In this case, the diffraction efficiency of the plus first order diffracted light is substantially 80% based on the scalar calculation, which is highest among the orders of diffraction.

On the other hand, one unit of the step difference of the diffraction structure of the inner circumference area 111 is an amount to generate substantially a 0.75×λ2 [nm] of optical path difference for the red laser beam having the wavelength $\lambda 2$ (e.g. $\lambda 2=660$ nm), and the phase modulation amount is $-\pi/2$ per step. In this case, the diffraction efficiency of the minus first order diffracted light is substantially 80% based on the scalar calculation, which is highest among the orders of diffraction.

In other words, the diffraction structure of the inner circumference area 111 has a first step profile in cross section, of which one cycle is three steps—four levels. One step of step difference in the first step profile in cross section generates substantially a 1.25 wavelength optical path difference and power of a convex lens for the laser beam having the wavelength $\lambda 1$, and generates substantially a 0.75 wavelength optical path difference and power of a concave lens for the laser beam having the wavelength $\lambda 2$. The 1.25 wavelength and the 0.75 wavelength includes a ±10% error, for example, respectively.

If the inner circumference area 111 has this diffraction structure, serrated profiles in substantially opposite directions can be generated between the wavelength $\lambda 1$ and the wavelength $\lambda 2$, therefore compatible recording or compatible reproduction of information can be implemented, with high light utilization efficiency, for both the DVD having the light transmission layer with substantially a 0.6 mm thickness, and the BD having the light transmission layer with substantially a 0.1 mm thickness.

One unit of the step difference of the diffraction structure of the mid-circumference area 112 is an amount to generate substantially a $-0.25\times\lambda 2$ [nm] of optical path difference for the red laser beam having the wavelength $\lambda 2$ (e.g. $\lambda 2=660$ nm), and the phase modulation amount is $-\pi/2$ per step. In this case, the diffraction efficiency of the minus first order diffracted light is substantially 80% based on the scalar calculation, which is highest among the orders of diffraction.

On the other hand, one unit of the step difference of the diffraction structure of the mid-circumference area 112 is an amount to generates substantially a $-0.4\times\lambda 1$ [nm] of optical path difference for the blue-violet laser beam having the wavelength $\lambda 1$ (e.g. $\lambda 1=405$ nm), and the phase modulation amount is $-0.8\pi$ per step. In this case, the diffraction efficiency of the plus second order diffracted light is substantially 30% based on the scalar calculation.

In other words, the diffraction structure of the mid-circumference area 112 has a second step profile in cross section, of which one cycle is three steps—four levels. One step of step difference in the second step profile in cross section generates substantially a −0.25 wavelength optical path difference and power of a concave lens for the laser beam having the wavelength $\lambda 2$, and generates substantially a −0.4 wavelength optical path difference and power of a convex lens for the laser beam having the wavelength $\lambda 1$. The −0.25 wavelength and the −0.4 wavelength include a ±10% error, for example, respectively.

If the mid-circumference area 112 has this diffraction structure, serrated profiles which are different can be generated between the wavelength $\lambda 1$ and the wavelength $\lambda 2$, therefore the light utilization efficiency of the BD having the light transmission layer with substantially a 0.1 mm thickness can be secured even for the mid-circumference area 112, which is a priority area for the DVD having the light transmission layer with substantially a 0.6 mm thickness.

Therefore the mid-circumference area 112, which is a priority area for the DVD, converges a part of the blue-violet laser beam having the wavelength $\lambda 1$ on the information recording surface of the BD as well, hence compared with a conventional compatible objective lens disclosed in Patent Literature 1, deterioration of the focal spot on the information recording surface of the BD can be suppressed dramatically.

The outer circumference area 113 is a dedicated area for the BD, and has a diffraction structure in a serrated profile, optimized with the wavelength $\lambda 1$. The diffraction structure of the outer circumference area 113 has a serrated profile in cross section, and generates a less than 0.5 wavelength optical path difference and power of a convex lens for the laser beam having the wavelength $\lambda 1$.

Figure 2:
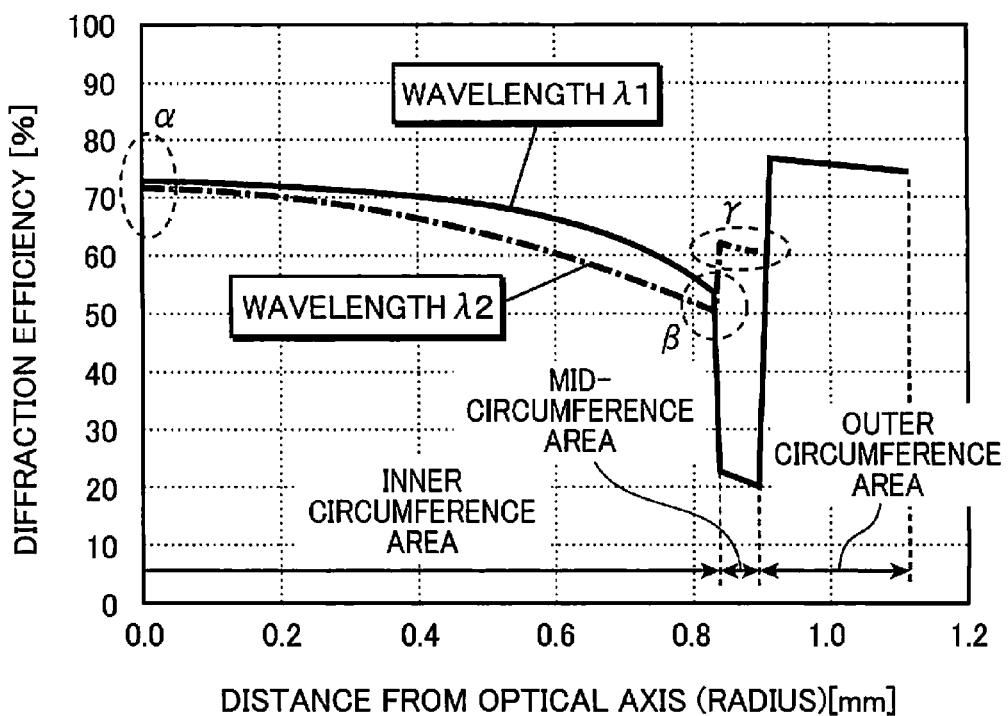
FIG. 2 is a graph depicting the diffraction efficiency of the objective lens according to Embodiment 1 of the present invention.

FIG. 2 is a graph depicting the diffraction efficiency of the objective lens according to Embodiment 1 of the present invention. In FIG. 2, in the objective lens 10 according to Embodiment 1, the diffraction efficiency of the blue-violet laser beam having the wavelength $\lambda 1$ (=405 nm) and that of the red laser beam having the wavelength $\lambda 2$ (=660 nm) are calculated based on the wave calculation (vector calculation). In FIG. 2, the abscissa is the entrance position of the laser beam, that is the distance from the optical axis OA (radius of objective lens), and the ordinate is the diffraction efficiency corresponding to the entrance position.

As FIG. 2 shows, in the case of the wavelength $\lambda 2$, the diffraction efficiency is 70% or more in a position near the optical axis in the inner circumference area 111 (point α), whereas the diffraction efficiency drops to substantially 50% in a position near the outermost circumference of the inner circumference area 111 (point β). This is because the pitch of the diffraction structure is smaller in the position of the point β than the position of the point α, and in addition, the inclination angle of the base aspherical surface of the entrance surface 11 increases, and the incident angle of the laser beam, which enters the objective lens 10 substantially in parallel increases as the distance from the optical axis OA increases.

The diffraction efficiency is 60% or more in almost all the areas (area γ) of the mid-circumference area 112. This is because the mid-circumference area 112 is a priority area for the DVD, and the diffraction structure in the step profile, of which one cycle is three steps—four levels, optimized with the wavelength $\lambda 2$, is formed.

In the case of the wavelength $\lambda 1$, the diffraction efficiency is 70% or more in a position near the optical axis in the inner circumference area 111 (point α), whereas the diffraction efficiency is substantially 50% in a position near the outermost circumference of the inner circumference area 111 (point β). In the case of the wavelength $\lambda 1$, the diffraction efficiency drops to substantially 20% in almost all the areas of the mid-circumference area 112, but the diffraction efficiency is 70% or more in almost all the areas of the outer circumference area 113. This is because the outer circumference area 113 is a dedicated area for the BD, where a diffraction structure in a serrated profile, optimized with the wavelength $\lambda 1$, is formed.

As described above, according to the objective lens 10 of Embodiment 1, the mid-circumference area 112 is a priority area for the DVD, where the diffraction structure in a step profile, optimized with the red laser beam having the wavelength $\lambda 2$, is formed, hence the diffraction efficiency for the red laser beam having the wavelength $\lambda 2$ is 60% or more in almost all the areas of the mid-circumference area 112. Therefore the difference between the diffraction efficiency for the red laser beam having the wavelength $\lambda 2$ in a position near the optical axis in the inner circumference area 111 and the diffraction efficiency for the red laser beam having the wavelength $\lambda 2$ in the mid-circumference area 112 is substantially small, and deterioration of the focal spot on the information recording surface of the DVD can be suppressed.

The mid-circumference area 112, which is a priority area for the DVD as well, converges a part (substantially 20%) of the blue-violet laser beam having the wavelength $\lambda 1$ on the information recording surface of the BD, therefore deterioration of the focal spot on the information recording surface of the BD can be suppressed.

Furthermore according to the objective lens 10 of Embodiment 1, the outer circumference area 113 is a dedicated area for the BD, where the diffraction structure in a serrated profile, optimized with the blue-violet laser beam having the wavelength $\lambda 1$ is formed, hence the diffraction efficiency for the blue-violet laser beam having the wavelength $\lambda 1$ is 70% or more in almost all the areas of the outer circumference area 113. Therefore the difference between the diffraction efficiency for the blue-violet laser beam having the wavelength $\lambda 1$ in a position near the optical axis in the inner circumference area 111 and the diffraction efficiency for the blue-violet laser beam having the wavelength $\lambda 1$ in the outer circumference area 113 is substantially small, and deterioration of the focal spot on the information recording surface of the BD can be suppressed.

Now a concrete profile of the diffraction structure, which is formed in the objective lens 10 of Embodiment 1, will be described.

Figure 3:
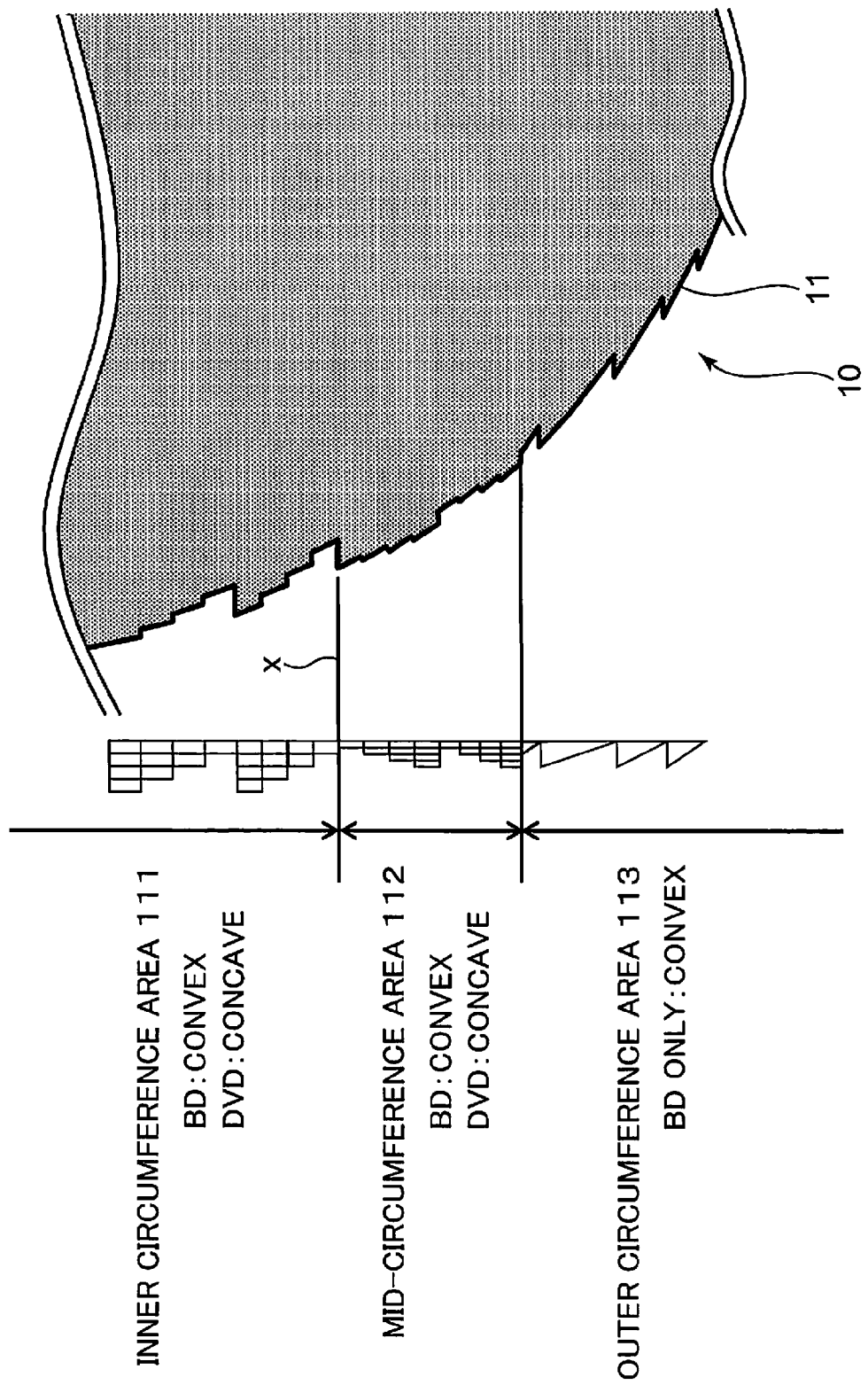
FIG. 3 is a schematic diagram depicting a profile of a diffraction structure formed on an entrance surface of the objective lens according to Embodiment 1 of the present invention.

FIG. 3 is a schematic diagram depicting a profile of a diffraction structure which is formed on the entrance surface 11 of the objective lens 10 of Embodiment 1.

As mentioned above, the inner circumference area 111 has a diffraction structure in a step profile, of which one cycle is three steps—four levels, and is constructed so as to generate power of a convex lens for the plus first order diffracted light of the blue-violet laser beam having the wavelength $\lambda 1$, and to generate power of a concave lens for the minus first order diffracted light of the red laser beam having the wavelength $\lambda 2$. By generating power of a concave lens for the red laser beam like this, the focal position of the red laser beam for the DVD having a light transmission layer with substantially a 0.6 mm thickness can be kept away from the objective lens 10, and the working distance (WD), which is a distance between the objective lens 10 and the optical disk, upon recording or reproducing the DVD, can be increased.

For the BD, on the other hand, the diffraction structure has power of a convex lens for the blue-violet laser beam, therefore change of focal position (chromatic aberration) when the wavelength of the laser light source changes caused by the switching of the recording power and the reproduction power or the change of ambient temperature, which are generated in the objective lens, that is a refractive type convex lens, can be cancelled and decreased.

The mid-circumference area 112 is a priority area for the DVD, and has a diffraction structure in a step profile of which one cycle is three steps—four levels, but is different from that of the inner circumference area 111. The mid-circumference area 112 is designed to generate power of a convex lens for the plus second order diffracted light of the blue-violet laser beam having the wavelength $\lambda 1$, and generate power of a concave lens for the minus first order diffracted light of the red laser beam having the wavelength $\lambda 2$.

Both the inner circumference area 111 and the mid-circumference area 112 have a diffraction structure in a step profile of which one cycle is three steps—four levels, but as FIG. 3 illustrates, the polarity of the diffraction structure is inverted at the boundary x between the inner circumference area 111 and the mid-circumference area 112. Whereas the diffraction structure in one cycle of the inner circumference area 111 becomes lower in the direction from the inner circumference to the outer circumference, whereas the diffraction structure in one cycle of the mid-circumference area 112 becomes higher in the direction from the inner circumference to the outer circumference. In other words, the polarity of the optical path difference generated by one step of step difference of the step profile of the inner circumference area 111 in cross section, and the polarity of the optical path difference generated by one step of step difference of the step profile of the mid-circumference area 112 in cross section are different from each other. The optical path difference generated by one step of step difference of the step profile in cross section refers to a difference between an optical path in the step on the inner circumference side of the objective lens and an optical path in the step on the outer circumference side of the objective lens, in the steps adjacent to each other.

The outer circumference area 113 is designed to be a dedicated area for the BD, and to converge the blue-violet laser beam having the wavelength $\lambda 1$ on the information recording surface of the BD and is constructed so as to generate power of a convex lens for the plus first order diffracted light of the blue-violet laser beam having the wavelength $\lambda 1$.

Here both the inner circumference area 111 and the mid-circumference area 112 have a diffraction structure in a step profile of which one cycle is three steps—four levels, but the differences follow.

Whereas one unit of the step difference in the diffraction structure in the inner circumference area 111 generates substantially a $+0.75 \times \lambda 2$ [nm] of optical path difference for the red laser beam having the wavelength $\lambda 2$, one unit of the step difference in the diffraction structure in the mid-circumference area 112 generates substantially a $-0.25 \times \lambda 2$ [nm] of optical difference for the red laser beam having the wavelength $\lambda 2$.

The inner circumference area 111 converges the plus first order diffracted light for the BD, and converges the minus first order diffracted light for the DVD, hence the difference of the orders of diffraction between the BD and the DVD is two orders in the inner circumference area 111, whereas the mid-circumference area 112 converges the plus second order diffracted light for the BD, and converges the minus first order diffracted light for the DVD, hence the difference of the orders of diffraction between the BD and the DVD is three orders in the mid-circumference area 112.

Thus compared with the diffraction structure of the inner circumference area 111, the characteristic of the diffraction structure of the mid-circumference area 112 is that the step difference in the diffraction structure is small. Also compared with the diffraction structure of the inner circumference area 111, the characteristic of the diffraction structure of the mid-circumference area 112 is that the diffraction pitch is wide, since the difference of orders of diffraction is large and power can be low. Therefore a drop in the diffraction efficiency can be suppressed.

The diffraction efficiency of the blue-violet laser beam having the wavelength $\lambda 1$ and the diffraction efficiency of the red laser beam having the wavelength $\lambda 2$ change depending on the amount of the step difference in the diffraction structure.

Figure 4:
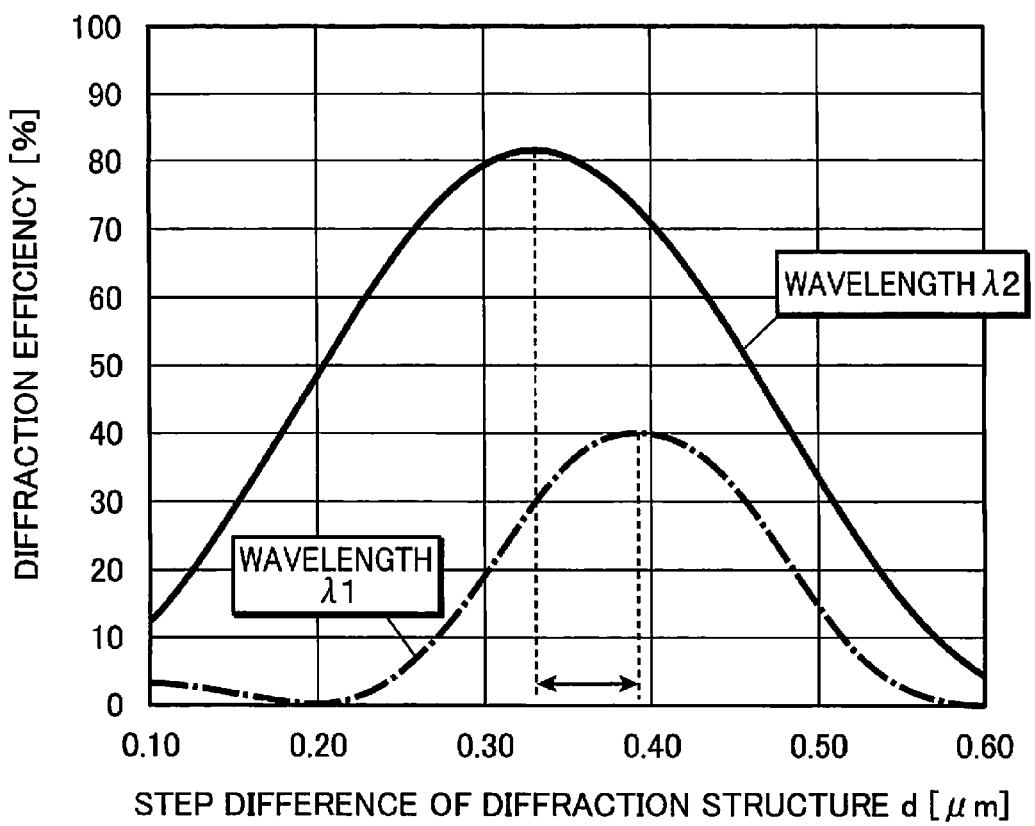
FIG. 4 is a graph depicting a relationship of the step difference of the diffraction structure and the diffraction efficiency in the mid-circumference area of the objective lens.
Figure 5:
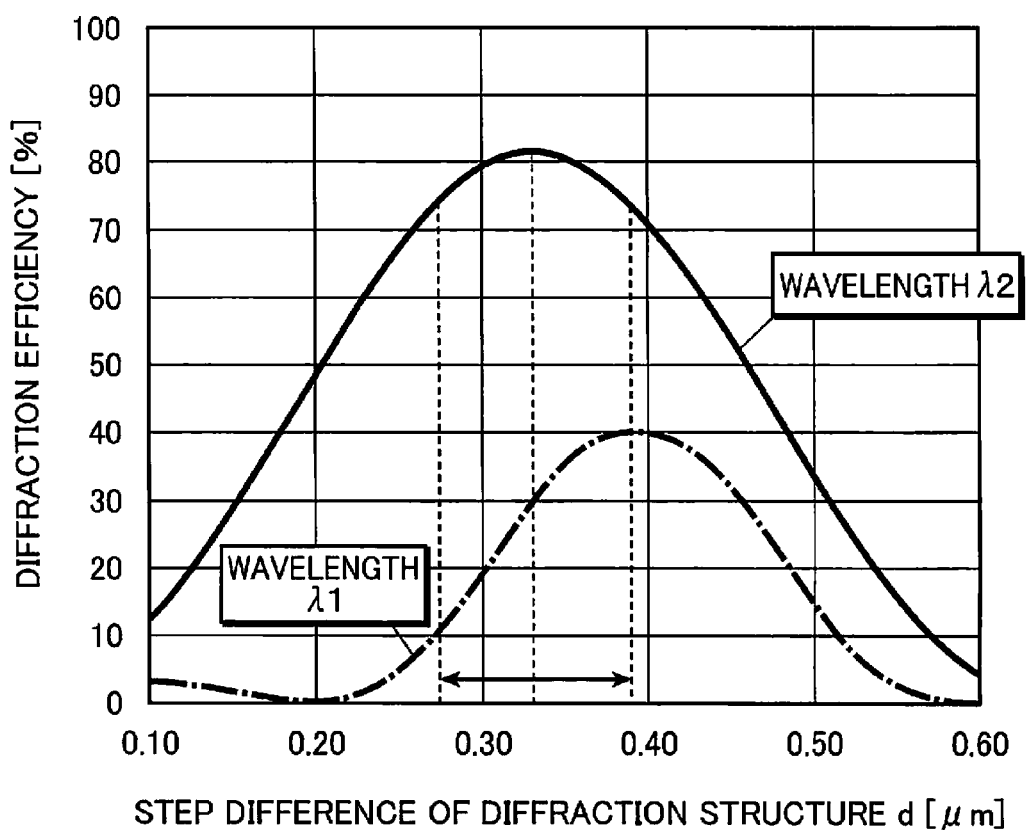
FIG. 5 is a graph depicting a relationship of the step difference of the diffraction structure and the diffraction efficiency in the mid-circumference area of the objective lens.

FIG. 4 and FIG. 5 are graphs depicting a relationship of the step difference amount of the diffraction structure and the diffraction efficiency in the mid-circumference area 112 of the objective lens. In FIG. 4 and FIG. 5, the abscissa is the step difference amount d [μm] of the diffraction structure, and the ordinate is the diffraction efficiency [%]. In FIG. 4 and FIG. 5, ZEONEX 340R (made by Zeon Corporation), which his a synthetic resin, is used as a material of the objective lens 10. The diffraction efficiency of the plus second order diffracted light of the blue-violet laser beam having the wavelength $\lambda 1$ and the diffraction efficiency of the minus first order diffracted light of the red laser beam having the wavelength $\lambda 2$ are both results based on the scalar calculation.

As FIG. 4 shows, the peak of the diffraction efficiency of the minus first order diffracted light of the red laser beam having the wavelength $\lambda 2$ (corresponds to the optical path difference $-0.25 \times \lambda 2$), and the peak of the diffraction efficiency of the plus second order diffracted light of the blue-violet laser beam having a wavelength $\lambda 1$ (corresponds to the optical path difference $+0.5 \times \lambda 1$) are different. In the mid-circumference area 112, it is preferable that the diffraction efficiency of the blue-violet laser beam having the wavelength $\lambda 1$ and the diffraction efficiency of the red laser beam having the wavelength $\lambda 2$ are both high. Therefore it is preferable that the step difference amount d [µm] of the diffraction structure is between the peak of the diffraction efficiency of the minus first order diffracted light of the red laser beam having the wavelength $\lambda 2$ and the peak of the diffraction efficiency of the plus second order diffracted light of the blue-violet laser beam having the wavelength $\lambda 1$, that is in the range of 0.33 to 0.39 [µm].

Generally it is preferable that the step difference amount d [µm] of one step of the step difference in the step profile of the mid-circumference area 112 in cross section satisfies $0.25 \times \lambda 2/(n\lambda 2-1)/1000 \leq d \leq 0.5 \times \lambda 1/(n\lambda 1-1)/1000$.

$\lambda 1$ denotes a wavelength [nm] of the blue-violet laser beam, $\lambda 2$ denotes a wavelength [nm] of the red laser beam, $n\lambda 1$ denotes a refractive index of the objective lens at the wavelength $\lambda 1$, and $n\lambda 2$ denotes a refractive index of the objective lens at the wavelength $\lambda 2$.

Priority may be placed on the diffraction efficiency of the minus first order diffracted light of the red laser beam having the wavelength $\lambda 2$ in the mid-circumference area 112. In order to confine the drop from the peak of the diffraction efficiency to within 10%, as shown in FIG. 5 the step difference amount d [µm] in the diffraction structure may be in a $\pm 10\%$ range of the peak of the diffraction efficiency of the minus first order diffracted light of the red laser beam having the wavelength $\lambda 2$, that is in the range of 0.26 to 0.39 [µm].

Generally it is preferable that the step difference amount d [µm] of one step of the step difference of the step profile of the mid-circumference area 112 in cross section satisfies $0.2 \times \lambda 2/(n\lambda 2-1)/1000 \leq d \leq 0.3 \times \lambda 2/(n\lambda 2-1)/1000$.

$\lambda 2$ denotes a wavelength [nm] of the red laser beam, and $n\lambda 2$ denotes a refractive index of the objective lens at the wavelength $\lambda 2$.

In order to converge the red laser beams having the wavelength $\lambda 2$ which pass through the inner circumference area 111 and the mid-circumference area 112 both on the information recording surface of the DVD, phases must be matched at the boundary between the inner circumference area 111 and the mid-circumference area 112. Furthermore in order to prevent a phase shift at the boundary between the inner circumference area 111 and the mid-circumference area 112, even if the red laser beam having the wavelength $\lambda 2$ deviates by several nm from the design wavelength, the average level of the diffraction structure in the step profile, of the inner circumference area 111, and the average level of the diffraction structure in the step profile of the mid-circumference area 112, must be matched. The "average level of the diffraction structure in the step profile" refers to a mid-level between the lowest level and the highest level of the steps. The boundary between the inner circumference area 111 and the mid-circumference area 112 need not always be the edge of one pitch of the inner circumference area 111.

As the width of the mid-circumference area 112, which is a priority area for the DVD, in the diameter direction is larger, the area in which the diffraction efficiency of the red laser beam having the wavelength $\lambda 2$ is 60% or more increases, and deterioration of the focal spot on the information recording surface of the DVD can be suppressed even more. However if the width of the mid-circumference area 112 is in the diameter direction, the area in which the diffraction efficiency of the blue-violet laser beam having the wavelength $\lambda 1$ drops increases. In other words, as the width of the mid-circumference area 112 is longer, the optical resolution of the focal spot for recording or reproducing information on or from the BD drops more, and recording performance or reproduction performance deteriorates.

For the DVD, considering the influence on reproduction jitter, it is preferable that the NA of the boundary between the inner circumference area 111 and the mid-circumference area 112 is 0.585 or less. In other words, it is preferable that the ratio of this NA to the effective diameter of the DVD corresponding to 0.60 NA, is $0.585/0.60=0.975$ or less.

For the BD, on the other hand, the resolution of the BD decreases as the width of the mid-circumference area 112 increases, hence it is preferable that the NA of the boundary between the inner circumference area 111 and the mid-circumference area 112 is 0.55 or more. In other words, it is preferable that the ratio of this NA to the effective diameter of the DVD corresponding to 0.60 NA, is $0.55/0.60=0.916$ or more.

In other words, in order to make the resolution the DVD and the BD compatible, it is preferable that the effective diameter D of the objective lens, which corresponds to 0.60 NA, and the effective diameter Da of the inner circumference area 111 of the DVD satisfy $0.916 \cdot D \leq Da \leq 0.975 \cdot D$.

If the width of the mid-circumference area 112 is shorter than one pitch (one zonal width) of the diffraction structure, the mid-circumference area 112 substantially does not function as a priority area for the DVD. Hence the width of the mid-circumference area 112 must be longer than at least one pitch of the diffraction structure.

The objective lens 10 of Embodiment 1 can be applied to an objective lens made of glass or synthetic resin.

An advantage of an objective lens made of glass is that the refractive index and aberrations are not changed much by a change in temperature. In the case of an objective lens made of synthetic resin, on the other hand, the specific gravity is low compared with the objective lens made of glass. Therefore the load on an objective lens actuator which drives the objective lens, when a surface moving and decentering of an optical disk occur, can be decreased, and the objective lens can follow up at high-speed. Furthermore mass production at high precision using injection molding is possible, therefore it is preferable that the objective lens having a micro-diffraction structure, as shown in Embodiment 1, is made of synthetic resin.

(Embodiment 2)

Figure 6:
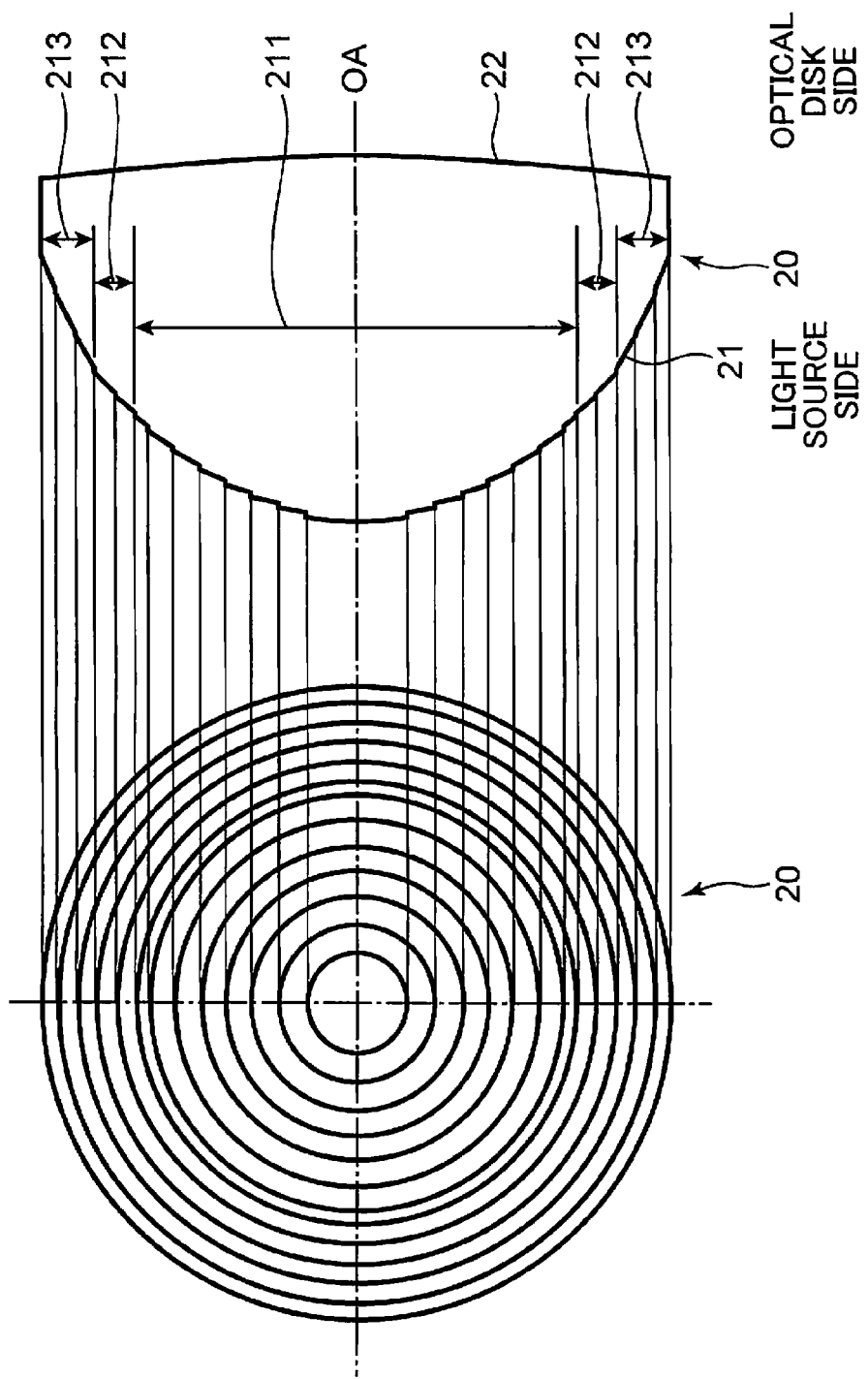
FIG. 6 is a diagram depicting a configuration of an objective lens according to Embodiment 2 of the present invention.

FIG. 6 is a diagram depicting a configuration of an objective lens according to Embodiment 2 of the present invention. The left drawing in FIG. 6 is a schematic plan view depicting a configuration of an objective lens 20 of Embodiment 2, and the right drawing in FIG. 6 is a schematic cross-sectional view depicting the configuration of the objective lens 20 of Embodiment 2.

The objective lens 20 of Embodiment 2 is used as a compatible objective lens which can support both the BD for recording or reproducing information using a blue-violet laser beam having a wavelength $\lambda 1$, and the DVD for recording or reproducing information using a red laser beam having a wavelength $\lambda 2$ which is longer than the wavelength $\lambda 1$.

The objective lens 20 has a spherical surface or an aspherical surface to be a base on an entrance surface 21 on the light source side (side where the laser beam enters). On the spherical surface or the aspherical surface to be a base (hereafter generically called "base aspherical surface"), a zonal diffraction structure is formed with the optical axis OA of the objective lens 20 as the center. An emission surface 22 on the optical disk side (side where the laser beam is emitted), which faces the entrance surface 21, is a spherical surface or an aspherical surface where the diffraction structure is not formed.

The objective lens 20 converges a laser beam emitted from the laser light source on an information recording surface of an information recording medium (optical disk). The objective lens 20 has an inner circumference area (first area) 211 which has a diffraction structure which is formed on the entrance surface 21 on the laser light source side, a mid-circumference area (second area) 212 which has a diffraction structure which is formed outside the inner circumference area 211, and an outer circumference area (third area) 213 which has a diffraction structure which is formed outside the mid-circumference area 212.

The inner circumference area 211 which includes the optical axis OA, the mid-circumference area 212 located on the periphery of the inner circumference area 211, and the outer circumference area 213 located on the periphery of the mid-circumference area 212 have a different diffraction structure from one another.

The inner circumference area 211 and the outer circumference area 213 converge a laser beam having an order of diffraction with which diffraction efficiency is highest, out of the laser beams having the wavelength $\lambda 1$ (390 nm$\leq \lambda 1 \leq$430 nm) which are diffracted by the inner circumference area 211 and the outer circumference area 213, on an information recording surface of the BD (first information recording medium) having a light transmission layer with a thickness t1. The mid-circumference area 212 does not converge a laser beam having an order of diffraction with which diffraction efficiency is highest, out of the laser beams having the wavelength $\lambda 1$ which are diffracted by the mid-circumference area 212, on the information recording surface of the BD (first information recording medium), and converges a laser beam having an order of diffraction, which is different from the order of diffraction with which diffraction efficiency is highest, out of the laser beams having the wavelength $\lambda 1$ which are diffracted by the mid-circumference area 212, on the information recording surface of the BD (first information recording medium).

The inner circumference area 211 and the mid-circumference area 212 converge a laser beam having an order of diffraction with which diffraction efficiency is highest, out of the laser beams having the wavelength $\lambda 2$ (630 nm$\leq \lambda 2 \leq$680 nm) which are diffracted by the inner circumference area 211 and the mid-circumference area 212, on an information recording surface of the DVD (second information recording medium) having a light transmission layer with a thickness t2 which is greater than the thickness t1.

The diffraction efficiency of the laser beam having the wavelength $\lambda 2$, which is diffracted by the mid-circumference area 212 and converges on the information recording surface of the DVD, is higher than the diffraction efficiency of the laser beam having the wavelength $\lambda 1$, which is diffracted by the mid-circumference area 212 and converges on the information recording surface of the BD.

The inner circumference area 211 is a compatible area which can be used for both recording or reproducing the DVD using the red laser beam having the wavelength $\lambda 2$, and recording or reproducing the BD using the blue-violet beam having the wavelength $\lambda 1$. The inner circumference area 211 is designed to converge the blue-violet laser beam on the information recording surface of the BD via the light transmission light with substantially a 0.1 mm thickness, and converge the red laser beam on the information recording surface of the DVD via the light transmission layer with substantially a 0.6 mm thickness. The inner circumference area 211 is an area corresponding to an NA smaller than the NA of the DVD (substantially 0.60 to 0.65), such as 0.57.

The mid-circumference area 212 is a preference area which is used for recording or reproducing the DVD with priority. The mid-circumference area 212 is designed so that mainly the red laser beam having the wavelength $\lambda 2$ is converged on the information recording surface of the DVD. The mid-circumference area 212 is an area corresponding to the NA of the DVD (substantially 0.60 to 0.65).

The NA used when information is recorded on or reproduced from the BD using the blue-violet laser beam (substantially 0.85) is greater than the NA used when information is recorded on or reproduced from the DVD using the red laser beam (substantially 0.60 to 0.65). Therefore the outer circumference area 213 is designed to be a dedicated area for the BD, and to converge only the blue-violet laser beam having the wavelength $\lambda 1$ on the information recording surface of the BD. The outer circumference area 213 is designed so that an aberration is generated in the red laser beam having the wavelength $\lambda 2$, that is, the focal point of the focal spot of the red laser beam shifts considerably, on the information recording surface of the DVD. The outer circumference area 213 does not converge the laser beam having the wavelength $\lambda 2$, which passes through the outer circumference area 213, on the information recording surface of the DVD. Therefore the outer circumference area 213 substantially functions as an aperture stop upon recording or reproducing the DVD.

In the inner circumference area 211, a diffraction structure in a serrated profile, which is optimized to converge the plus first order diffracted light of the blue-violet laser beam on the information recording surface of the BD and to converge the plus first order diffracted light of the red laser beam on the information recording surface of the DVD, is formed. The step difference of the diffraction structure of the inner circumference area 211 is set to have a substantially same diffraction efficiency for the blue-violet laser beam having the wavelength $\lambda 1$ (e.g. $\lambda 1$=405 nm), and for the red laser beam having the wavelength $\lambda 2$ (e.g. $\lambda 2$=660 nm). The diffraction efficiency in this case is substantially 80% based on the scalar calculation.

Actually however the diffraction efficiency in an area near the outermost circumference of the inner circumference area 211 drops compared with the diffraction efficiency in an area near the optical axis OA of the inner circumference area 211. This is because the pitch of the diffraction structure is smaller in the area near the outermost circumference in the inner circumference area 211 than in the area near the optical axis OA in the inner circumference area 211, and the inclination angle of the base aspherical surface of the entrance surface 21 increases, and the incident angle of the laser beam which enters the objective lens 20 substantially in parallel increases as the distance from the optical axis OA increases. If the objective lens is designed such that the plus first order diffracted light of the red laser beam is converged on the information recording surface of the DVD, just like the case of the objective lens 20 of Embodiment 2, the pitch of the diffraction structure in the area near the outermost circumference of the inner circumference area 211 becomes small, hence the diffraction efficiency could further drop due to the dispersion in molding and other factors.

Therefore according to the objective lens 20 of Embodiment 2, the mid-circumference area 212 is a priority area for the DVD, for example, as illustrated in FIG. 6. In the mid-circumference area 212, a diffraction structure in a serrated profile, optimized to converge the plus second order diffracted light of the red laser beam having the wavelength $\lambda 2$ on the information recording surface of the DVD, is formed. By using the plus second order diffracted light, the pitch of the diffraction structure increases compared with the case of using the plus first order diffracted light, therefore a drop in diffraction efficiency due to dispersion in molding and other factors can be suppressed. In this case, the diffraction efficiency of the plus second order diffracted light of the blue-violet laser beam which is optimized to converge the blue-violet laser beam having the wavelength $\lambda 1$ on the information recording surface of the BD can be decreased down to substantially 4%, for example. In the blue-violet laser beam having the wavelength $\lambda 1$, the plus third order diffracted light with which the diffraction efficiency is highest has an aberration with respect to the information recording surface of the BD, and a flare is generated.

The outer circumference area 213 is a dedicated area for the BD. In the outer circumference area 213, a diffraction structure in a serrated profile, which is optimized to converge the plus third order diffracted light of the blue-violet laser beam having the wavelength $\lambda 1$ on the information recording surface of the BD, for example, is formed.

As described above, according to the objective lens 20 of Embodiment 2, the mid-circumference area 212 is a priority area for the DVD, hence the diffraction efficiency in the red laser beam having the wavelength $\lambda 2$ can be increased. As a result, the difference between the diffraction efficiency in the area near the optical axis OA in the inner circumference area 211 and the diffraction efficiency in the mid-circumference area 212 substantially becomes small, and deterioration of the focal spot on the information recording surface of the DVD can be suppressed.

Furthermore according to the objective lens 20 of Embodiment 2, the outer circumference area 213 is a dedicated area for the BD, hence the diffraction efficiency in the blue-violet laser beam having the wavelength $\lambda 1$ can be increased. As a result, the difference between the diffraction efficiency in the area near the optical axis OA in the inner circumference area 211 and the diffraction efficiency in the outer circumference area 213 substantially becomes small, and deterioration of the focal spot on the information recording surface of the BD can be suppressed.

A prior art (e.g. Japanese Patent Application Laid-Open No. H11-86319) discloses a configuration of a refraction type compatible objective lens that has no diffraction structure, where the area corresponding to the mid-circumference area 212 of Embodiment 2 is a dedicated area for the red laser beam having a wavelength $\lambda 2$, and the area corresponding to the outer circumference area 213 of Embodiment 2 is a dedicated area for the blue-violet laser beam having the wavelength $\lambda 1$ ($\lambda 1 < \lambda 2$).

However the objective lens of the prior art is a refraction type compatible objective lens that has no diffraction structure, hence, in the area that corresponds to the mid-circumference area 212 of Embodiment 2, if it is designed to converge the laser beam having the wavelength $\lambda 2$ on the information recording surface of the second information recording medium, the laser beam having the wavelength $\lambda 1$ is not converged at all on the information recording surface of the first information recording medium. In other words, in the area corresponding to the mid-circumference area 212, absolutely no laser beam having the wavelength $\lambda 1$ is converged on the information recording surface of the first information recording medium.

If the diffraction efficiency of the laser beam which enters the objective lens becomes completely zero in a part of the area like this, deterioration of the focal spot on the information recording surface becomes enormous, compared with the case of the objective lens of Embodiment 2, of which the diffraction efficiency is 4% (in other words, 4% intensity=20% amplitude).

According to the objective lens of Embodiment 2, the mid-circumference area 212 is a priority area for the DVD, but converges a part of the blue-violet laser beam having the wavelength $\lambda 1$ on the information recording surface of the BD, although the diffraction efficiency is low. Therefore compared with the refraction type compatible objective lens of the prior art, deterioration of the focal spot on the information recording surface can be suppressed, which is a major difference.

In Embodiment 2, in the mid-circumference area 212 the diffraction structure in the serrated profile, which is optimized to converge the plus second order diffracted light of the red laser beam having the wavelength $\lambda 2$ on the information recording surface of the DVD, was described, but the present invention is not limited to this, but can also be applied to the case when the step difference of the diffraction structure of the mid-circumference area 212 is optimized so that the plus first order diffraction efficiency of the red laser beam having the wavelength $\lambda 2$ becomes the maximum, while optimizing the diffraction structure of the mid-circumference area 212 so as to converge the plus first order diffracted light of the red laser beam having the wavelength $\lambda 2$ on the information recording surface of the DVD. In this case, the diffraction efficiency of the plus first order diffracted light of the red laser beam based on the scalar calculation becomes substantially 100%, hence a drop in diffraction efficiency due to dispersion in molding and other factors can be suppressed. Here the diffraction efficiency of the plus first order diffracted light that is the optimum for converging the blue-violet laser beam having the wavelength $\lambda 1$ on the information recording surface of the BD is substantially 15%, therefore compared with the refraction type compatible objective lens of the prior art, deterioration of the focal spot on the information recording surface can be suppressed.

In Embodiment 2, a case when the inner circumference area 211 of the objective lens 20 converges the plus first order diffracted light of the blue-violet laser beam on the information recording surface of the BD and converges the plus first order diffracted light of the red laser beam on the information recording surface of the DVD was described, but the present invention is not limited to this configuration, but can also be applied to the case of using other orders of diffraction, such as the case when the inner circumference area 211 is designed to converge the plus second order diffracted light of the blue-violet laser beam on the information recording surface of the BD, and converge the plus first order diffracted light of the red laser beam on the information recording surface of the DVD.

Furthermore the order of diffraction of the mid-circumference area (DVD priority area) 212 (plus second order or plus first order) and the order of diffraction of the outer circumference area (BD dedicated area) 213 (plus third order) are also not limited to these orders of diffraction.

In other words, the point of the present invention is that the mid-circumference area 212, where the diffraction structure giving priority to the diffraction efficiency of the red laser beam is formed, is included in order to suppress a drop in diffraction efficiency in a position near the outermost circumference of the inner circumference area 211 upon recording or reproducing the DVD, and that the diffraction efficiency of the blue laser beam for recording or reproducing information on or from the BD is not zero in the mid-circumference area 212.

Therefore the mid-circumference area 212 giving priority to the diffraction efficiency of the red laser beam is not limited to the configuration of Embodiment 2, where the blue laser beam having an order of diffraction which is different from the order of diffraction with which diffraction efficiency is highest, is converged on the information recording surface of the BD, but a configuration of forming a diffraction structure in which the diffraction efficiency of the red laser beam becomes higher than the diffraction efficiency of the blue laser beam in the mid-circumference area 212, is also included in the scope of the present invention.

(Embodiment 3)

Figure 7:
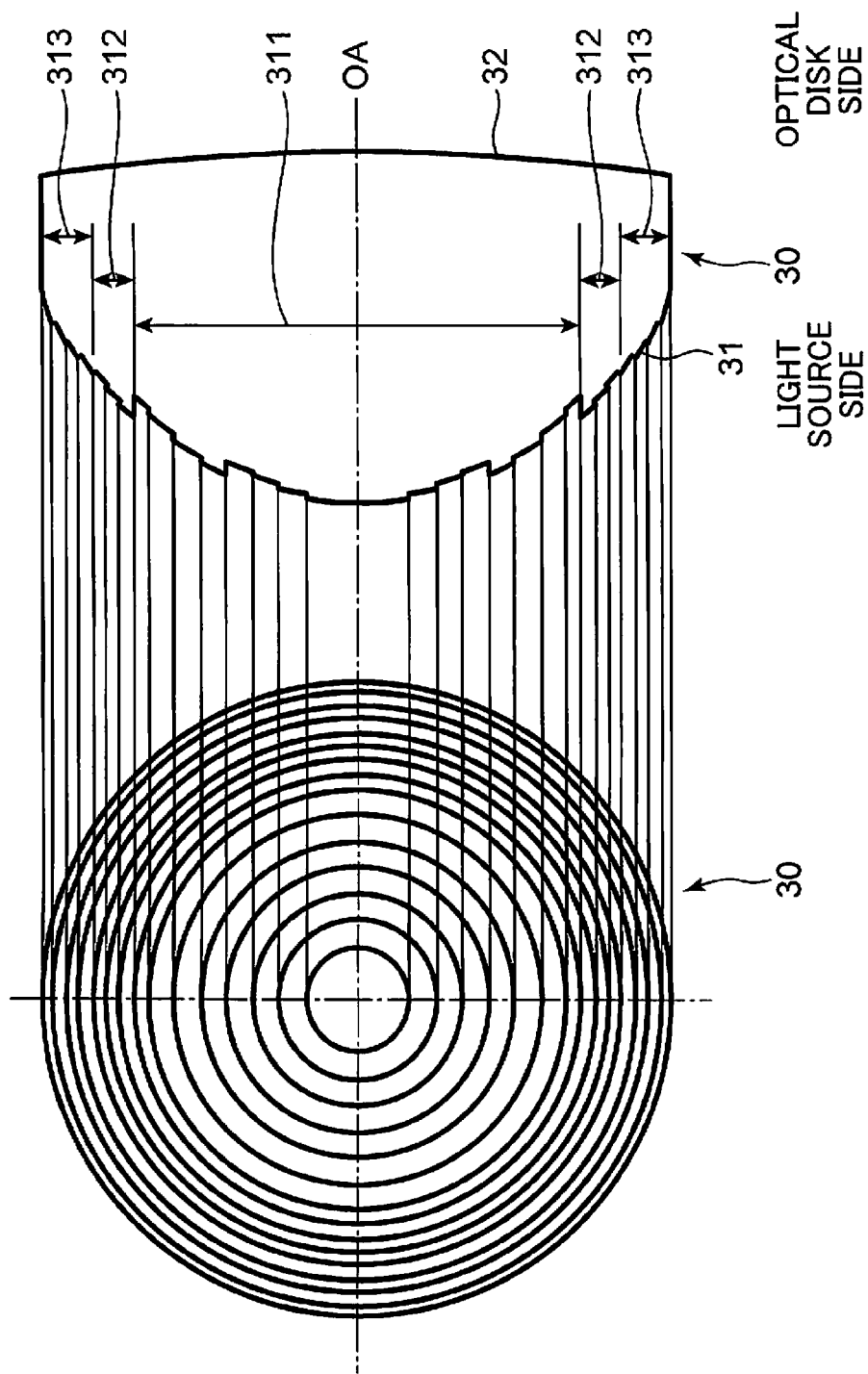
FIG. 7 is a diagram depicting a configuration of an objective lens according to Embodiment 3 of the present invention.

FIG. 7 is a diagram depicting a configuration of an objective lens according to Embodiment 3 of the present invention. The left drawing in FIG. 7 is a schematic plan view depicting a configuration of an objective lens 30 of Embodiment 3, and the right drawing in FIG. 7 is a schematic cross-sectional view depicting the configuration of the objective lens 30 of Embodiment 3.

The objective lens 30 of Embodiment 3 is used as a compatible objective lens which can support both the BD for recording or reproducing information using a blue-violet laser beam having a wavelength $\lambda 1$, and the DVD for recording or reproducing information using a red laser beam having a wavelength $\lambda 2$ which is longer than the wavelength $\lambda 1$.

The objective lens 30 has a spherical surface or an aspherical surface to be a base on an entrance surface 31 on the light source side (side where the laser beam enters). On the spherical surface or the aspherical surface to be a base (hereafter generically called "based aspherical surface"), a zonal diffraction structure is formed with the optical axis OA of the objective lens 30 as the center. An emission surface 32 on the optical disk side (side where the laser beam is emitted) which faces the entrance surface 31 is a spherical surface or an aspherical surface where the diffraction structure is not formed.

The objective lens 30 converges a laser beam emitted from the laser light source on the information recording surface of the information recording medium (optical disk). The objective lens 30 has an inner circumference area (first area) 311 which has a diffraction structure which is formed on the entrance surface 31 on the laser light source side, a mid-circumference area (second area) 312 which has a diffraction structure which is formed outside the inner circumference area 311, and an outer circumference area (third area) 313 which has a diffraction structure which is formed outside the mid-circumference area 312.

The inner circumference area 311 which includes the optical axis OA, the mid-circumference area 312 located on the periphery of the inner circumference area 311, and the outer circumference area 313 located on the periphery of the mid-circumference area 312 have a different diffraction structure from one another.

The inner circumference area 311 and the outer circumference area 313 converge a laser beam having an order of diffraction with which diffraction efficiency is highest, out of the laser beams having the wavelength $\lambda 1$ (390 nm $\leq \lambda 1 \leq$ 430 nm) which are diffracted by the inner circumference area 311 and the outer circumference area 313, on an information recording surface of the BD (first information recording medium) having a light transmission layer with a thickness t1.

The inner circumference area 311 and the mid-circumference area 312 converge a laser beam having an order of diffraction with which diffraction efficiency is highest, out of the laser beams having a wavelength $\lambda 2$ (630 nm $\leq \lambda 2 \leq$ 680 nm) which are diffracted by the inner circumference area 311 and the mid-circumference area 312, on the information recording surface of the DVD (second information recording medium) having a light transmission layer with a thickness t2 which is greater than the thickness t1.

The diffraction efficiency of the laser beam having the wavelength $\lambda 2$, which is diffracted by the mid-circumference area 312 and converges on the information recording surface of the DVD, is higher than the diffraction efficiency of the laser beam having the wavelength $\lambda 1$, which is diffracted by the mid-circumference area 312 and converges on the information recording surface of the BD.

The inner circumference area 311 has a diffraction structure in a step profile of which one cycle is three steps—four levels, for example, and is a compatible area which can be used for both recording or reproducing the DVD using the red laser beam having the wavelength $\lambda 2$, and recording or reproducing the BD using the blue-violet laser beam having the wavelength $\lambda 1$. The inner circumference area 311 is designed to converge the plus first order diffracted light of the blue-violet laser beam on the information recording surface of the BD via the light transmission layer with substantially a 0.1 mm thickness, and converge the minus first order diffracted light of the red laser beam on the information recording surface of the DVD via the light transmission layer with substantially a 0.6 mm thickness. The inner circumference area 311 is an area corresponding to an NA smaller than the NA of the DVD (substantially 0.60 to 0.65), such as 0.57.

The mid-circumference area 312 has a diffraction structure in a serrated profile, and is a preference area which is used for recording or reproducing the DVD with priority. The mid-circumference area 312 is designed so that mainly the red laser beam having the wavelength $\lambda 2$ is converged on the information recording surface of the DVD. The mid-circumference area 312 is an area corresponding to an NA of the DVD (substantially 0.60 to 0.65).

The NA used when information is recorded on or reproduced from the BD using the blue-violet laser beam (substantially 0.85) is greater than the NA used when information is recorded on or reproduced from the DVD using the red laser beam (substantially 0.60 to 0.65). Therefore the outer circumference area 313 is designed to be a dedicated area for the BD, and to converge only the blue-violet laser beam having the wavelength $\lambda 1$ on the information recording surface of the BD. The outer circumference area 313 is designed so that an aberration is generated in the red laser beam having the wavelength $\lambda 2$, that is, the focal point of the focal spot of the red laser beam shifts considerably, on the information recording surface of the DVD. The outer circumference area 313 does not converge the laser beam having the wavelength $\lambda 2$, which passes through the outer circumference area 313, on the information recording surface of the DVD. Therefore the outer circumference area 313 substantially functions as an aperture stop upon recording or reproducing the DVD.

One unit of the step difference of the diffraction structure of the inner circumference area 311 is an amount to generate substantially a $1.25 \times \lambda 1$ [nm] of optical path difference for the blue-violet laser beam having the wavelength $\lambda 1$ (e.g. $\lambda 1 = 405$ nm), and the phase modulation amount is $\pi/2$ per step. In this case, the diffraction efficiency of the plus first order diffracted light is substantially 80% based on the scalar calculation, which is highest among the orders of diffraction.

On the other hand, one unit of the step difference of the direction structure of the inner circumference area 311 is an amount to generates substantially a 0.75×λ2 [nm] of optical path difference for the red laser beam having the wavelength λ2 (e.g. λ2=660 nm), and the phase modulation amount is −π/2 per step. In this case, the diffraction efficiency of the minus first order diffracted light is substantially 80% based on the scalar calculation, which is highest among the orders of diffraction.

In other words, the diffraction structure of the inner circumference area 311 has a step profile in cross section. One step of step difference of the step profile of the inner circumference area 311 in cross section generates substantially a 1.25 wavelength optical path difference and power of a convex lens for the laser beam having the wavelength λ1, and generates substantially a 0.75 wavelength optical path difference and power of a concave lens for the laser beam having the wavelength λ2. The 1.25 wavelength and the 0.75 wavelength includes a ±10% error, for example, respectively.

If the inner circumference area 311 has this diffraction structure, serrated profiles in substantially opposite directions can be generated between the wavelength λ1 and the wavelength λ2, therefore compatible recording or compatible reproduction of information can be implemented, with high light utilization efficiency, for both the DVD having a light transmission layer with substantially a 0.6 mm thickness, and the BD having a light transmission layer with substantially a 0.1 mm thickness.

According to the objective lens 30 of Embodiment 3, as FIG. 7 illustrates, the mid-circumference area 312 is a priority area for the DVD, and has a diffraction structure in a serrated profile, optimized to converge the plus first order diffracted light of the red laser beam having the wavelength λ2 on the information recording surface of the DVD. The diffraction structure of the mid-circumference area 312 has a serrated profile in cross section, and generates a less than 0.5 wavelength optical path difference and power of a concave lens for the laser beam having the wavelength λ2.

In this case, the diffraction efficiency of the minus first order diffracted light, which is optimum to converge the blue-violet laser beam having the wavelength λ1 on the information recording surface of the BD, drops down to substantially 1%, for example. In the blue-violet laser beam having the wavelength λ1, the plus second order diffracted light with which the diffraction efficiency is highest has an aberration with respect to the information recording surface of the BD, and generates a flare.

In other words, the mid-circumference area 312 does not converge a laser beam having an order of diffraction with which diffraction efficiency is highest, out of the laser beams having the wavelength λ1 which are diffracted by the mid-conference area 312, on the information recording surface of the BD (first information recording medium), and converges a laser beam having an order of diffraction which is different from the order of diffraction with which diffraction efficiency is highest, out of the laser beams having the wavelength λ1 which are diffracted by the mid-conference area 312, on the information recording surface of the BD (first information recording medium).

As FIG. 7 illustrates, the outer circumference area 313 is a dedicated area for the BD, and has a diffraction structure in a serrated profile, optimized with the wavelength λ1. The diffraction structure of the outer circumference area 313 has a serrated profile in cross section, and generates a less than 0.5 wavelength optical path difference and power of a convex lens for the laser beam having the wavelength λ1.

Figure 8:
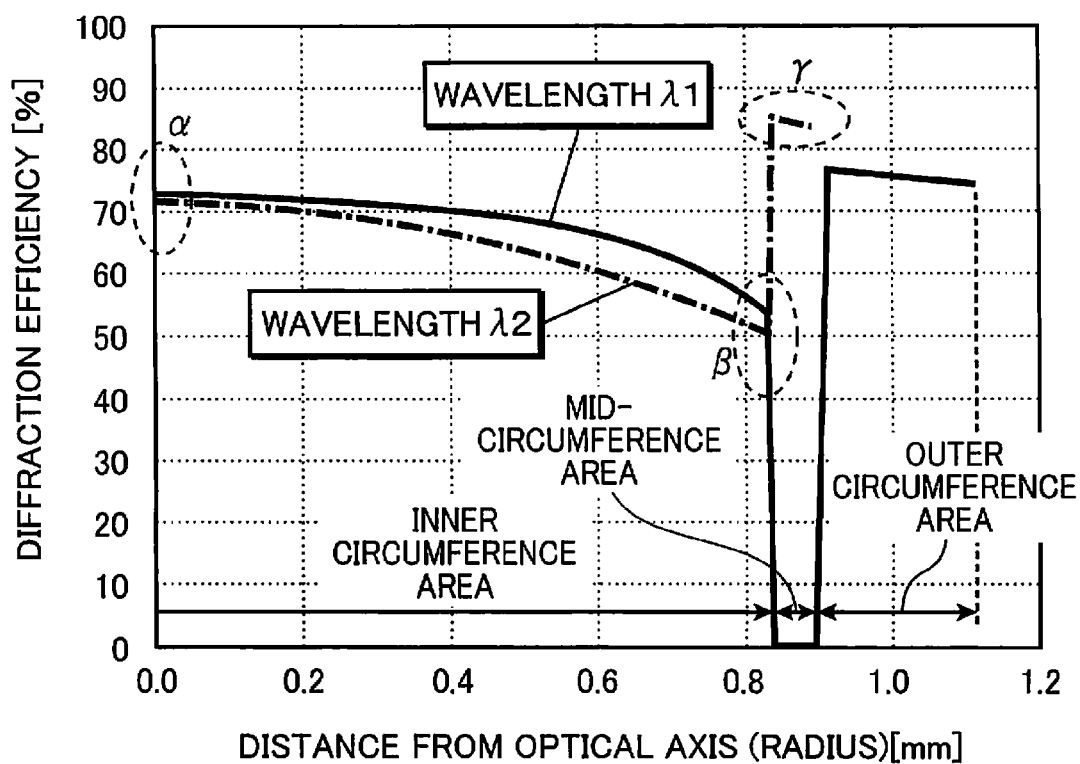
FIG. 8 is a graph depicting the diffraction efficiency of the objective lens according to Embodiment 3 of the present invention.

FIG. 8 is a graph depicting the diffraction efficiency of the objective lens according to Embodiment 3 of the present invention. In FIG. 8, in the objective lens 30 according to Embodiment 3, the diffraction efficiency of the blue-violet laser beam having the wavelength λ1 (=405 nm) and that of the red laser beam having the wavelength λ2 (=660 nm) are calculated based on the wave calculation (vector calculation). In FIG. 8, the abscissa is the entrance position of the laser beam, that is the distance from the optical axis OA (radius of objective lens), and the ordinate is the diffraction efficiency corresponding to the entrance position.

As FIG. 8 shows, in the case of the wavelength λ2, the diffraction efficiency is 70% or more in a position near the optical axis in the inner circumference area 311 (point α), whereas the diffraction efficiency drops to 50% or less in a position near the outermost circumference of the inner circumference area 311 (point β). This is because the pitch of the diffraction structure is smaller in the position of the point β than the position of the point α, and in addition, the incident angle of the base aspherical surface of the entrance surface 31 increases, and the incident angle of the laser beam which enters the objective lens 30 in parallel increases as the distance from the optical axis OA increases.

The diffraction efficiency is 80% or more in almost all the areas (area γ) of the mid-circumference area 312. This is because the mid-circumference area 312 is a priority area for the DVD, and the diffraction structure in the serrated profile, optimized with the wavelength λ2, is formed.

In the case of the wavelength λ1, the diffraction efficiency is 70% or more in a position near the optical axis in the inner circumference area 311 (point α), whereas the diffraction efficiency is 50% or less in a position near the outermost circumference of the inner circumference area 311 (point β). In the case of the wavelength λ1, the diffraction efficiency drops to substantially 1% in almost all areas of the mid-circumference area 312, but the diffraction efficiency is 70% or more in almost all the areas of the outer circumference area 313. This is because the outer circumference area 313 is a dedicated area for the BD, where a diffraction structure in a serrated profile, optimized with the wavelength λ1, is formed.

As described above, according to the objective lens 30 of Embodiment 3, the mid-circumference area 312 is a priority area of the DVD, where the diffraction structure in a serrated profile, optimized with the red laser beam having the wavelength λ2, is formed, hence the diffraction efficiency for the red laser beam having the wavelength λ2 if 70% or more in almost all the areas of the mid-circumference area 312. Therefore the difference between the diffraction efficiency for the red laser beam having the wavelength λ2 in a position near the optical axis in the inner circumference area 311 and the diffraction efficiency for the red laser beam having the wavelength λ2 in the mid-circumference area 312 is substantially small, and deterioration of the focal spot on the information recording surface of the DVD can be suppressed.

Furthermore according to the objective lens 30 of Embodiment 3, the outer circumference area 313 is a dedicated area for the BD, where the diffraction structure in a serrated profile, optimized with the blue-violet laser beam having the wavelength λ1, is formed, hence the diffraction efficiency for the blue-violet laser beam having the wavelength λ1 is 70% or more in almost all the areas of the outer circumference area 313. Therefore the difference between the diffraction efficiency for the blue-violet laser beam having the wavelength λ1 in a position near the optical axis in the inner circumference area 311 and the diffraction efficiency for the blue-violet laser beam having the wavelength λ1 in the outer circumference area 313 is substantially small, and deterioration of the focal spot on the information recording surface of the BD can be suppressed.

The mid-circumference area 312 is a priority area for the DVD, but converges a part of the blue-violet laser beam having the wavelength λ1 on the information recording surface of the BD, although the diffraction efficiency is low, therefore deterioration of the focal spot on the information recording surface can be suppressed.

Now a concrete profile of the diffraction structure which is formed in the objective lens 30 of Embodiment 3 will be described.

Figure 9:
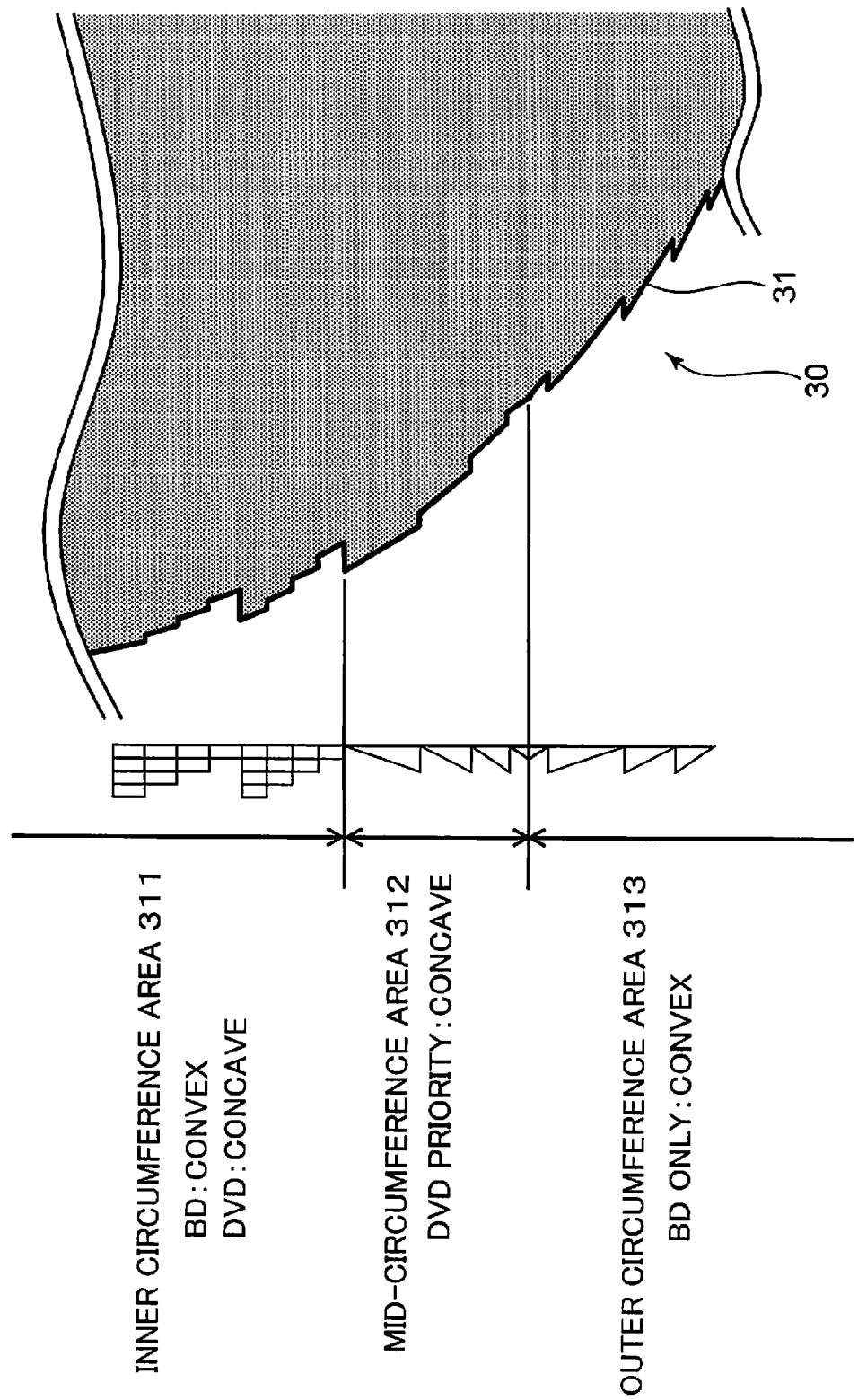
FIG. 9 is a schematic diagram depicting a profile of a diffraction structure formed on an entrance surface of the objective lens according to Embodiment 3 of the present invention.

FIG. 9 is a schematic diagram depicting a profile of a diffraction structure which is formed on the entrance surface 31 of the objective lens 30 of Embodiment 3.

As mentioned above, the inner circumference area 311 has a diffraction structure having a step profile of which one cycle is three steps—four levels, and is constructed so as to generate power of a convex lens for the plus first order diffracted light of the blue-violet laser beam having the wavelength λ1, and to generate power of a concave lens for the minus first order diffracted light of the red laser beam having the wavelength λ2. By generating power of a concave lens for the red laser beam like this, the focal position of the red laser beam for the DVD having a light transmission layer with substantially a 0.6 mm thickness can be kept away from the objective lens 30, and the working distance (WD), which is a distance between the objective lens 30 and the optical disk, upon recording or reproducing the DVD, can be increased.

For the BD, on the other hand, the diffraction structure has power of a convex lens for the blue-violet laser beam, therefore change of focal position (chromatic aberration) when the wavelength of the laser light source changes caused by the switching of the recording power and the reproduction power or the change of ambient temperature, which are generated in the objective lens, that is a refractive type convex lens, can be cancelled and decreased.

The mid-circumference area 312 is designed to be a priority area for the DVD and to converge the red laser beam having the wavelength λ2 on the information recording surface of the DVD. The mid-circumference area 312 is constructed so as to generate power of a concave lens for the plus first order diffracted light of the red laser beam having the wavelength λ2.

The outer circumference area 313 is designed to be a dedicated area for the BD, and to converge the blue-violet laser beam having the wavelength λ1 on the information recording surface of the BD. The outer circumference area 313 is constructed so as to generate power of a convex lens for the plus first order diffracted light of the blue-violet laser beam having the wavelength λ1.

Both the inner circumference area 312 and the outer circumference area 313 have a diffraction structure in a serrated profile like this, but as FIG. 9 illustrates, the polarity of the diffraction structure (polarity of the lens power) is inverted at the boundary between the mid-circumference area 312 and the outer circumference area 313. Whereas the serrated profile of the diffraction structure of the mid-circumference area 312 becomes higher in the direction from the inner circumference to the outer circumference, and the serrated profile of the diffraction structure of the outer circumference area 313 becomes lower in the direction from the inner circumference to the outer circumference.

Out of the blue-violet laser beams having the wavelength λ1 which are diffracted by the mid-circumference area 312, the plus first order diffracted light and the plus second order diffracted light having a high diffraction frequency generate an aberration on the information recording surface of the BD where the focal position of the focal spot is shifted considerably. The plus first order diffracted light and the plus second order diffracted light of the blue-violet laser beams having the wavelength λ1 diffracted by the mid-circumference area 312 are undesired lights (so called "stray lights"). If such undesired lights are collected and reflected on the information recording surface of the optical disk or on a position near the surface, the undesired lights are collected on the light receiving element of the optical head, which may deteriorate the recording performance or reproduction performance of the optical head.

Figure 10:
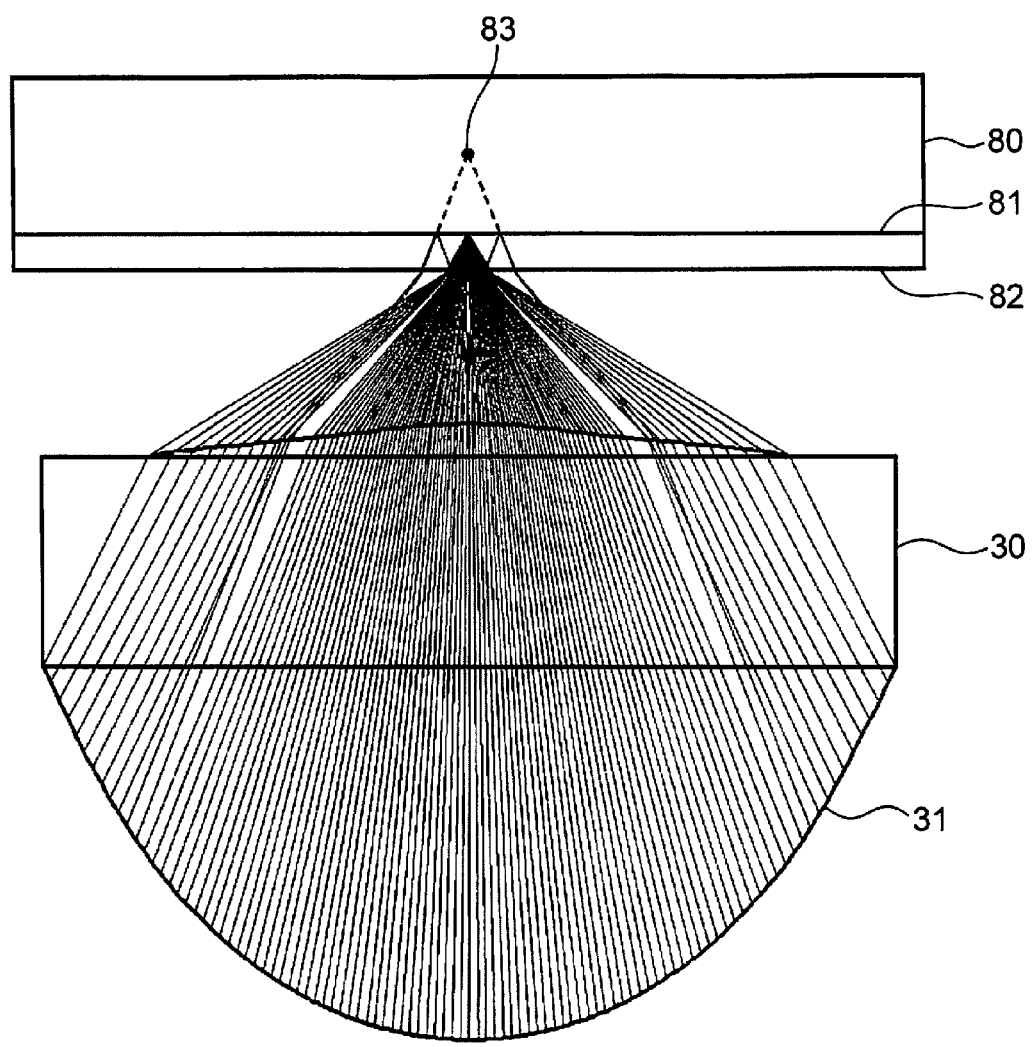
FIG. 10 is a schematic diagram depicting a focal position of undesired light of the objective lens according to Embodiment 3 of the present invention.

In the case of the objective lens 30 of Embodiment 3 however, power of a concave lens is generated for the plus first order diffracted light and plus second order diffracted light of the blue-violet laser beam having the wavelength λ1, since the mid-circumference area 312 has the serrated profile for generating power of a concave lens for the red laser beam having the wavelength λ2, as mentioned above. Therefore the undesired lights, generated due to the plus first order diffracted light and the plus second order diffracted light of the blue-violet laser beam having the wavelength λ1 diffracted by the mid-circumference area 312 are collected at a position 83 more distant from the signal lights diffracted by the inner circumference area 311 and the outer circumference area 313, as shown in FIG. 10, and are not collected near the information recording surface 81 or near the surface 82 of the optical disk 80, and therefore are not collected on the light receiving element of the optical head.

In other words, because the mid-circumference area 312, which is a priority area for the DVD, has a serrated profile for generating power of a concave lens for the red laser beam having the wavelength λ2, the undesired lights, generated due to the plus first order diffracted light and the plus second order diffracted light of the blue-violet laser beam having the wavelength λ1 diffracted by the mid-circumference area 312, do not collect on the light receiving element of the optical head, and therefore the recording performance or the reproduction performance of the optical head does not deteriorate, which is a remarkable effect.

Here in order to converge both the red laser beam having the wavelength λ2 which transmits through the inner circumference area 311 and that which transmits through the mid-circumference area 312 on the information recording surface of the DVD, phases must be matched at the boundary between the inner circumference area 311 and the mid-circumference area 312. Furthermore in order to prevent a phase shift at the boundary between the inner circumference area 311 and the mid-circumference area 312, even if the red laser beam having the wavelength λ2 deviates by several nm from the design wavelength, the average level of the diffraction structure in the step profile of the inner circumference area 311, and the average level of the diffraction structure in the serrated profile of the mid-circumference area 312 must be matched. "The average level of the diffraction structure in the step profile" refers to a mid-level between the lowest level and the highest level of the steps, and "the average level fo the diffraction structure in the serrated profile" refers to a mid-level of the height of the saw-teeth on the lens surface.

However it is not easy to match the phases at the boundary between the inner circumference area 311 having the step profile and the mid-circumference area 312 having the serrated profile, and match the average levels of the respective areas, and no example considers this aspect in detail in the prior art.

Therefore here the profile of the boundary between the inner circumference area 311 having the step profile, and the mid-circumference are 312 having the serrated profile, were examined in detail.

Figure 11:
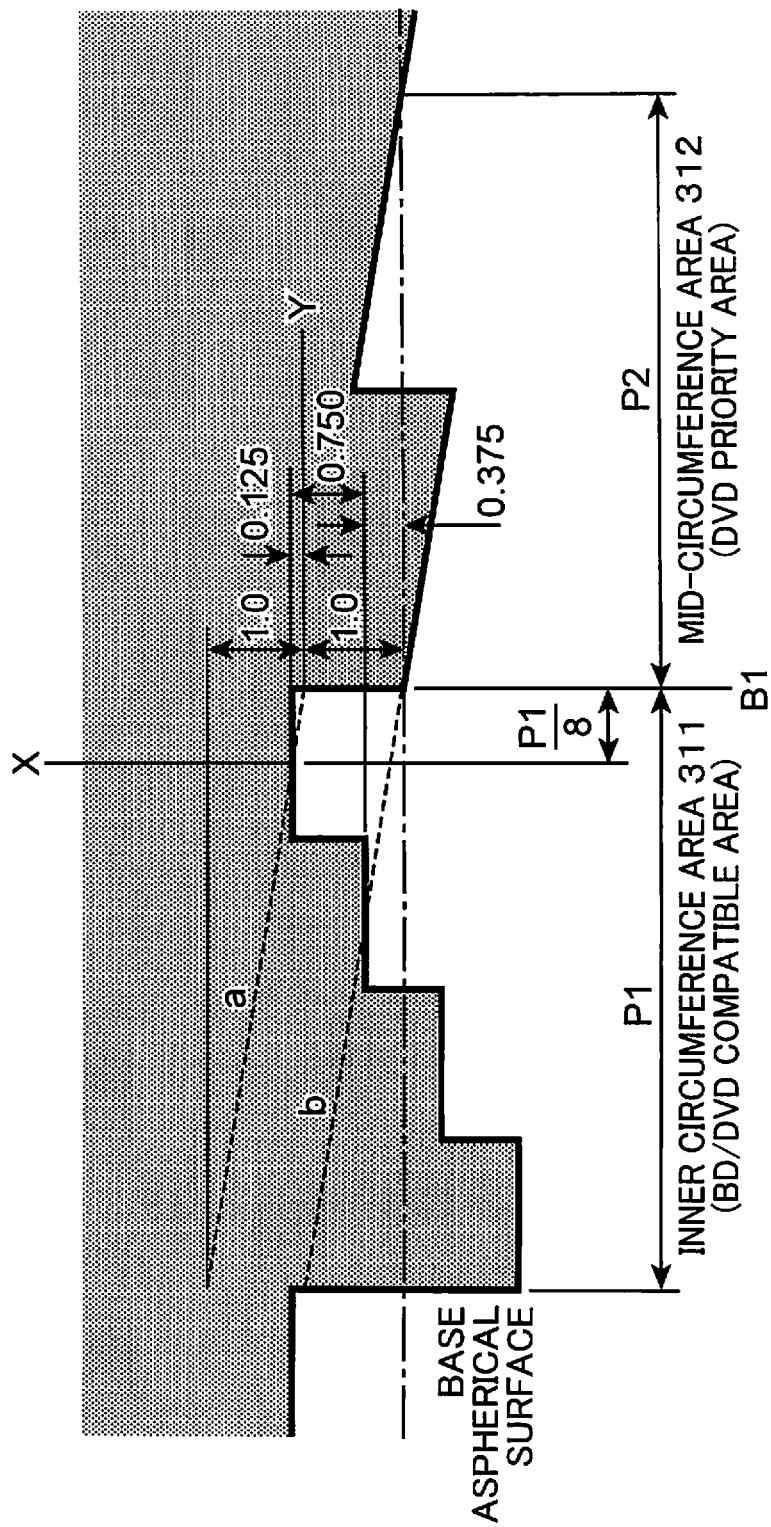
FIG. 11 is an enlarged view of the boundary between the inner circumference area and the mid-circumference area of the objective lens according to Embodiment 3 of the present invention.

FIG. 11 is an enlarged view of the boundary between the inner circumference area and the mid-circumference area of the objective lens according to Embodiment 3 of the present invention. FIG. 11 illustrates only the profile of the diffraction structure which is superposed on the base aspherical surface. In FIG. 11, the left side of the area boundary B1 is the inner circumference area 311, and the right side thereof is the mid-circumference area 312. The upper side of the entrance surface 31 is the lens (glass material), and the lower side thereof is air. The numeric values in FIG. 11 are the step difference amount which generates a predetermined optical path difference for the red laser having the wavelength $\lambda 2$. For example, the step difference amount 0.750 means that the optical path difference between the beam which passes through the lens and the beam which passes through the air is $0.750 \times \lambda 2$.

The dashed line in FIG. 11 indicates a level of the base aspherical surface, and both the average level of the diffraction structure and the base aspherical surface level match in both the inner circumference area 311 and the mid-circumference area 312.

In FIG. 11, the broken line a indicates an approximate serrated profile of one pitch in the inner circumference area 311 adjacent to the inner circumference area 312. The inclination of this broken line a is an amount to generate a phase change for one wavelength of the wavelength $\lambda 2$ in the pitch P1 of the mid-circumference area 311, and an intersection of this broken line a and the actual diffraction structure is a center X of the flat portion of the step profile, that is, a position ⅛ pitch distant from the area boundary B1 (P1/8). Therefore the intersection Y of the area boundary B1 and the broken line a exists at $0.125 \times \lambda 2$ lower than the actual diffraction structure.

The actual step difference of the diffraction structure in the area boundary B1 with respect to the base aspherical surface is $1.125 \times \lambda 2$, that is one step $0.750 \times \lambda 2$ to which ½ step, $0.375 \times \lambda 2$, is added. Therefore the optical path difference at the area boundary B1 having the approximate serrated profile indicated by the broken line a is exactly one wavelength with respect to the base aspherical surface, and the step difference of the diffraction structure at the area boundary B1 is substantially matched with the base aspherical surface.

Thus the average level of the diffraction structure in the step profile of the inner circumference area 311, and the average level of the diffraction structure in the serrated profile of the mid-circumference area 312 match. At the boundary between the inner circumference area 311 and the mid-circumference are 312, the end of one cycle of the diffraction structure in the step profile, which is formed in the inner circumference area 311 and the inclined portion of the diffraction structure in the serrated profile, which is formed in the mid-circumference area 312, are connected at the average level.

Therefore in order to match the phases of the inner circumference area 311 and the mid-circumference area 312, the serrated profile of the mid-circumference area 312 must be matched with the base aspherical surface at the area boundary B1. In other words, the phases are matched at the area boundary B1 by connecting the inner circumference area 311 and the mid-circumference area 312 in the profile shown in FIG. 11. Since both the average level of the diffraction structure of the inner circumference area 311 and that of the mid-circumference area 312 match the level of the base aspherical surface, and a phase shift is not generated even if the red laser beam having the wavelength $\lambda 2$ deviates by several nm from the design wavelength.

The broken line b indicates a serrated profile when an approximate serrated profile of the diffraction structure of the inner circumference area 311 has substantially a same phase as the broken line a, that is when the approximate serrated profile is shifted by one wavelength from the broken line a. The continuation of the phase at the wavelength $\lambda 2$ is confirmed by this broken line b, which is continuous with the mid-circumference area 312.

The area boundary B1 shown in FIG. 11 need not always be at the end of one pitch of the inner circumference area 311. In other words, the approximate serrated profile of the inner circumference area 311 is represented by the broken line b, so a phase shift is not generated even if the mid-circumference area 312, of which phase is continuous from the broken line b, is extended on the inner circumference area 311 side, that is even if the area boundary B1 is shifted on the inner circumference area 311 side.

In this case, as the width of the mid-circumference area 312, which is a priority area for the DVD, in the diameter direction is increased, the area where the diffraction efficiency of the red laser beam having the wavelength $\lambda 2$ becomes 70% or more expands, and deterioration of the focal spot on the information recording surface of the DVD can be better suppressed. However if the width of the mid-circumference area 312 in the diameter direction is increased, the area where the blue-violet laser beam having the wavelength $\lambda 1$ becomes undesired light expands. In other words, as the width of the mid-circumference area 312 increases, beams that miss entering the objective lens 30 increase, and therefore the optical resolution of the focal spot for recording or reproducing information on or from the BD decreases, and recording performance or reproduction performance deteriorates.

Figure 12:
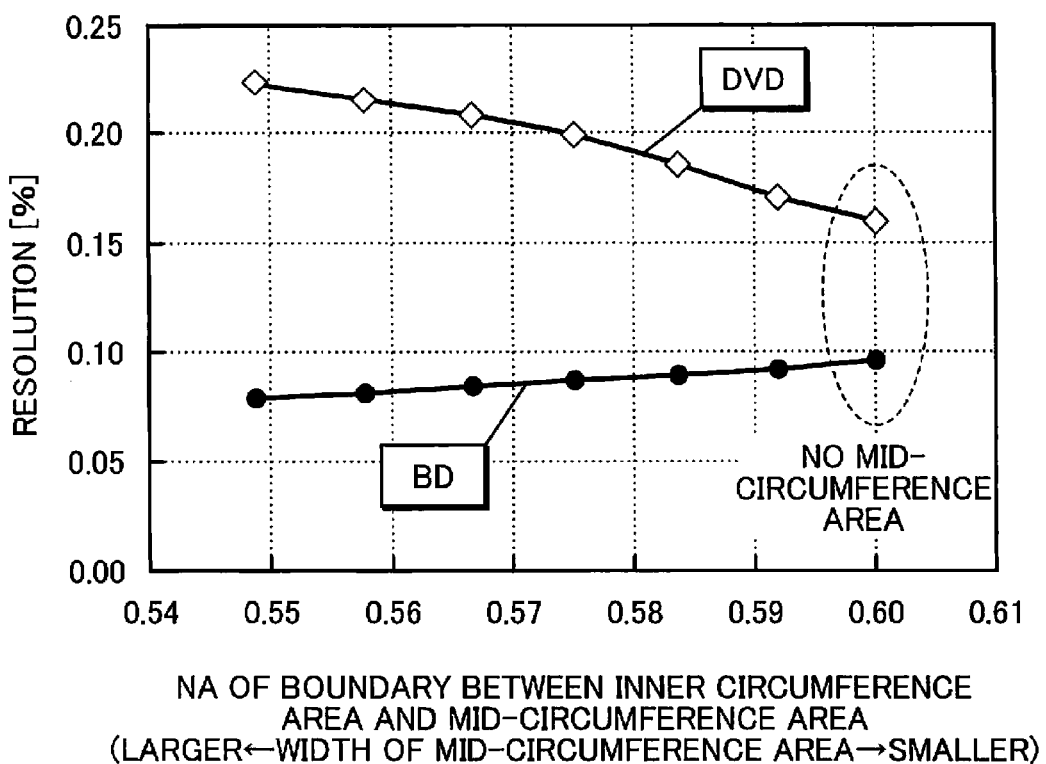
FIG. 12 is a graph depicting a relationship of an NA of the boundary between the inner circumference area and the mid-circumference area of the objective lens and resolution according to Embodiment 3 of the present invention.

FIG. 12 is a graph depicting a relationship of the NA of the boundary between the inner circumference area and the mid-circumference area of the objective lens and resolution according to Embodiment 3 of the present invention. FIG. 12 shows the result when the resolution of the DVD and that of the BD are calculated with changing the width of the mid-circumference area 312 using the objective lens 30 of Embodiment 3. In FIG. 12, the abscissa is a boundary position between the inner circumference area 311 and the mid-circumference area 312, converted into an NA, and the ordinate is the resolution of the DVD (ratio of the signal amplitudes between the minimum mark length 3T and the maximum mark length 11T) or the resolution of the BD (ratio of the signal amplitude between the minimum mark length 2T and the maximum mark length 8T).

For example, if the NA at the boundary is 0.56, it means that the width (NA) of the mid-circumference area 312 is in a 0.56 to 0.60 range, and if the NA at the boundary is 0.60, it means that the width of the mid-circumference 312 is zero, in other words, this lens is a conventional objective lens which has no mid-circumference area 312.

As FIG. 12 shows, the resolution of the DVD increases and the resolution of the BD decreases as the width of the mid-circumference area 312 increases (NA at the boundary decreases).

In the case of the DVD, if the resolution becomes less than 20%, the influence on reproduction jitter becomes conspicuous. Hence it is preferable that the NA at the boundary between the inner circumference area 311 and the mid-circumferential area 312 is 0.575 or less. In other words, it is preferable that the ratio of this NA to the effective diameter of the DVD, which corresponds to a 0.60 NA, is 0.575/

0.60=0.958 or less. In the case of the BD, the resolution of the BD decreases as the width of the mid-circumference area 312 increases. Therefore it is preferable that the NA at the boundary between the inner circumference area 311 and the mid-circumference area 312 is 0.55 or more, so that a drop in resolution can be controlled to 20% or less. In other words, it is preferable that the ratio of this NA to the effective diameter of the DVD, which corresponds to a 0.60 NA, is 0.55/0.60=0.916 or more.

In other words, in order to make resolution of the DVD and that of the BD compatible, it is preferable that in the DVD the effective diameter D of the objective lens which corresponds to a 0.60 NA and the effective diameter Da of the inner circumference area 311 satisfy $0.916 \cdot D \leqq Da \leqq 0.958 \cdot D$.

If the width of the mid-circumference area 312 is shorter than one pitch (one zonal width) of the diffraction structure, the mid-circumference area 312 substantially does not function as a priority area for the DVD. Here the width of the mid-circumference area 312 must be longer than at least one pitch of the diffraction structure.

The point of the present invention is that the mid-circumference area 312, where the diffraction structure giving priority to the diffraction efficiency of the red laser beam is formed, is included in order to suppress a drop of diffraction efficiency in a position near the outermost circumference of the inner circumference area 311 upon recording or reproducing the DVD, and that the diffraction efficiency of the blue laser beam for recording or reproducing information on or from the BD is not zero in the mid-circumference area 312.

Therefore the mid-circumference area 312 giving priority to the diffraction efficiency of the red laser beam is not limited to the configuration of Embodiment 3, where the blue laser beam having an order of diffraction which is different from the order of diffraction with which diffraction efficiency is highest, is converged on the information recording surface of the BD, but a configuration of forming a diffraction structure in which the diffraction efficiency of the red laser beam becomes higher than the diffraction efficiency of the blue laser beam in the mid-circumference area 312, is also included in the scope of the present invention.

The objective lens 30 of Embodiment 3 can be applied to an objective lens made of glass or synthetic resin.

An advantage of the objective lens made of glass is that the refractive index and aberrations are not changed much by a change in temperature. In the case of an objective lens made of synthetic resin, on the other hand, specific gravity is small compared with an objective lens made of glass. Therefore load on an objective lens actuator which drives the objective lens, when a surface moving and decentering of the optical disk occur, can be decreased, and the objective lens can follow up at high-speed. Furthermore mass production at high precision using injection molding is possible, therefore it is preferable that the objective lens having a micro-diffraction structure, as shown in Embodiment 3, is made of synthetic resin.

(Embodiment 4)

Figure 13:
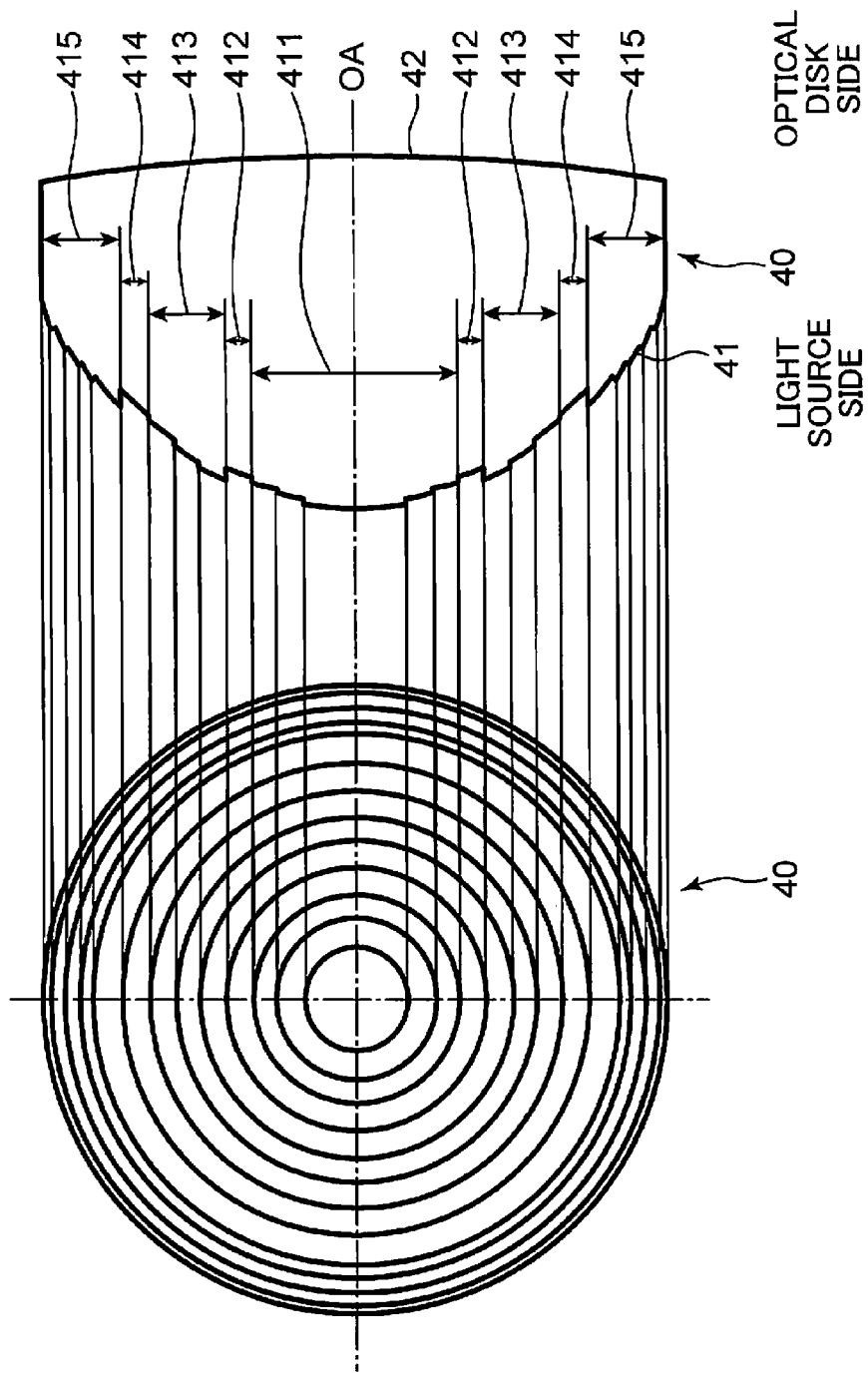
FIG. 13 is a diagram depicting a configuration of an objective lens according to Embodiment 4 of the present invention.

FIG. 13 is a diagram depicting a configuration of an objective lens according to Embodiment 4 of the present invention. The left drawing in FIG. 13 is a schematic plan view depicting a configuration of an objective lens 40 of Embodiment 4, and the right drawing in FIG. 13 is a schematic cross-sectional view depicting the configuration of the objective lens 40 of Embodiment 4.

The objective lens 40 of Embodiment 4 is used as a compatible objective lens which can support the BD for recording or reproducing information using a blue-violet laser beam having a wavelength $\lambda 1$, the DVD for recording or reproducing information using a red laser beam having a wavelength $\lambda 2$ which is longer than the wavelength $\lambda 1$, and the CD for recording or reproducing information using an infrared laser beam having the wavelength $\lambda 3$ which is longer than the wavelength $\lambda 2$.

The objective lens 40 has a spherical surface or an aspherical surface to be a base on an entrance surface 41 on the light source side (side where the laser beam enters). On the spherical surface or the aspherical surface to be a base (hereafter generically called "base aspherical surface"), a zonal diffraction structure is formed with the optical axis OA of the objective lens 40 as the center. An emission surface 42 on the optical disk side (side where the laser beam is emitted) which faces the entrance surface 41 is a spherical surface or an aspherical surface where the diffraction structure is not formed.

The objective lens 40 converges a laser beam emitted from the laser light source on the information recording surface of the information recording medium (optical disk). The objective lens 40 has a mid-circumference area (first area) 413 which has a diffraction structure which is formed on the entrance surface 41 on the laser light source side, a second priority area (second area) 414 which has a diffraction structure which is formed outside the mid-circumference area 413, an outer circumference area (third area) 415 which has a diffraction structure which is formed outside the second priority area 414, a first priority area (fourth area) 412 which has a diffraction structure which is formed inside the mid-circumference area 413, and an inner circumference area (fifth area) 411 which has a diffraction structure which is formed inside the first priority area 412.

The inner circumference area 411 which includes the optical axis OA, the first priority area 412 located on the periphery of the inner circumference area 411, the mid-circumference area 413 located on the periphery of the first priority area 412, the second priority area 414 located on the periphery of the mid-circumference area 413, and the outer circumference area 415 located on the periphery of the second priority area 414 have a different diffraction structure from one another.

The mid-circumference area 413, the outer circumference area 415 and the inner circumference area 411 converge a laser beam having an order of diffraction with which diffraction efficiency is highest, out of the laser beams having the wavelength $\lambda 1$ (390 nm$\leqq \lambda 1 \leqq$430 nm) which are diffracted by the mid-circumference area 413, the outer circumference area 415 and the inner circumference area 411, on an information recording surface of the BD (first information recording medium).

The mid-circumference area 413, the second priority area 414 and the inner circumference area 411 converge a laser beam having an order of diffraction with which diffraction efficiency is highest, out of the laser beams having the wavelength $\lambda 2$ (630 nm$\leqq \lambda 2 \leqq$680 nm) which are diffracted by the mid-circumference area 413, the second priority area 414 and the inner circumference area 411, on an information recording surface of the DVD (second information recording medium).

The first priority area 412 and the inner circumference area 411 converge a laser beam having an order diffraction with which diffraction efficiency is highest, out of the laser beams having the wavelength $\lambda 3$ (750 nm$\leqq \lambda 3 \leqq$810 nm) which are diffracted by the first priority area 412 and the inner circumference area 411, on an information recording surface of the CD (third information recording medium) having a light transmission layer with a thickness t3 which is greater than a thickness t2.

The diffraction efficiency of the laser beam having the wavelength λ2, which is diffracted by the second priority area 414 and converges on the information recording surface of the DVD, is higher than the diffraction efficiency of the laser beam having the wavelength λ1, which is diffracted by the second priority area 414 and converges on the information recording surface of the BD.

The inner circumference area 411 has a diffraction structure in a step profile of which one cycle is seven steps—eight levels, for example, and is a compatible area which can be used for: recording or reproducing a CD using the infrared laser beam having the wavelength λ3, recording or reproducing a DVD using the red laser beam having the wavelength λ2, and recording or reproducing a BD using the blue-violet laser beam having the wavelength λ1. The inner circumference area 411 is designed to converge the plus second order diffracted light of the blue-violet laser beam on the information recording surface of the BD via the light transmission layer with substantially a 0.1 mm thickness, converges the minus second order of diffracted light of the red laser beam on the information recording surface of the DVD via the light transmission layer with substantially a 0.6 mm thickness, and converge the minus third order of diffracted light of the infrared laser beam on the information recording surface of the CD via the light transmission layer with substantially a 1.2 mm thickness. The inner circumference area 411 is an area corresponding to an NA smaller than an NA of the CD (substantially 0.47 to 0.52), such as 0.44.

The first priority area 412 is a priority area used for recording or reproducing the CD with priority. The first priority area 412 is designed so that mainly the infrared laser beam having the wavelength λ3 is converged on the information recording surface of the CD. The first priority area 412 is an area corresponding to the NA of the CD (substantially 0.47 to 0.52).

The mid-circumference area 413 has a diffraction structure in a step profile of which one cycle is three steps—four levels, for example, and is a compatible area which can be used for both recording or reproducing the DVD using the red laser beam having the wavelength λ2, and recording or reproducing the BD using the blue-violet laser beam having the wavelength λ1. The mid-circumference area 413 is designed to converge the plus first order diffracted light of the blue-violet laser beam on the information recording surface of the BD via the light transmission layer with substantially a 0.1 mm thickness, and converges the minus first order diffracted light of the red laser beam on the information recording surface of the DVD via the light transmission layer with substantially a 0.6 mm thickness.

The mid-circumference area 413 is designed so that an aberration is generated in the infrared laser beam having the wavelength λ3, that is the focal point of the focal spot of the infrared laser beam shifts considerably, on the information recording surface of the CD. Therefore the mid-circumference area 413 substantially functions as an aperture stop upon recording or reproducing the CD. The mid-circumference area 413 is an area corresponding to an NA smaller than the NA of the DVD (substantially 0.60 to 0.65), such as 0.57.

The second priority area 414 is a priority area which has a diffraction structure in a serrated profile, and is a priority area which is used for recording or reproducing the DVD with priority. The second priority area 414 is designed so that mainly the red laser beam having the wavelength λ2 is converged on the information recording surface of the DVD. The second priority area 414 is an area corresponding to the NA of the DVD (substantially 0.60 to 0.65).

The NA used when information is recorded on or reproduced from the BD using the blue-violet laser beam (substantially 0.85) is greater than the NA used when information is recorded on or reproduced from the DVD using the red laser beam (substantially 0.60 to 0.65). Therefore the outer circumference area 415 is designed to be a dedicated area for the BD, and to converge only the blue-violet laser beam having the wavelength λ1 on the information recording surface of the BD.

The outer circumference area 415 is designed so that an aberration is generated in the red laser beam having the wavelength λ3 on the information recording surface of the CD, and is designed so that an aberration is generated in the red laser beam having the wavelength λ2 on the information recording surface of the DVD. Therefore the outer circumference area 415 substantially functions as an aperture stop upon recording or reproducing the CD and the DVD.

In other words, the outer circumference area 415 does not converge a laser beam having the wavelength λ2 which passes through the outer circumference area 415 on the information recording surface of the DVD (second information recording medium). The mid-circumference area 413, the second priority area 414 and the outer circumference area 415 do not converge the laser beam having the wavelength λ3 which passes through the mid-circumference area 413, the second priority area 414 and the outer circumference area 415, on the information recording surface of the CD (third information recording medium).

One unit of the step difference of the diffraction structure of the inner circumference area 411 is an amount to generate substantially a 1.25×λ1 [nm] of optical path difference for the blue-violet laser beam having the wavelength λ1 (e.g. λ1=405 nm), and the phase modulation amount is π/2 per step. In this case, the diffraction efficiency of the plus second order diffraction light is substantially 80% based on the scalar calculation, which is highest among the orders of diffraction.

On the other hand, one unit of the step difference of the diffraction structure of the inner circumference area 411 is an amount to generate substantially a 0.75×λ2 [μm] of optical path difference for the red laser beam having the wavelength λ2 (e.g. λ2=660 nm), and the phase modulation amount is −π/2 per step. In this case, the diffraction efficiency of the minus second order diffracted light is substantially 80% based on the scalar calculation, which is highest among the orders of diffraction.

One unit of the step difference of the diffraction structure of the inner circumference area 411 is also an amount to generate substantially a 0.63×λ3 [nm] of optical path difference for the infrared laser beam having the wavelength λ3 (e.g. λ3=780 nm) and the phase modulation amount is −2π/3 per step. In this case, the diffraction efficiency of the minus third order diffracted light is substantially 60% based on the scalar calculation, which is highest among the orders of diffraction.

In other words, the diffraction structure of the inner circumference area 411 has a step profile in cross section. One step of step difference of the step profile of the inner circumference area 411 in cross section generates substantially a 1.25 wavelength optical path difference and power of a convex lens for the laser beam having the wavelength λ1, generates substantially a 0.75 wavelength optical path difference and power of a concave lens for the laser beam having the wavelength λ2, and generates substantially a 0.63 wavelength optical path difference and power of a concave lens for the laser beam having the wavelength λ3. The 1.25 wavelength, the 0.75 wavelength and the 0.63 wavelength include a ±10% error, for example, respectively.

One unit of the step difference of the diffraction structure of the mid-circumference area 413 is an amount to generate substantially a 1.25×λ1 [nm] of optical path difference for the blue-violet laser beam having the wavelength λ1 (e.g. λ1=405 nm) and the phase modulation amount is π/2 per step. In this case, the diffraction efficiency of the plus first order diffracted light is substantially 80% based on the scalar calculation, which is highest among the orders of diffraction.

On the other hand, one unit of the step difference of the diffraction structure of the mid-circumference area 413 is an amount to generate substantially a 0.75×λ2 [nm] optical path difference for the red laser beam having the wavelength λ2 (e.g. λ2=660 nm) and the phase modulation amount is −π/2 per step. In this case, the diffraction efficiency of the minus first order diffracted light is substantially 80% based on the scalar calculation, which is highest among the orders of diffraction.

In other words, the diffraction structure of the mid-circumference area 413 has a step profile in cross section. One step of step difference of the step profile of the mid-circumference area 413 in cross section generates substantially a 1.25 wavelength optical path difference and power of a convex lens for the laser beam having the wavelength λ1, and generates substantially a 0.75 wavelength optical path difference and power of a concave lens for the laser beam having the wavelength λ2. The 1.25 wavelength and the 0.75 wavelength include a ±10% error, for example, respectively.

If the inner circumference area 411 has this diffraction structure, serrated profiles in substantially opposite directions can be generated between the wavelength λ1 and the wavelength λ3, and if the mid-circumference area 413 has this diffraction structure, serrated profile in substantially opposite directions can be generated between the wavelength λ1 and the wavelength λ2, therefore compatible recording or compatible reproduction can be implemented, with high light utilization efficiency, for the CD having the light transmission layer with substantially a 1.2 mm thickness, the DVD having the light transmission layer with substantially a 0.6 mm thickness, and the BD having the light transmission layer with substantially a 0.1 mm thickness.

According to the objective lens 40 of Embodiment 4, as FIG. 13 illustrates, the first priority area 412 is a priority area for the CD, and has a diffraction structure in a serrated profile, optimized with the wavelength λ3, and the second priority area 414 is a priority area for the DVD, and has a diffraction structure in a serrated profile, optimized with the wavelength λ2. The diffraction structure of the first priority area 412 has a serrated profile in cross section, and generates a less than 0.5 wavelength optical path difference and power of a concave lens for the laser beam having the wavelength λ3. The diffraction structure of the second priority area 414 has a serrated profile in cross section and generates a less than 0.5 wavelength optical path difference and power of a concave lens for the laser beam having the wavelength λ2.

The outer circumference area 415 is a dedicated area for the BD, and has a diffraction structure in a serrated profile, optimized with the wavelength λ1. The diffraction structure of the outer circumference area 415 has a serrated profile in cross section and generates a less than 0.5 wavelength optical path difference and power of a convex lens for the laser beam having the wavelength λ1.

As described above, according to the objective lens 40 of Embodiment 4, the first priority area 412 is a priority are for the CD, where the diffraction structure in a serrated profile is optimized to converge the plus first order diffracted light of the red laser beam having the wavelength λ3 on the information recording surface of the CD, hence the diffraction efficiency for the infrared laser beam having the wavelength λ3 is 70% or more in almost all the areas of the first priority area 412. Therefore the difference between the diffraction efficiency for the infrared laser beam having the wavelength λ3 in a position near the optical axis in the inner circumference area 411 and the diffraction efficiency for the infrared laser beam having the wavelength λ3 in the first priority area 412 is substantially small, and deterioration of the focal spot on the information recording surface of the CD can be suppressed.

In this case, the diffraction efficiency of the 0 order diffracted light, which is optimum to converge the red laser beam having the wavelength λ2 on the information recording surface of the DVD, drops down to substantially 2%, for example. In the red laser beam having the wavelength λ2, the plus first order diffracted light with which the diffraction efficiency is highest has an aberration with respect to the information recording surface of the DVD, and a flare is generated.

The first priority area 412 does not converge a laser beam having an order of diffraction with which diffraction efficiency is highest, out of the laser beams having the width λ2 which are diffracted by the first priority area 412, on the information recording surface of the DVD (second information recording medium), and converges a laser beam having an order of diffraction which is different from the order of diffraction with which diffraction efficiency is highest, out of the laser beams having the wavelength λ2 which are diffracted by the first priority area 412, on the information recording surface of the DVD (second information recording medium).

The second priority area 414 is a priority area for the DVD, and in the second priority area 414, a diffraction structure in a serrated profile, optimized to converge the plus first order diffracted light of the red laser beam having the wavelength λ2 on the information recording surface of the DVD, is formed. Hence the diffraction efficiency for the red laser beam having the wavelength λ2 is 70% or more in almost all areas of the second priority area 414. Therefore the difference between the diffraction efficiency for the red laser beam having the wavelength λ2 in a position near the optical axis in the inner circumference area 411, and the diffraction efficiency for the red laser beam having the wavelength λ2 in the second priority area 414 is substantially small, and deterioration of the focal spot on the information recording surface of the DVD can be suppressed.

In this case, the diffraction efficiency of the minus first order diffracted light, which is optimum to converge the blue-violet laser beam having the wavelength λ1 on the information recording surface of the BD, drops down to substantially 1%, for example. In the blue-violet laser beam having the wavelength λ1, the plus second order diffracted light with which the diffraction efficiency is highest has an aberration with respect to the information recording surface of the BD, and a flare is generated.

The second priority area 414 and the first priority area 412 do not converge a laser beam having an order of diffraction with which diffraction efficiency is highest, out of the laser beams having the wavelength λ1 which are diffracted by the second priority area 414 and the first priority area 412, on the information recording surface of the BD (first information recording medium), and converges a laser beam having an order of diffraction which is different from the order of diffraction with which diffraction efficiency is highest, out of the laser beams having the wavelength λ1 which are diffracted by the second priority area 414 and the first priority area 412, on the information recording surface of the BD (first information recording medium).

Furthermore according to the objective lens 40 of Embodiment 4, the outer circumference area 415 is a dedicated area for the BD, where the diffraction structure in a serrated profile optimized with the blue-violet laser beam having the wavelength λ1 is formed, hence the diffraction efficiency for the blue-violet laser beam having the wavelength λ1 is 70% or more in almost all the areas of the outer circumference area 415. Therefore the difference between the diffraction efficiency for the blue-violet laser beam having the wavelength λ1 in a position near the optical axis in the inner circumference area 411 and the diffraction efficiency for the blue-violet laser beam having the wavelength λ1 in the outer circumference area 415 is substantially small, and deterioration of the focal spot on the information recording surface of the BD can be suppressed.

Furthermore the objective lens 40 of Embodiment 4 can also allow recording or reproducing the CD using the infrared laser beam, which is a remarkable effect.

The point of the present invention is: the first priority area 412, where the diffraction structure giving priority to the diffraction efficiency of the infrared laser beam is formed, is included in order to suppress a drop of diffraction efficiency in a position near the outermost circumference of the inner circumference area 411 upon recording or reproducing the CD; the diffraction efficiency of the red laser beam for recording or reproducing information on or from the DVD and the diffraction efficiency of the blue laser beam for recording or reproducing information on or from the BD are not zero in the first priority area 412; the second priority area 414, where the diffraction structure giving priority to the diffraction efficiency of the red laser beam is formed, is included in order to suppress a drop of diffraction efficiency in a position near the outermost circumference of the mid-circumference area 413 upon recording or reproducing the DVD; and the diffraction efficiency of the blue laser beam for recording or reproducing information on or from the BD is not zero in the first priority area 412.

Therefore the configuration where the diffraction structure, with which the diffraction efficiency of the infrared laser beam becomes higher than the diffraction efficiency of the red laser beam and the blue laser beam, is formed in the first priority area 412, and the diffraction structure, with which the diffraction efficiency of the red laser beam becomes higher than the diffraction efficiency of the infrared laser beam and the blue laser beam, is formed in the second priority area 414, is also included in the scope of the present invention.

In other words, the diffraction efficiency of the laser beam having the wavelength λ3, which is diffracted by the first priority area 412 and converges on the information recording surface of the CD (third information recording medium), is higher than the diffraction efficiency of the laser beam having the wavelength λ2 which is diffracted by the first priority area 412 and converges on the information recording surface of the DVD (second information recording medium).

If the pitch of the diffraction structure is relatively large and the inclination angle of the base aspherical surface of the entrance surface 41 is small in a position near the outermost circumference of the inner circumference area 411, the diffraction efficiency in a position near the outermost circumference of the inner circumference area 411 does not drop much, therefore the first priority area 412, which is a priority area for the CD, need not be formed.

Figure 14:
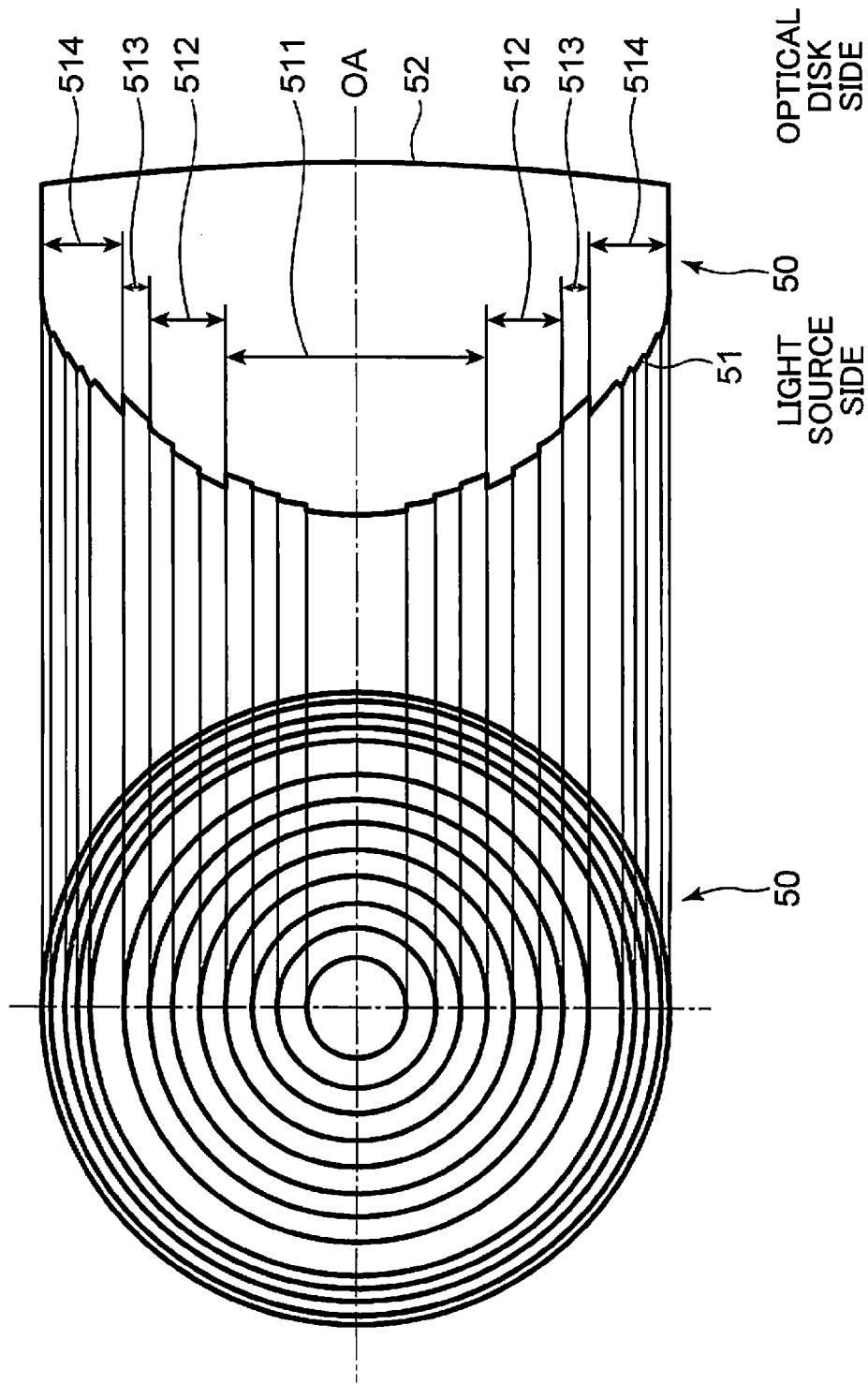
FIG. 14 is a diagram depicting a configuration of an objective lens according to a variant form of Embodiment 4 of the present invention.

For example, FIG. 14 illustrates an objective lens according to a variant form of Embodiment 4. FIG. 14 is a diagram depicting a configuration of an objective lens according to a variant form of Embodiment 4. The left drawing in FIG. 14 is a schematic plan view depicting a configuration of an objective lens 50 of the variant form of Embodiment 4, and the right drawing in FIG. 14 is a schematic cross-sectional view depicting the configuration of the objective lens 50 of the variant form of Embodiment 4.

The objective lens 50 has a spherical surface or an aspherical surface to be a base on an entrance surface 51 on the light source side (side where the laser beam enters). On the spherical surface or the aspherical surface to be a base (hereafter generically called "base aspherical surface"), a zonal diffraction structure is formed with the optical axis OA of the objective lens 50 as the center. An emission surface 52 on the optical disk side (side where the laser beam is emitted), which faces the entrance surface 51, is a spherical surface or an aspherical surface where the diffraction structure is not formed.

The objective lens 50 converges a laser beam emitted from the laser light source on the information recording surface of the information recording medium (optical disk). The objective lens 50 has a mid-circumference area (first area) 512 which has a diffraction structure which is formed on the entrance surface 51 on the laser light source side, a priority area (second area) 513 which has a diffraction structure which is formed outside the mid-circumference area 512, an outer circumference area (third area) 514 which has a diffraction structure which is formed outside the priority area 513, and an inner circumference area (fourth area) 511 which has a diffraction structure which is formed inside the mid-circumference area 512.

The inner circumference area 511 which includes the optical axis OA, the mid-circumference area 512 located on the periphery of the inner circumference area 511, the priority area 513 located on the periphery of the mid-circumference area 512, and the outer circumference area 514 located on the periphery of the priority area 513 have a different diffraction structure from one another.

The mid-circumference area 512, the outer circumference 514 and the inner circumference area 511 converge a laser beam having an order of diffraction with which diffraction efficiency is highest, out of the laser beams having the wavelength λ1 ($390 \text{ nm} \leq \lambda1 \leq 430 \text{ nm}$) which are diffracted by the mid-circumference area 512, the outer circumference area 514 and the inner circumference area 511, on an information recording surface of the BD (first information recording medium).

The mid-circumference area 512, the priority area 513 and the inner circumference area 511 converge a laser beam having an order of diffraction with which diffraction efficiency is highest, out of the laser beams having the wavelength λ2 ($630 \text{ nm} \leq \lambda2 \leq 680 \text{ nm}$) which are diffracted by the mid-circumference area 512, the priority area 513 and the inner circumference area 511, on an information recording surface of the DVD (second information recording medium).

The inner circumference area 511 converges a laser beam having an order of diffraction with which diffraction efficiency is highest, out of the laser beams having the wavelength λ3 ($750 \text{ nm} \leq \lambda3 \leq 810 \text{ nm}$) which are diffracted by the inner circumference area 511, on an information recording surface of the CD (third information recording medium) having a light transmission layer with the thickness t3 which is greater than the thickness t2.

The diffraction efficiency of the laser beam having the wavelength λ2, which is diffracted by the priority area 513 and converges on the information recording surface of the DVD, is higher than the diffraction efficiency of the laser beam having the wavelength λ1, which is diffracted by the priority area 513 and converges on the information recording surface of the BD.

The inner circumference area 511 has a diffraction structure in a step profile of which one cycle is seven steps—eight levels, for example, in a compatible area which can be used for: recording or reproducing a CD using the infrared laser beam having the wavelength λ3, recording or reproducing a DVD using the red laser beam having the wavelength λ2, and recording or reproducing a BD using the blue-violet laser beam having the wavelength λ1. The inner circumference area 511 is designed to converge the plus second order diffracted light of the blue-violet laser beam on the information recording surface of the BD via the light transmission layer with substantially a 0.1 mm thickness, converge the minus second order of diffracted light of the red laser beam on the information recording surface of the DVD via the light transmission layer with substantially a 0.6 mm thickness, and converge the minus third order of diffracted light of the infrared laser beam on the information recording surface of the CD via the light transmission layer with substantially a 1.2 mm thickness. The linear circumference area 511 is an area corresponding to the NA of the CD (substantially 0.47 to 0.52).

The mid-circumference area 512 has a diffraction structure in a step profile of which one cycle is three step-four levels, for example, and is a compatible area which can be used for both recording or reproducing the DVD using the red laser beam having the wavelength λ2, and recording or reproducing the BD using the blue-violet laser beam having the wavelength λ1. The mid-circumference area 512 is designed to converge the plus first order diffracted light of the blue-violet laser beam on the information recording surface of the BD via the light transmission layer with substantially a 0.1 mm thickness, and converges the minus first order diffracted light of the red laser beam on the information recording surface of the DVD via the light transmission layer with substantially a 0.6 mm thickness.

The mid-circumference area 512 is designed so that an aberration is generated in the infrared laser beam having the wavelength λ3, that is the focal point of the focal spot of the infrared laser beam shifts considerably on the information recording surface of the CD. Therefore the mid-circumference area 512 substantially functions as an aperture stop upon recording or reproducing the CD. The mid-circumference area 512 is an area corresponding to an NA smaller than the NA of the DVD (substantially 0.60 to 0.65), such as 0.57.

The priority area 513 is a priority area which has a diffraction structure in a serrated profile, and is a priority area which is used for recording or reproducing the DVD with priority. The priority area 513 is designed so that mainly the red laser beam having the wavelength λ2 is converged on the information recording surface of the DVD. This priority area 513 is an area corresponding to the NA of the DVD (substantially 0.60 to 0.65).

The NA used when information is recorded on or reproduced from the BD using the blue-violet laser beam (substantially 0.85) is greater than an NA used when information is recorded on or reproduced from the DVD using the red laser beam (substantially 0.60 to 0.65). Therefore the outer circumference area 514 is designed to be a dedicated area for the BD, and to converge only the blue-violet laser beam having the wavelength λ1 on the information recording surface of the BD.

The outer circumference area 514 is designed so that an aberration is generated in the infrared laser beam having the wavelength λ3 on the information recording surface of the CD, and is also designed so that an aberration is generated in the red laser beam having the wavelength λ2 on the information recording surface of the DVD. Therefore the outer circumference area 514 substantially functions as an aperture stop upon recording or reproducing the CD and the DVD.

In other words, the outer circumference area 514 does not converge a laser beam having the wavelength λ2 which passes through the outer circumference area 514 on the information recording surface of the DVD (second information recording medium). The mid-circumference area 512, the priority area 513 and the outer circumference area 514 do not converge the laser beam having the wavelength λ3 which passes through the mid-circumference area 512, the priority area 513 and the outer circumference area 514, on the information recording surface of the CD (third information recording medium).

The diffraction structure formed in the inner circumference area 511 has a step profile in cross section. One step of step difference of the step profile of the inner circumference area 511 in cross section generates substantially a 1.25 wavelength optical path difference and power of a convex lens for the laser beam having the wavelength λ1, generates substantially a 0.75 wavelength optical path difference and power of a concave lens for the laser beam having the wavelength λ2, and generates substantially a 0.63 wavelength optical path difference and power of a concave lens for the laser beam having the wavelength λ3. The 1.25 wavelength, the 0.75 wavelength and the 0.63 wavelength include a ±10% error, for example, respectively.

The diffraction structure of the mid-circumference area 512 has a step profile in cross section. One step of step difference of the step profile in cross section of the mid-circumference area 512 generates substantially a 1.25 wavelength optical path difference and power of a convex lens for the laser beam having the wavelength λ1, and generates substantially a 0.75 wavelength optical path difference and power of a concave lens for the laser beam having the wavelength λ2. The 1.25 wavelength and the 0.75 wavelength include a ±10% error, for example, respectively.

The diffraction structure of the priority area 513 has a serrated profile in cross section, and generates a less than 0.5 wavelength optical path difference and power of a concave lens for the laser beam having the wavelength λ2. The diffraction structure of the outer circumference area 514 has a serrated profile in cross section, and generates a less than 0.5 wavelength optical path difference and power of a convex lens for the laser beam having the wavelength λ1.

As described above, according to the objective lens 50 of the variant form of Embodiment 4, the priority area 513 is a priority area for the DVD, and in the priority area 513, the diffraction structure in a serrated profile, optimized to converge the plus first order diffracted light of the red laser beam having the wavelength λ2 on the information recording surface of the DVD, is formed. Hence the diffraction efficiency for the red laser beam having the wavelength λ2 is 70% or more in almost all the areas of the priority area 513. Therefore the difference between the diffraction efficiency for the red laser beam having the wavelength λ2 in a position near the optical axis in the inner circumference area 511 and the diffraction efficiency for the red laser beam having the wavelength λ2 in the priority area 513 is substantially small, and deterioration of the focal spot on the information recording surface of the DVD can be suppressed.

In this case, the diffraction efficiency of the minus first order diffracted light, which his optimum to converge the blue-violet laser beam having the wavelength λ1 on the information recording surface of the BD, drops down to substantially 1%, for example. In the blue-violet laser beam having the wavelength λ1, the plus second order diffracted light with which the diffraction efficiency is highest has an aberration with respect to the information recording surface of the BD, and a flare is generated.

The priority area 513 does not converge a laser beam having an order of diffraction with which diffraction efficiency is highest, out of the laser beams having the wavelength λ1 which are diffracted by the priority area 513, on the information recording surface of the BD (first information recording medium), and converges a laser beam having an order of diffraction which is different from the order of diffraction with which diffraction efficiency is highest, out of the laser beams having the wavelength λ1 which are diffracted by the priority area 513, on the information recording surface of the BD (first information recording medium).

Furthermore according to the objective lens 50 of the variant form of Embodiment 4, the outer circumference area 514 is a dedicated area for the BD, where the diffraction structure in the serrated profile, optimized with the blue-violet laser beam having the wavelength λ1 is formed, hence the diffraction efficiency for the blue-violet laser beam having the wavelength λ1 is 70% or more in almost all the areas of the outer circumference area 514. Therefore the difference between the diffraction efficiency for the blue-violet laser beam having the wavelength λ1 in a position near the optical axis in the inner circumference area 511 and the diffraction efficiency for the blue-violet laser beam having the wavelength λ1 in the outer circumference area 514 is substantially small, and deterioration of the focal spot on the information recording surface of the BD can be suppressed.

Furthermore the objective lens 50 of the variant form of Embodiment 4 can also allow recording or reproducing the CD using the infrared laser beam, which is a remarkable effect.

The point of the present invention is that the priority area 513, where the diffraction structure, giving priority to the diffraction efficiency of the red laser beam, is formed, is included in order to suppress a drop of diffraction efficiency in a position near the outermost circumference of the mid-circumference area 512 upon recording or reproducing the DVD, and that the diffraction efficiency of the blue laser beam for recording or reproducing information on or from the BD is not zero in the priority area 513.

Therefore the configuration, where the diffraction structure with which the diffraction efficiency of the red laser beam becomes higher than the diffraction efficiency of the blue laser beam is formed in the priority area 513, is also included in the scope of the present invention.

Furthermore the diffraction structure formed in the compatible objective lens is not limited to the configuration described in Embodiment 4 and the variant form of Embodiment 4, but the case of forming the inner circumference areas 411 and 511, the first priority area 412, the mid-circumference areas 413 and 512, the second priority area 414, the priority area 513 and the outer circumference areas 415 and 514 to have a serrated profile respectively, is clearly within the scope of the present invention.

In Embodiment 4 and the variant form of Embodiment 4, the diffraction structures of the second priority area 414 and the priority area 513 may be a diffraction structure in a step profile, which is the same as the mid-circumference area 112 of Embodiment 1.

(Embodiment 5)

Figure 15:
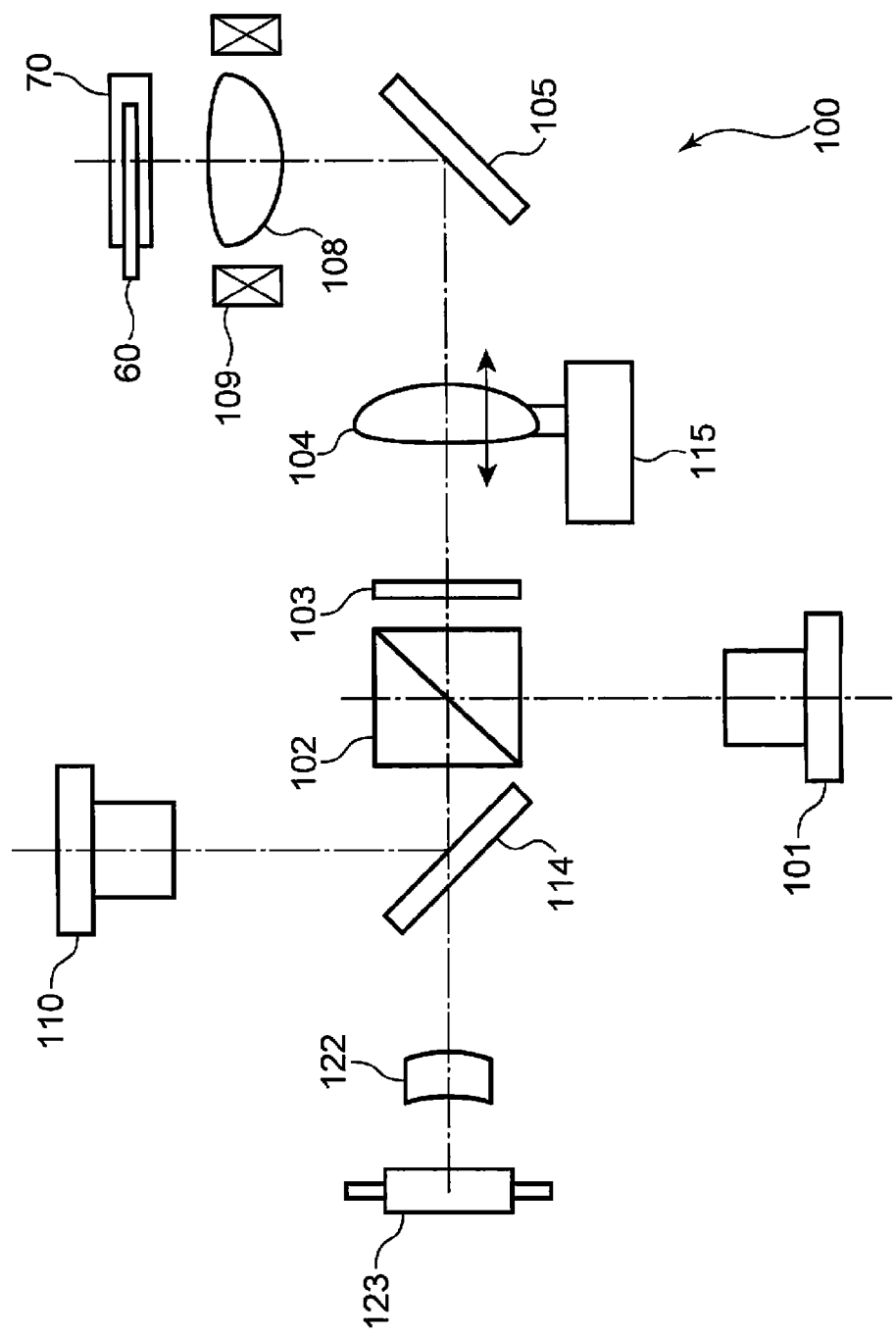
FIG. 15 is a diagram depicting a schematic configuration of an optical head according to Embodiment 5 of the present invention.

FIG. 15 is a diagram depicting a schematic configuration of an optical head according to Embodiment 5 of the present invention.

In FIG. 15, the optical head 100 has a blue-violet laser light source 101 which emits a blue-violet laser beam, a polarization beam splitter 102, a ¼ wavelength plate 103, a collimator lens 104, a mirror 105, an objective lens 108, an objective lens actuator 109, a red laser light source 110, a plane beam splitter 114, a collimator lens actuator 115, a detection lens 122 and a light receiving element (light receiving unit) 123. For the BD 60, information is recorded or reproduced by a blue-violet laser beam, and for the DVD 70, information is recorded or reproduced by a red laser beam.

The blue-violet laser light source 101 emits a blue-violet laser beam having a wavelength λ1 (390 nm≦λ1≦430 nm). The red laser light source 110 emits a red laser beam having a wavelength λ2 (630 nm≦λ2≦680 nm).

The objective lens 108 converges the blue-violet laser beam emitted from the blue-violet laser light source 101 on the information recording surface of the BD 60 (first information recording medium), and converges the red laser beam emitted from the red laser light source 110 on the information recording surface of the DVD 70 (second information recording medium). The light receiving element 123 receives the laser beam reflected by the BD 60 or the DVD 70.

First the operation of the optical head 100, when information is recorded on or reproduced from the BD 60, will be described. The blue-violet laser beam having a substantially 405 nm wavelength emitted from the blue-violet laser light source 101 enters the polarization beam splitter 102 as an S-polarized light. The blue-violet laser beam reflected by the polarization beam splitter 102 is transformed into a circularly polarized light by the ¼ wavelength plate 103, and is then transformed into parallel rays by the collimator lens 104. The blue-violet laser beam transformed into parallel rays is reflected by the mirror 105, whereby the optical axis is diffracted. The blue-violet laser beam reflected by the mirror 105 is converted on the information recording surface of the BD 60 as a light spot by the objective lens 108.

The blue-violet laser beam reflected by the information recording surface of the BD 60 transmits through the objective lens 108 again, and is reflected by the mirror 105. The blue-violet laser beam reflected by the mirror 105 transmits through the collimator lens 104, and is then transformed into a linearly polarized light, which is different from that by the previous transformation, by the ¼ wavelength plate 103. Then the blue-violet laser beam enters the polarization beam splitter 102 and the plane beam splitter 114 as a P-polarized light. The blue-violet laser beam transmitted through the polarization beam splitter 102 and the plane beam splitter 114 is guided to the light receiving element 123 via the detection lens 122. The light receiving element 123 performs photoelectric conversion on the detected blue-violet laser beam, and generates a focus error signal for following up the surface moving of the BD 60 and a tracking error signal for following up the decentering of the BD 60.

Now the operation of the optical head 100, when information is recorded on or reproduced from the DVD 70, will be described. The red laser beam having the substantially 660 nm wavelength emitted from the red laser light source 110 enters the plane beam splitter 114 as S-polarized light. The red laser beam reflected by the plane beam splitter 114 transmits through the polarization beam splitter 102, and is transformed into a circularly polarized light by the ¼ wavelength plate 103, and is then transformed into parallel rays by a collimator lens 104. The red laser beam transformed into parallel rays is reflected by the mirror 105, whereby the optical axis is diffracted. The red laser beam reflected by the mirror 105 is converged on the information recording surface of the DVD 70, by the objective lens 108, as a light spot.

The red laser beam reflected by the information recording surface of the DVD 70 transmits through the objective lens 108 again, and is reflected by the mirror 105. The red laser beam reflected by the mirror 105 transmits through the collimator lens 104, and is transformed into a linearly polarized light, which is different from that of the previous transformation, by the ¼ wavelength plate 103. Then the red laser beam enters the polarization beam splitter 102 and the plane beam splitter 114 as a P-polarized light. The red laser beam transmitted through the polarization beam splitter 102 and the plane beam splitter 114 is guided to the light receiving element 123 via the detection lens 122. The light receiving element 123 performs photoelectric conversion on the detected red laser beam, and generates a focus error signal for following up the surface moving of the DVD 70 and a tracking error signal for following up the decentering of the DVD 70.

The objective lens 108 used for the optical head 100 of Embodiment 5 is one of the objective lenses 10, 20, 30, 40 and 50 described in Embodiment 1 to Embodiment 4.

In the objective lens 10 described in Embodiment 1, the mid-circumference area 112 is a priority area for the DVD, therefore deterioration of the focal spot on the information recording surface of the DVD can be suppressed.

Furthermore in the objective lens 10 described in Embodiment 1, the outer circumference area 113 is a dedicated area for the BD, and the diffraction structure in the serrated profile, optimized with the blue-violet laser beam having the wavelength $\lambda 1$, is formed, therefore deterioration of the focal spot on the information recording surface of the BD can also be suppressed.

In the objective lenses 20 and 30 described in Embodiment 2 or Embodiment 3, the mid-circumference area 212 or 312 is a priority area for the DVD, and the diffraction structure in the serrated profile, optimized with the red laser beam having the wavelength $\lambda 2$, is formed, therefore deterioration of the focal spot on the information recording surface of the DVD can be suppressed.

Furthermore in the objective lenses 20 and 30 described in Embodiment 2 or Embodiment 3, the outer circumference area 213 or 313 is a dedicated area for the BD, and the diffraction structure in the serrated profile, optimized with the blue-violet laser beam having the wavelength $\lambda 1$, is formed, therefore deterioration of the focal spot on the information recording surface of the BD can also be suppressed.

As described above, the optical head 100 of Embodiment 5 can ideally record or reproduce information on or from the BD and DVD respectively.

The red laser light source 110 of the optical head 100 of Embodiment 5 may be a two-wavelength laser light source which emits a red laser beam and an infrared laser beam, and the objective lens 108 may be either one of the objective lenses 40 and 50 described in Embodiment 4. In this case, information can ideally be recorded on or reproduced from the BD, the DVD and a CD respectively.

(Embodiment 6)

Figure 16:
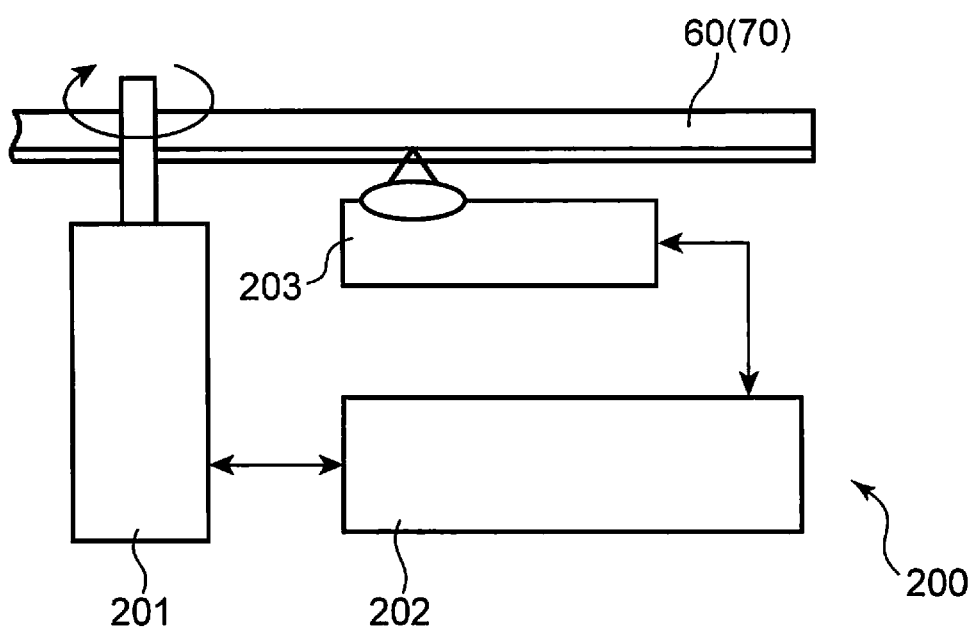
FIG. 16 is a diagram depicting a schematic configuration of an optical disk apparatus according to Embodiment 6 of the present invention.

FIG. 16 is a diagram depicting a schematic configuration of an optical disk apparatus according to Embodiment 6 of the present invention.

In FIG. 16, the optical disk apparatus 200 has an optical disk drive unit 201, a control unit 202 and an optical head 203.

The optical disk drive unit 201 rotates the BD 60 (for the DVD 70). The optical head 203 is the optical head 100 described in Embodiment 5. The control unit 202 controls the driving of the optical disk drive unit 201 and the optical head 203, and performs signal processing for a control signal and an information signal which were computed when photoelectric conversion was performed by the optical head 203. The control unit 202 also has a function to interface with an information signal between the inside and the outside of the optical disk apparatus 200.

The control unit 202 receives a control signal obtained by the optical head 203, and performs focus control, tracking control, information reproduction control and rotation control for the optical disk drive unit 201 based on the control signal. The control unit 202 also reproduces information from an information signal, and transmits a recording signal to the optical head 203.

The optical disk apparatus 200, which includes the optical head 100 described in Embodiment 5, can ideally record or reproduce information on or from the BD 60 and the DVD 70. Furthermore the optical disk apparatus 200 can also ideally record or reproduce information on or from the BD, the DVD and the CD respectively.

(Embodiment 7)

Figure 17:
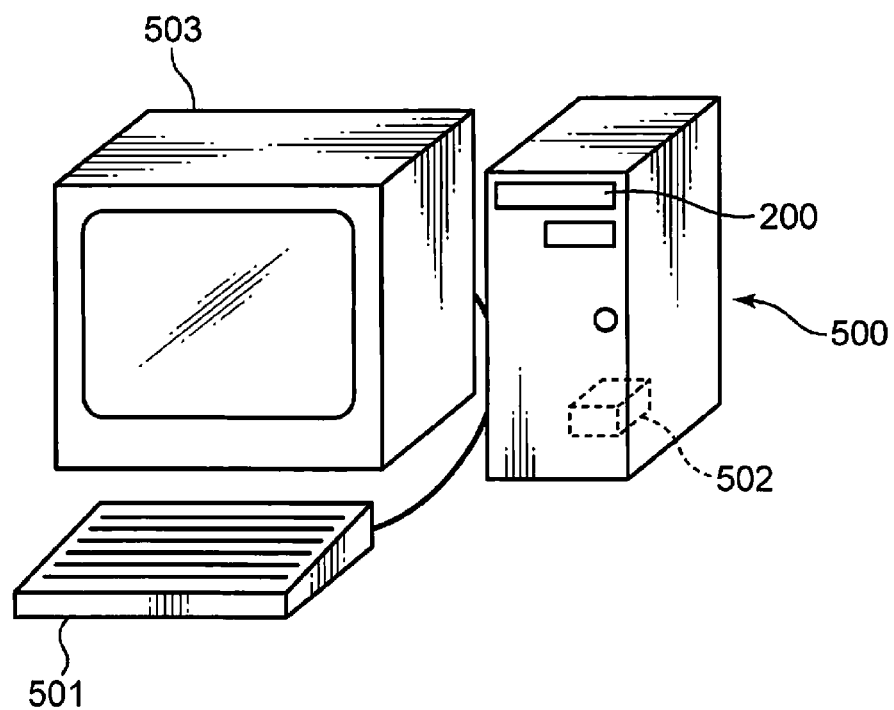
FIG. 17 is a diagram depicting a schematic configuration of a computer according to Embodiment 7 of the present invention.

FIG. 17 is a diagram depicting a schematic configuration of a computer according to Embodiment 7 of the present invention.

In FIG. 17, the computer 500 has the optical disk apparatus 200 of Embodiment 6, an input apparatus 501 for inputting information, such as a keyboard, a mouse and a touch panel, a computing unit 502, such as a central processing unit (CPU) which performs computing based on the information input from the input apparatus 501 and information read from the optical disk apparatus 200, and an output apparatus 503 such as a cathode ray tube or liquid crystal display which displays information such as a computing result by the computing unit 502 or a printer for printing out information.

In Embodiment 7, the computer 500 corresponds to an example of the information processing apparatus, and the computing unit 502 corresponds to an example of the information processing unit.

The computer 500, which includes the optical disk apparatus 200 of Embodiment 6, can ideally record or reproduce information on or from the BD and the DVD, and can therefore be used for a wide range of applications. Furthermore the computer 500 can also ideally record or reproduce information on or from the BD, the DVD and the CD respectively, and can therefore be used for an even wider range of applications.

(Embodiment 8)

Figure 18:
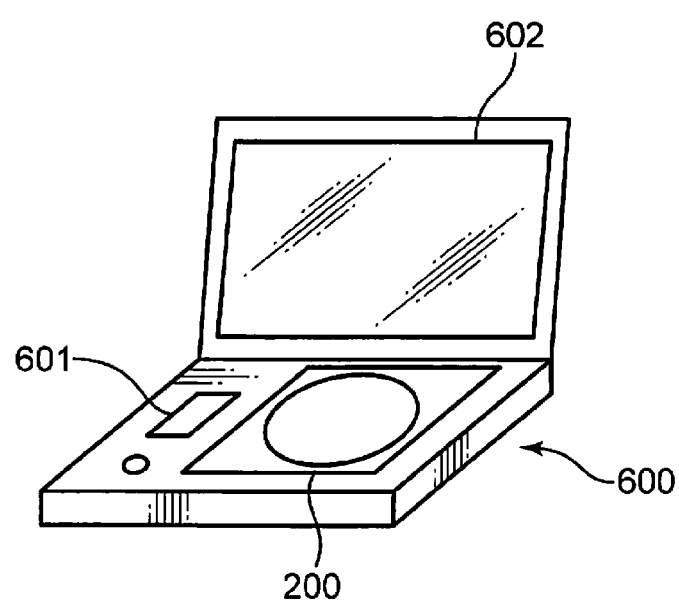
FIG. 18 is a diagram depicting a schematic configuration of an optical disk player according to Embodiment 8 of the present invention.

FIG. 18 is a diagram depicting a schematic configuration of an optical disk player according to Embodiment 8 of the present invention.

In FIG. 18, the optical disk player 600 has the optical disk apparatus 200 of Embodiment 6, and a decoder 601, which converts an information signal obtained from the optical disk apparatus 200 into an image signal.

The optical disk player 600 can also be used as a car navigation system by adding a position sensor, such as a GPS (Global Positioning System), and a central processing unit (CPU). The optical disk player 600 may include a display apparatus 602, such as a liquid crystal monitor.

In Embodiment 8, the optical disk player 600 corresponds to an example of the information processing apparatus, and the decoder 601 corresponds to an example of the information processing apparatus.

The optical disk player 600, which includes the optical disk apparatus 200 of Embodiment 6, can ideally record or reproduce information on or from the BD or the DVD, and can therefore be used for a wide range of applications. Furthermore the optical disk player 600 can also ideally record or reproduce information on or from the BD, the DVD and the CD respectively, and can therefore be used for an even wider range of applications.

(Embodiment 9)

Figure 19:
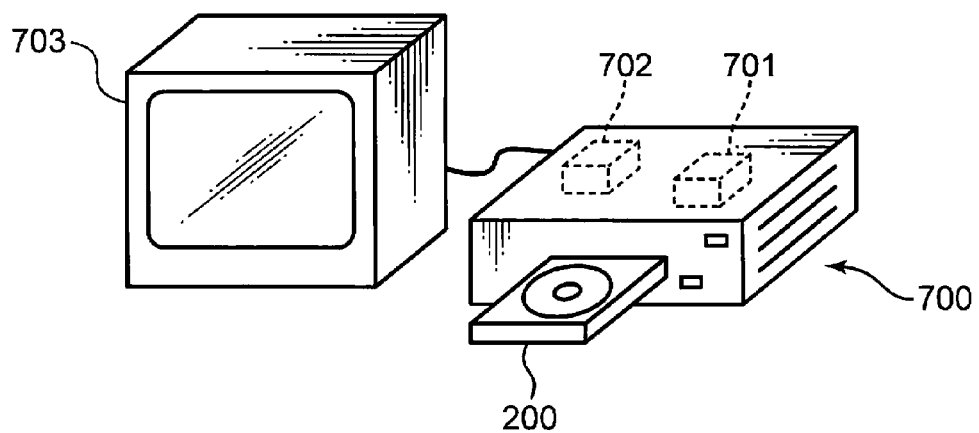
FIG. 19 is a diagram depicting a schematic configuration of an optical disk recorder according to Embodiment 9 of the present invention.

FIG. 19 is a diagram depicting a schematic configuration of an optical disk recorder according to Embodiment 9 of the present invention.

In FIG. 19, the optical disk recorder 700 has the optical disk apparatus 200 of Embodiment 6, and an encoder 701 which converts image information into an information signal for the optical disk apparatus 200 to record on an optical disk. It is preferable that the optical disk recorder 700 further has a decoder 702 for converting the information signal obtained by the optical disk apparatus 200 into image information, then the recorded image can be reproduced. The optical disk recorder 700 may have an output apparatus 703, including a cathode ray tube or a liquid crystal display which display information, or a printer which prints out information.

In Embodiment 9, the optical disk recorder 700 corresponds to an example of the information processing apparatus, and the encoder 701 and the decoder 702 correspond to an example of the information processing unit.

The optical disk recorder 700, which includes the optical disk apparatus 200 of Embodiment 6, can ideally record or reproduce information on or from the BD and the DVD, and therefore can be used for a wide range of applications. Furthermore the optical disk recorder 700 can also ideally record or reproduce information on or from the BD, the DVD and the CD respectively, and can be used for an even wider range of applications.

(Embodiment 10)

Figure 20:
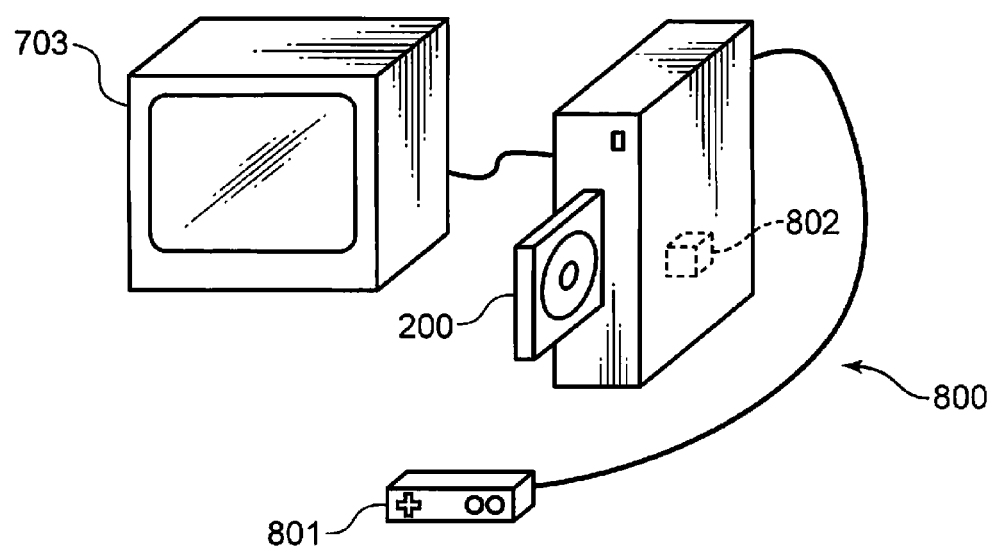
FIG. 20 is a diagram depicting a schematic configuration of a game apparatus according to Embodiment 10 of the present invention.
Figure 21:
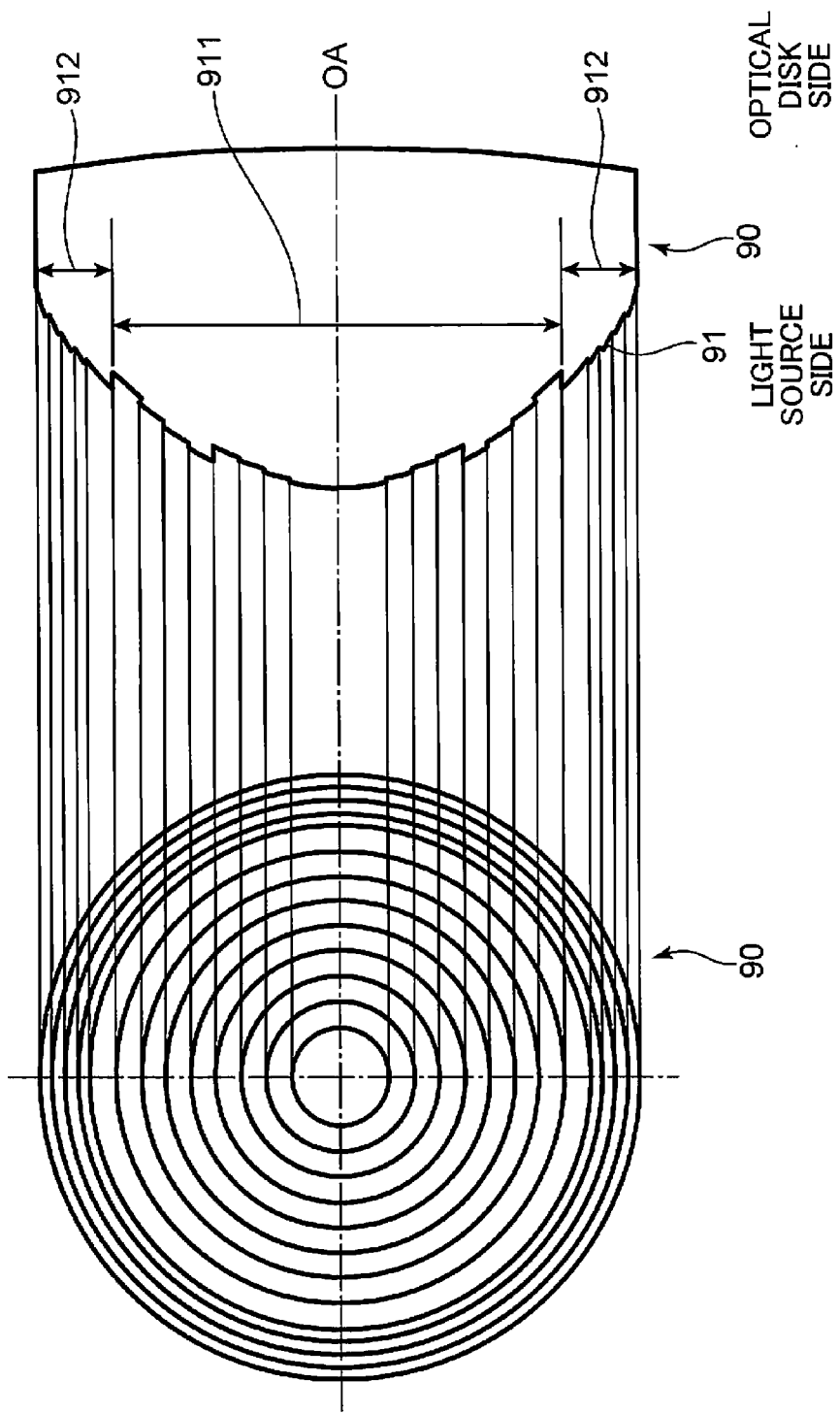
FIG. 21 is a diagram depicting the configuration of a conventional objective lens.
Figure 22:
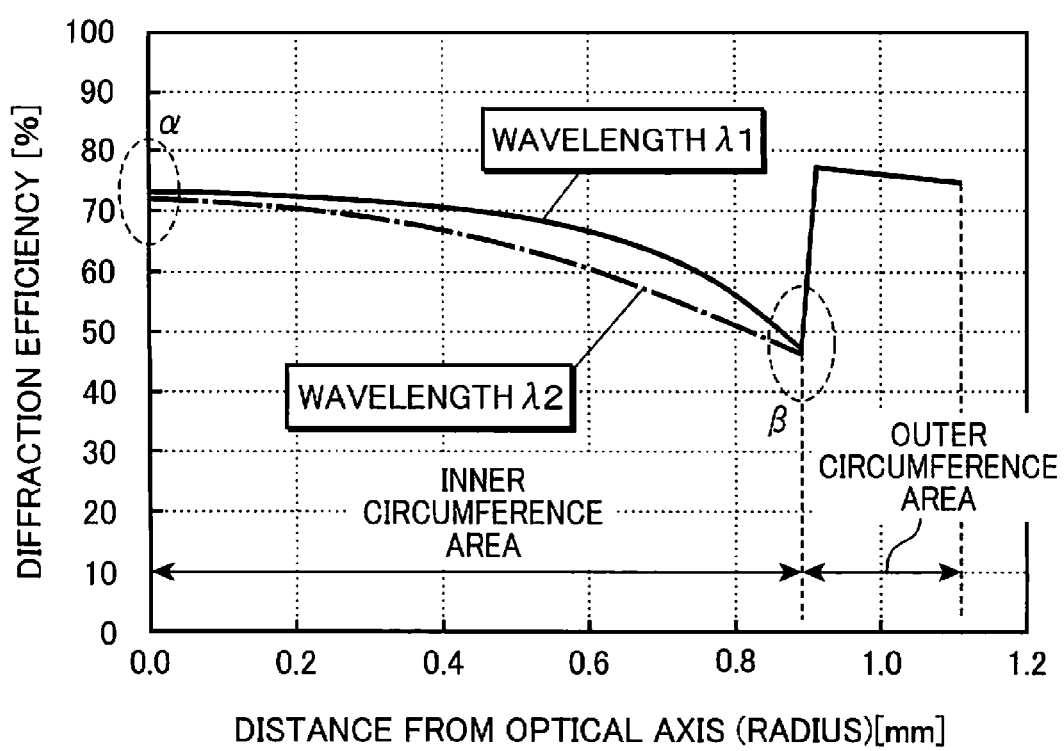
FIG. 22 is a diagram depicting the diffraction efficiency of a conventional objective lens.

FIG. 20 is a diagram depicting a schematic configuration of a game apparatus according to Embodiment 10 of the present invention.

In FIG. 20, the game apparatus 800 has the optical disk apparatus 200 of Embodiment 6, an operation unit 801 for the user to input operation information, and a computing unit 802, such as a central processing unit (CPU) which performs computing based on the operation information input from the operation unit 801 and information read from the optical disk apparatus 200. The game apparatus 800 may include a display apparatus 803, such as a display for displaying information.

In Embodiment 10, the game apparatus 800 corresponds to an example of the information processing apparatus, and the computing unit 802 corresponds to an example of the information processing unit.

The game apparatus 800, which includes the optical disk apparatus 200 of Embodiment 6, can ideally record or reproduce information on or from the BD and the DVD, and therefore can be used for a wide range of applications. Furthermore the game apparatus 800 can also ideally record or reproduce information on or from the BD, the DVD and the CD respectively, and therefore can be used for an even wider range of applications.

The above mentioned embodiments mainly include the invention that has the following configurations.

An objective lens according to an aspect of the present invention is an objective lens for converging a laser beam emitted from a laser light source on an information recording surface of an information recording medium, including: a first area which has a diffraction structure which is formed on a surface on the laser light source side; a second area which has a diffraction structure which is formed outside the first area; and a third area which has a diffraction structure which is formed outside the second area; wherein the first area and the third area converge a laser beam having an order of diffraction with which diffraction efficiency is highest, out of laser beams having a wavelength $\lambda 1$ (390 nm $\leq \lambda 1 \leq$ 430 nm) which are diffracted by the first area and the third area, on an information recording surface of a first information recording medium having a light transmission layer with a thickness t1, and the first area and the second area converge a laser beam having an order of diffraction with which diffraction efficiency is highest, out of laser beams having a wavelength $\lambda 2$ (630 nm $\leq \lambda 2 \leq$ 680 nm) which are diffracted by the first area and the second area, on an information recording surface of a second information recording medium having a light transmission layer with a thickness t2, which is greater than the thickness t1, and the diffraction efficiency of the laser beam having the wavelength $\lambda 2$, which is diffracted by the second area and converges on the information recording surface of the second information recording medium, is greater than the diffraction efficiency of the laser beam having the wavelength $\lambda 1$, which is diffracted by the second area, and converges on the information recording surface of the first information recording medium.

According to this configuration, the objective lens has a first area which has a diffraction structure which is formed on the surface on the laser light source side, a second area which has a diffraction structure which is formed outside the first area, and a third area which has a diffraction structure which is formed outside the second area. The first area and the third area converge a laser beam having an order of diffraction with which diffraction efficiency is highest, out of laser beams having a wavelength $\lambda 1$ (390 nm $\leq \lambda 1 \leq$ 430 nm) which are diffracted by the first area and the third area on an information recording surface of a first information recording medium having a light transmission layer with a thickness t1. The first area and the second area converge a laser beam having an order of diffraction with which diffraction efficiency is highest, out of laser beams having a wavelength $\lambda 2$ (630 nm $\leq \lambda 2 \leq$ 680 nm) which are diffracted by the first area and the second area, is converted on an information recording surface of a second information recording medium having a light transmission layer with the thickness t2, which is greater than the thickness t1. The diffraction efficiency of the laser beam having the wavelength $\lambda 2$, which is diffracted by the second area and converges on the information recording surface of the second information recording medium, is greater than the diffraction efficiency of the laser beam having the wavelength $\lambda 1$ which is diffracted by the second area and converges on the information recording surface of the first information recording medium.

Therefore the diffraction efficiency of the laser beam having the wavelength $\lambda 2$, which is diffracted by the second area and converges on the information recording surface of the second information recording medium, is greater than the diffraction efficiency of the laser beam having the wavelength $\lambda 1$ which is diffracted by the second area and converges on the information recording surface of the first information recording medium, hence when information is recorded or reproduced on or from the second information recording medium, the intensity of the laser beam, which decreases as the distance from the optical axis increases, can be corrected by increasing the diffraction efficiency of the laser beam having the wavelength $\lambda 2$ which enters the objective lens, can be increased in an area near the edge of the objective lens, whereby the deterioration of the focal spot caused by a drop in the diffraction efficiency can be suppressed.

In this objective lens, it is preferable that the second area does not converge a laser beam having an order of diffraction with which diffraction efficiency is highest, out of the laser beams having the wavelength $\lambda 1$ which are diffracted by the second area, on the information recording surface of the first information recording medium, and converges a laser beam having an order of diffraction which is different from the order of diffraction with which diffraction efficiency is highest, out of the laser beams having the wavelength λ1 which are diffracted by the second area, on the information recording surface of the first information recording medium.

According to this configuration, the second area does not converge a laser beam having an order of diffraction with which diffraction efficiency is highest, out of the laser beams having the wavelength λ1 which are diffracted by the second area, on the information recording surface of the first information recording medium, and converges a laser beam having an order of diffraction which is different from the order of diffraction with which diffraction efficiency is highest, out of the laser beams having the wavelength λ1 which are diffracted by the second area, on the information recording surface of the first information recording medium.

Therefore the second area does not converge the laser beam having an order of diffraction with which diffraction efficiency is highest, out of the laser beams having the wavelength λ1 which are diffracted by the second area, on the information recording surface of the first information recording medium, and can converge the laser beam having an order of diffraction which is different from the order of diffraction with which diffraction efficiency is highest on the information recording surface of the first information recording medium, hence the laser beam having the wavelength λ2 can be diffracted with priority over the laser beam having the wavelength λ1.

In the objective lens, it is preferable that the diffraction structure of the first area and the diffraction structure of the second area have different step profiles from each other in cross section.

According to this configuration, the diffraction structure of the first area and the diffraction structure of the second area have a different step profile from each other in cross section, therefore in the second area, high light utilization efficiency is secured not only for the second information recording medium, but also for the first information recording medium.

In the objective lens, it is preferable that a polarity of the optical path difference generated by one step of the step difference of the step profile of the first area in cross section is different from a polarity of the optical path difference generated by one step of the step difference of the step profile of the second area in cross section.

According to this configuration, the polarity of the optical path difference generated by one step of the step difference of the step profile of the first area in cross section can be changed from the polarity of the optical path difference generated by one step of the step difference of the step profile of the second area in cross section.

In the objective lens, it is preferable that the diffraction structure of the first area has a first step profile in cross section, of which one cycle is three steps—four levels, and one step of step difference of the first step profile in cross section generates substantially a 1.25 wavelength optical path difference and power of a convex lens for the laser beam having the wavelength λ1, and generates substantially a 0.75 wavelength optical path difference and power of a concave lens for the laser beam having the wavelength λ2, and the diffraction structure of the second area has a second step profile in cross section, of which one cycle is three steps—four levels, and one step of step difference of the second step profile in cross section generates substantially a −0.25 wavelength optical path difference and power of a concave lens for the laser beam having the wavelength λ2, and generates substantially a −0.4 wavelength optical path difference and power of a convex lens for the laser beam having the wavelength λ1.

According to this configuration, the diffraction structure of the first area has a first step profile in cross section, of which one cycle is three steps—four levels. One step of a step difference in the first step profile in cross section generates substantially a 1.25 wavelength optical path difference and power of a convex lens for the laser beam having the wavelength λ1, and generates substantially a 0.75 wavelength optical path difference and power of a concave lens for the laser beam having the wavelength λ2. The diffraction structure of the second area has a second step profile in cross section, of which one cycle is three steps—four levels. One step of a step difference in the second step profile in cross section generates substantially a −0.25 wavelength of the optical path difference and power of a concave lens for the laser beam having the wavelength λ2, and generates substantially a −0.4 wavelength optical path difference and power of a convex lens for the laser beam having the wavelength λ1.

Therefore the first area and the second area generate power of a convex lens for the laser beam having the wavelength λ1, hence change of the focal position can be decreased. The first area and the second area also generates power of a concave lens for the laser beam having the wavelength λ2, hence the focal position of the second information recording medium can be kept away from the objective lens, and the working distance between the objective lens and the second information recording medium can be increased.

In the objective lens, it is preferable that a step difference amount d [µm] of one step of the step difference of the second step profile in cross section satisfies $0.25 \times \lambda 2/(n\lambda 2-1)/1000 \leq d \leq 0.5 \times \lambda 1/(n\lambda 1-1)/1000$, where nλ1 denotes a refractive index of the objective lens at the wavelength λ1, and nλ2 denotes a refractive index of the objective lens at the wavelength λ2.

According to this configuration, the step difference amount of the diffraction structure of the second area can be determined so as to be in the range between the step difference amount of the laser beam having the wavelength λ2 at the peak of the diffraction efficiency and the step difference amount of the laser beam having the wavelength λ1 at the peak of the diffraction efficiency.

In the objective lens, it is preferable that a step difference amount d [µm] of one step of the step difference of the second step profile in cross section satisfies $0.2 \times \lambda 2/(n\lambda 2-1)/1000 \leq d \leq 0.3 \times \lambda 2/(n\lambda 2-1)/1000$, where nλ2 denotes a refractive index of the objective lens at the wavelength λ2.

According to this configuration, the step difference amount of the diffraction structure of the second area can be determined based on the step difference amount of the laser beam having the wavelength λ2 at the peak of the diffraction efficiency.

In the objective lens, it is preferable that an average level of the diffraction structure in the step profile of the first area matches with an average level of the diffraction structure in the step profile of the second area.

According to this configuration, the average level of the diffraction structure in the step profile of the first area matches with the average level of the diffraction structure in the step profile of the second area, therefore even if the laser beam having the wavelength λ2 is shifted from the designed wavelength, the phase of the first area and the phase of the second area can be matched with each other in the boundary portion of the first area and the second area.

In the objective lens, it is preferable that the diffraction structure of the third area has a serrated profile in cross section, and generates a less than 0.5 wavelength optical path difference and power of a convex lens for the laser beam having the wavelength λ1.

According to this configuration, the third area generates power of a convex lens for the laser beam having the wavelength λ1, hence the laser beam having the wavelength λ1, which passes through the third area, can be converged on the information recording surface of the first information recording medium.

In the objective lens, it is preferable that the third area does not converge the laser beam having the wavelength λ2, which passes through the third area, on the information recording surface of the second information recording medium.

According to this configuration, the laser beam having the wavelength λ2, which passes through the third area, is not converged on the information recording surface of the second information recording medium, hence the third area can function as an aperture stop when information is recorded on or reproduced from the second information recording medium.

In the objective lens, it is preferable that an effective diameter D of the objective lens corresponding to a numerical aperture of the second information recording medium and an effective diameter Da of the first area satisfy $0.916 \cdot D \leq Da \leq 0.975 \cdot D$.

According to this configuration, the effective diameter Da of the first area is set to be in the above mentioned range, with respect to the effective diameter D of the objective lens corresponding to the numerical aperture of the second information recording medium, whereby the resolution of the first information recording medium and the resolution of the second information recording medium can be compatible.

In the objective lens, it is preferable that the diffraction structure of the first area has a step profile in cross section, and one step of step difference of the step profile of the first area in cross section generates substantially a 1.25 wavelength optical path difference and power of a convex lens for the laser beam having the wavelength λ1, and generates substantially a 0.75 wavelength optical path difference and power of a concave lens for the laser beam having the wavelength λ2.

According to this configuration, the diffraction structure of the first area has a step profile in cross section. One step of the step difference of the step profile of the first area in cross section generates substantially a 1.25 wavelength optical path difference and power of a convex lens for the laser beam having the wavelength λ1, and generates substantially a 0.75 wavelength optical path difference and power of a concave lens for the laser beam having the wavelength λ2.

Since the first area generates power of a convex lens for the laser beam having the wavelength λ1, the change of the focal position can be decreased, and since the first area generates power of a concave lens for the laser beam having the wavelength λ2, the focal position of the second information recording medium can be kept away from the objective lens, and the working distance between the objectives lens and the second information recording medium can be increased.

In the objective lens, it is preferable that the diffraction structure of the second area has a serrated profile in cross section, and generates a less than 0.5 wavelength optical path difference and power of a concave lens for the laser beam having the wavelength λ2.

According to this configuration, the second area generates power of a concave lens for the laser beam having the wavelength λ2, hence the focal position of the second information recording medium can be kept away from the objective lens, and the working distance between the objective lens and the second information recording medium can be increased.

In the objective lens, it is preferable that the diffraction structure of the third area has a serrated profile in cross section, and generates a less than 0.5 wavelength optical path difference and power of a convex lens for the laser beam having the wavelength λ1.

According to this configuration, the third area generates power of a convex lens for the laser beam having the wavelength λ1, hence the laser beam having the wavelength λ1, which transmits through the third area, can be converged on the information recording surface of the first information recording medium.

In the objective lens, it is preferable that an effective diameter D of the objective lens corresponding to a numerical aperture of the second information recording medium and an effective diameter Da of the first area satisfy $0.916 \cdot D \leq Da \leq 0.958 \leq D$.

According to this configuration, the effective diameter Da of the first area is set to be in the above mentioned range, with respect to the effective diameter D of the objective lens corresponding to the numerical aperture of the second information recording medium, whereby the resolution of the first information recording medium and the resolution of the second information recording medium can be compatible.

In the objective lens, it is preferable that an average level of the diffraction structure in the step profile of the first area matches with an average level of the diffraction structure in the serrated profile of the second area, and in a boundary between the first area and the second area, an end of one cycle of the diffraction structure in the step profile formed in the first area, and an inclined portion of the diffraction structure in the serrated profile formed in the second area are connected at the average level.

According to this configuration, the average level of the diffraction structure in the step profile of the first area matches with the average level of the diffraction structure in the serrated profile of the second area. And in the boundary of the first area and the second area, the end of one cycle of the diffraction structure in the step profile formed in the first area and the inclined portion of the diffraction structure in the serrated profile formed in the second area are connected at the average level.

Therefore the average level of the diffraction structure in the step profile of the first area matches with the average level of the diffraction structure in the serrated profile of the second area, hence even if the laser beam having the wavelength λ2 is shifted from the design wavelength, the phase of the first area and the phase of the second area can be matched with each other in the boundary portion between the first area and the second area.

In the objective lens, it is preferable that the objective lens further comprises: a fourth area which has a diffraction structure which is formed inside the first area; and a fifth area which has a diffraction structure which is formed inside the fourth area, wherein the first area, the third area and the fifth area converge a laser beam having an order of diffraction with which diffraction efficiency is highest, out of the laser beams having the wavelength λ1 which are diffracted by the first area, the third area and the fifth area, on the information recording surface of the first information recording medium, the first area, the second area and the fifth area converge a laser beam having an order of diffraction with which diffraction efficiency is highest, out of the laser beams having the wavelength λ2 which are diffracted by the first area, the second area and the fifth area, on the information recording surface of the second information recording medium, and the fourth area and the fifth area converge a laser beam having an order of diffraction with which diffraction efficiency is highest, out of the laser beams having a wavelength λ3 (750 nm≦λ3≦810 nm) which are diffracted by the fourth area and the fifth area, on the information recording surface of a third information recording medium having a light transmission layer with the thickness t3, which is greater than the thickness t2.

According to this configuration, the objective lens further has a fourth area which has a diffraction structure which is formed inside the first area, and a fifth area which has a diffraction structure which is formed inside the fourth area. The first area, the third area and the fifth area converge a laser beam having an order of diffraction with which diffraction efficiency is highest, out of the laser beams having the wavelength λ1 which are diffracted by the first area, the third area and the fifth area, on the information recording surface of the first information recording medium. The first area, the second area and the fifth area converge a laser beam having an order of diffraction with which diffraction efficiency is highest, out of the laser beams having the wavelength λ2 which are diffracted by the first area, the second area and the fifth area, on the information recording surface of the second information recording medium. The fourth area and the fifth area converge a laser beam having an order of diffraction with which diffraction efficiency is highest, out of the laser beams having the wavelength λ3 (750 nm≦λ3≦810 nm) which are diffracted by the fourth area and the fifth area, on the information recording surface of the third information recording medium having a light transmission layer with the thickness t3, which is greater than the thickness t2.

Therefore out of the laser beams having the wavelength λ1 which are diffracted by the fifth area, a laser beam having an order of diffraction with which diffraction efficiency is highest, is converged on the information recording surface of the first information recording medium, and out of the laser beams having the wavelength λ2 which are diffracted by the fifth area, a laser beam having an order of diffraction with which diffraction efficiency is highest, is converged on the information recording surface of the second information recording medium, therefore the fifth area can converge the laser beam having the wavelength λ1 and the laser beam having the wavelength λ2 on the first information recording medium and the second information recording medium. Out of the laser beams having the wavelength λ3 which are diffracted by the fourth area and the fifth area, a laser beam having an order of diffraction with which diffraction efficiency is highest, is converged on the information recording surface of the third information recording medium, therefore the fourth area and the fifth area can converge the laser beam having the wavelength λ3 on the third information recording medium.

In the objective lens, it is preferable that in the second area and the fourth area do not converge a laser beam having an order of diffraction with which diffraction efficiency is highest, out of the laser beams having the wavelength λ1 which are diffracted by the second area and the fourth area, on the information recording surface of the first information recording medium, and converge a laser beam having an order of diffraction which is different from the order of diffraction with which diffraction efficiency is highest, out of the laser beams having the wavelength λ1 which are diffracted by the second area and the fourth area, on the information recording surface of the first information recording medium.

According to this configuration, in the second area and the fourth area, a laser beam having an order of diffraction with which diffraction efficiency is highest, out of the laser beams having the wavelength λ1 which are diffracted by the second area and the fourth area, is not converged on the information recording surface of the first information recording medium, and a laser beam having an order of diffraction which is different from the order of diffraction with which diffraction efficiency is highest, out of the laser beams having the wavelength λ1 which are diffracted by the second area and the fourth area, is converged on the information recording surface of the first information recording medium.

Therefore the second area and the fourth area do not converge a laser beam having an order of diffraction with which diffraction efficiency is highest, out of the laser beams having the wavelength λ1 which are diffracted by the second area and the fourth area, on the information recording surface of the first information recording medium, and converge a laser beam having an order of diffraction which is different from the order of diffraction with which diffraction efficiency is highest, on the information recording surface of the first information recording medium, hence the laser beam having the wavelength λ2 or the wavelength λ3 can be diffracted with priority over the laser beam having the wavelength λ1.

In the objective lens, it is preferable that the fourth area does not converge a laser beam having an order of diffraction with which diffraction efficiency is highest, out of the laser beams having the wavelength λ2 which are diffracted by the fourth area, on the information recording surface of the second information recording medium, and converges a laser beam having an order of diffraction which is different from the order of diffraction with which diffraction efficiency is highest, out of the laser beams having the wavelength λ2 which are diffracted by the fourth area, on the information recording surface of the second information recording medium.

According to this configuration, the fourth area does not converge the laser beam having an order of diffraction with which diffraction efficiency is highest, out of the laser beams having the wavelength λ2 which are diffracted by the fourth area, on the information recording surface of the second information recording medium, and converges a laser beam having an order of diffraction which is different from the order of diffraction with which diffraction efficiency is highest, out of the laser beams having the wavelength λ2 which are diffracted by the fourth area, on the information recording surface of the second information recording medium.

Therefore the fourth area does not converge a laser beam having an order of diffraction with which diffraction efficiency is highest, out of the laser beams having the wavelength λ2 which are diffracted by the fourth area, on the information recording surface of the second information recording medium, and can converge a laser beam having an order of diffraction which is different from the order of diffraction with which diffraction efficiency is highest, on the information recording surface of the second information recording medium, hence the laser beam having the wavelength λ3 can be diffracted with priority over the laser beam having the wavelength λ2.

In the objective lens, it is preferable that the diffraction efficiency of the laser beam having the wavelength λ3, which is diffracted by the fourth area and converges on the information recording surface of the third information recording medium, is higher than the diffraction efficiency of the laser beam having the wavelength λ2, which is diffracted by the fourth area and converges on the information recording surface of the second information recording medium.

According to this configuration, the diffraction efficiency of the laser beam having the wavelength λ3, which is diffracted by the fourth area and converges on the information recording surface of the third information recording medium, is higher than the diffraction efficiency of the laser beam having the wavelength λ2 which is diffracted by the fourth area and converges on the information recording surface of the second information recording medium, therefore if the diffraction efficiency near the edge of the laser beam having the wavelength $\lambda 3$, which enters the objective lens, is increased when information is recorded on or reproduced from the third information recording medium, the intensity of the laser beam which decreases as the distance from the optical axis increases can be corrected, and deterioration of the focal spot caused by the drop in diffraction efficiency can be suppressed.

In the objective lens, it is preferable that the diffraction structure of the fifth area has a step profile in cross section, and one step of step difference in the step profile of the fifth area in cross section generates substantially a 1.25 wavelength optical path difference and power of a convex lens for the laser beam having the wavelength $\lambda 1$, generates substantially a 0.75 wavelength optical path difference and power of a concave lens for the laser beam having the wavelength $\lambda 2$, and generates substantially a 0.63 wavelength optical path difference and power of a concave lens for the laser beam having the wavelength $\lambda 3$.

According to this configuration, the fifth area generates power of a convex lens for the laser beam having the wavelength $\lambda 1$, hence change of the focal position can be decreased. The fifth area also generates power of a concave lens for the laser beam having the wavelength $\lambda 2$, hence the focal position of the second information recording medium can be kept away from the objective lens, and the working distance between the objective lens and the second information recording medium can be increased. The fifth area also generates power of a concave lens for the laser beam having the wavelength $\lambda 3$, hence the focal position of the third information recording medium can be kept away from the objective lens, and the working distance between the objective lens and the third information recording medium can be increased.

In the objective lens, it is preferable that the diffraction structure of the first area has a step profile in cross section, one step of step difference of the step profile of the first area in cross section generates substantially a 1.25 wavelength optical path difference and power of a convex lens for the laser beam having the wavelength $\lambda 1$, and generates substantially a 0.75 wavelength optical path difference and power of a concave lens for the laser beam having the wavelength $\lambda 2$.

According to this configuration, the first area generates power of a convex lens for the laser beam having the wavelength $\lambda 1$, hence change of the focal position can be decreased. The first area also generates power of a concave lens for the laser beam having the wavelength $\lambda 2$, hence the focal position of the second information recording medium can be kept away from the objective lens, and the working distance between the objective lens and the second information recording medium can be increased.

In the objective lens, it is preferable that the diffraction structure of the fourth area has a serrated profile in cross section, and generates a less than 0.5 wavelength optical path difference and power of a concave lens for the laser beam having the wavelength $\lambda 3$.

According to this configuration, the fourth area generates power of a concave lens for the laser beam having the wavelength $\lambda 3$, hence the focal position of the third information recording medium can be kept away from the objective lens, and the working distance between the objective lens and the third information recording medium can be increased.

In the objective lens, it is preferable that the diffraction structure of the second area has a serrated profile in cross section, and generates a less than 0.5 wavelength optical path difference and power of a concave lens for the laser beam having the wavelength $\lambda 2$.

According to this configuration, the second area generates power of a concave lens for the laser beam having the wavelength $\lambda 2$, hence the focal position of the second information recording medium can be kept away from the objective lens, and the working distance between the objective lens and the second information recording medium can be increased.

In the objective lens, it is preferable that the diffraction structure of the third area has a serrated profile in cross section, and generates a less than 0.5 wavelength optical path difference and power of a convex lens for the laser beam having a wavelength $\lambda 1$.

According to this configuration, the third area generates power of a convex lens for the laser beam having the wavelength $\lambda 1$, hence the laser beam having the wavelength $\lambda 1$, which passes through the third area, can be converged on the information recording surface of the first information recording medium.

In the objective lens, it is preferable that the third area does not converge the laser beam having the wavelength $\lambda 2$, which passes through the third area, on the information recording surface of the second information recording medium.

According to this configuration, the laser beam having the wavelength $\lambda 2$, which passes through the third area, is not converged on the information recording surface of the second information recording medium, hence the third area can function as an aperture stop when information is recorded on or reproduced from the second information recording medium.

In the objective lens, it is preferable that in the first area, the second area and the third area do not converge the laser beam having the wavelength $\lambda 3$, which passes through the first area, the second area and the third area, on the information recording surface of the third information recording medium.

According to this configuration, the laser beam having the wavelength $\lambda 3$, which passes through the first area, the second area and the third area, is not converged on the information recording surface of the third information recording medium, hence the first area, the second area and the third area can function as an aperture stop when information is recorded on or reproduced from the third information recording medium.

It is preferable that the objective lens further comprises a fourth area which has a diffraction structure which is formed inside the first area, wherein the first area, the third area and the fourth area converge a laser beam having an order of diffraction with which diffraction efficiency is highest, out of the laser beams having the wavelength $\lambda 1$ which are diffracted by the first area, the third area and the fourth area, on the information recording surface of the first information recording medium, the first area, the second area and the fourth area converge a laser beam having an order of diffraction with which diffraction efficiency is highest, out of the laser beams having the wavelength $\lambda 2$ which are diffracted by the first area, the second area and the fourth area, on the information recording surface of the second information recording medium, and the fourth area converges a laser beam having an order of diffraction with which diffraction efficiency is highest, out of the laser beams having a wavelength $\lambda 3$ (750 nm$\leqq \lambda 3 \leqq$810 nm) which are diffracted by the fourth area, on an information recording surface of a third information recording medium having a light transmission layer with the thickness t3, which is greater than the thickness t2.

According to this configuration, the objective lens further has a fourth area which has a diffraction structure which is formed inside the first area. The first area, the third area and the fourth area converge a laser beam having an order of diffraction with which diffraction efficiency is highest, out of the laser beam having the wavelength $\lambda 1$ which are diffracted by the first area, the third area and the fourth area, on the information recording surface of the first information recording medium. The first area, the second area and the fourth area converge a laser beam having an order of diffraction with which diffraction efficiency is highest, out of the laser beams having the wavelength λ2 which are diffracted by the first area, the second area and the fourth area, on the information recording surface of the second information recording medium. The fourth area converges a laser beam having an order of diffraction with which diffraction efficiency is highest, out of the laser beams having the wavelength λ3 (750≦λ3≦810 nm) which are diffracted by the fourth area, on the information recording surface of the third information recording medium having a light transmission layer with the thickness t3, which is greater than the thickness t2.

Therefore out of the laser beams having the wavelength λ1 which are diffracted by the fourth area, a laser beam having an order of diffraction with which diffraction efficiency is highest, is converged on the information recording surface of the first information recording medium, and out of the laser beams having the wavelength λ2 which are diffracted by the fourth area, a laser beam having an order of diffraction with which diffraction efficiency is highest, is converged on the information recording surface of the second information recording medium. Therefore the fourth area can converge the laser beam having the wavelength λ1 and the laser beam having the wavelength λ2 on the first information recording medium and the second information recording medium. Out of the laser beams having the wavelength λ3 which are diffracted by the fourth area, a laser beam having an order of diffraction with which diffraction efficiency is highest, is converged on the information recording surface of the third information recording medium, therefore the fourth area can converge the laser beam having the wavelength λ3 on the third information recording medium.

In the objective lens, it is preferable that the second area does not converge a laser beam having an order of diffraction with which diffraction efficiency is highest, out of the laser beams having the wavelength λ1 which are diffracted by the second area, on the information recording surface of the first information recording medium, and converges a laser beam having an order of diffraction which is different from the order of diffraction with which diffraction efficiency is highest, out of the laser beams having the wavelength λ1 which are diffracted by the second area, on the information recording surface of the first information recording medium.

According to this configuration, the second area does not converge a laser beam having an order of diffraction with which diffraction efficiency is highest, out of the laser beams having the wavelength λ1 which are diffracted by the second area, on the information recording surface of the first information recording medium, and can converge a laser beam having an order of diffraction which is different from the order of diffraction with which diffraction efficiency is highest, on the information recording surface of the first information recording medium, hence the laser beam having the wavelength λ2 can be diffracted with priority over the laser beam having the wavelength λ1.

In the objective lens, it is preferable that the diffraction structure of the fourth area has a step profile in cross section, and one step of step difference in the step profile of the fourth area in cross section generates substantially a 1.25 wavelength optical path difference and power of a convex lens for the laser beam having the wavelength λ1, generates substantially a 0.75 wavelength optical path difference and power of a concave lens for the laser beam having the wavelength λ2, and generates substantially a 0.63 wavelength optical path difference and power of a concave lens for the laser beam having the wavelength λ3.

According to this configuration, the fourth area generates power of a convex lens for the laser beam having the wavelength λ1, hence change of the focal position can be decreased. The fourth area also generates power of a concave lens for the laser beam having the wavelength λ2, hence the focal position of the second information recording medium can be kept away from the objective lens, and the working distance between the objective lens and the second information recording medium can be increased. The fourth area also generates power of a concave lens for the laser beam having the wavelength λ3, hence the focal position of the third information recording medium can be kept away from the objective lens, and the working distance between the objective lens and the third information recording medium can be increased.

In the objective lens, it is preferable that the diffraction structure of the first area has a step profile in cross section, and one step of step difference of the step profile of the first area in cross section generates substantially a 1.25 wavelength optical path difference and power of a convex lens for the laser beam having the wavelength λ1, and generates substantially a 0.75 wavelength optical path difference and power of a concave lens for the laser beam having the wavelength λ2.

According to this configuration, the first area generates power of a convex lens for the laser beam having the wavelength λ1, hence change of the focal position can be decreased. The first area also generates power of a concave lens for the laser beam having the wavelength λ2, hence the focal position of the second information recording medium can be kept away from the objective lens, and the working distance between the objective lens and the second information recording medium can be increased.

In the objective lens, it is preferable that the diffraction structure of the second area has a serrated profile in cross section, and generates a less than 0.5 wavelength optical path difference and power of a concave lens for the laser beam having the wavelength λ2.

According to this configuration, the second area generates power of a concave lens for the laser beam having the wavelength λ2, hence the focal position of the second information recording medium can be kept away from the objective lens, and the working distance between the objective lens and the second information recording medium can be increased.

In the objective lens, it is preferable that the diffraction structure of the third area has a serrated profile in cross section, and generates a less than 0.5 wavelength optical path difference and power of a convex lens for the laser beam having the wavelength λ1.

According to this configuration, the third area generates power of a convex lens for the laser beam having the wavelength λ1, hence the laser beam having the wavelength λ1, which passes through the third area, can be converged on the information recording surface of the first information recording medium.

In the objective lens, it is preferable that the third area does not converge the laser beam having the wavelength λ2, which passes through the third area, on the information recording surface of the second information recording medium.

According to this configuration, the laser beam having the wavelength λ2, which passes through the third area, is not converged on the information recording surface of the second information recording medium, hence the third area can function as an aperture stop when information is recorded on or reproduced from the second information recording medium.

In the objective lens, it is preferable that in the first area, the second area and the third area do not converge the laser beam having the wavelength λ3, which passes through the first area, the second area and the third area, on the information recording surface of the third information recording medium.

According to this configuration, the laser beam having the wavelength λ3, which passes through the first area, the second area and the third area, is not converged on the information recording surface of the third information recording medium, hence the first area, the second area and the third area can function as an aperture stop when information is recorded on or reproduced from the third information recording medium.

An optical head according to another aspect of the present invention has: a laser light source which emits a laser beam; an objective lens according to the above description, which converges the laser beam emitted from the laser light source on an information recording surface of an information recording medium; and a light receiving unit which receives the laser beam reflected by the information recording medium. According to this configuration, the above mentioned objective lens can be applied to the optical head.

An optical disk apparatus according to another aspect of the present invention comprises: the above mentioned optical head; a motor which rotates an information recording medium; and a control unit which controls the optical head and the motor. According to this configuration, the above mentioned optical head can be applied to the optical disk apparatus.

An information processing apparatus according to another aspect of the present invention comprises: the above mentioned optical disk apparatus, and an information processing unit which processes information recorded on the optical disk apparatus and/or information reproduced from the optical disk apparatus. According to this configuration, the above mentioned optical disk apparatus can be applied to the information processing apparatus.

Embodiments or examples described in "DESCRIPTION OF EMBODIMENTS" are merely for clarifying the technical contents of the present invention, and should not be for limiting the present invention only to those embodiments, but numerous modifications can be made without departing from the true spirit of the invention and scope of the Claims.

Industrial Applicability

According to the objective lens of the present invention, the second area is a priority area for the second information recording medium, and a diffraction structure optimized with the laser beam having the wavelength λ2 is formed in the second area, hence deterioration of the focal spot on the information recording surface of the second information recording medium can be suppressed. Furthermore the third area is a dedicated area for the first information recording medium, and a diffraction structure optimized with the laser beam having the wavelength λ1 is formed in the third area, hence deterioration of the focal spot on the information recording surface of the first information recording medium can also be suppressed. Since the margin for molding of the objective lens can be expanded, yield improves and the manufacturing cost can be decreased.

Therefore the objective lens according to the present invention is useful as an objective lens used for the optical head and optical disk apparatus for recording or reproducing information on or from such an information recording medium as an optical disk, and the information processing apparatus including this optical disk apparatus, such as a computer, optical disk player, optical disk recorder and game apparatus, can record or reproduce information on or from the BD or the DVD well, and can be applied to a wide range of application fields.

The invention claimed is:

1. An objective lens for converging a laser beam emitted from a laser light source on an information recording surface of an information recording medium,
  the objective lens comprising:
    a first area which has a diffraction structure which is formed on a surface on the laser light source side;
    a second area which has a diffraction structure which is formed outside the first area; and
    a third area which has a diffraction structure which is formed outside the second area, wherein
  the first area and the third area converge a laser beam having an order of diffraction with which diffraction efficiency is highest, out of laser beams having a wavelength λ1 (390 nm≦λ1≦430 nm) which are diffracted by the first area and the third area, on an information recording surface of a first information recording medium having a light transmission layer with a thickness t1, and
  the first area and the second area converge a laser beam having an order of diffraction with which diffraction efficiency is highest, out of laser beams having a wavelength λ2 (630 nm≦λ2≦680 nm) which are diffracted by the first area and the second area, on an information recording surface of a second information recording medium having a light transmission layer with the thickness t2, which is greater than the thickness t1,
  the diffraction efficiency of the laser beam having the wavelength λ2, which is diffracted by the second area and converges on the information recording surface of the second information recording medium, is greater than the diffraction efficiency of the laser beam having the wavelength λ1, which is diffracted by the second area, and converges on the information recording surface of the first information recording medium, and
  the second area does not converge a laser beam having an order of diffraction with which diffraction efficiency is highest, out of the laser beams having the wavelength λ1 which are diffracted by the second area, on the information recording surface of the first information recording medium, and converges a laser beam having an order of diffraction which is different from the order of diffraction with which diffraction efficiency is highest, out of the laser beams having the wavelength λ1 which are diffracted by the second area, on the information recording surface of the first information recording medium.

2. The objective lens according to claim 1, wherein the diffraction structure of the first area and the diffraction structure of the second area have different step profiles from each other in cross section.

3. The objective lens according to claim 2, wherein a polarity of the optical path difference generated by one step of the step difference of the step profile of the first area in cross section is different from a polarity of the optical path difference generated by one step of the step difference of the step profile of the second area in cross section.

4. The objective lens according to claim 2, wherein
  the diffraction structure of the first area has a first step profile in cross section, of which one cycle is three steps—four levels, and
  one step of step difference in the first step profile in cross section generates substantially a 1.25 wavelength optical path difference and power of a convex lens for the laser beam having the wavelength λ1, and generates substantially a 0.75 wavelength optical path difference and power of a concave lens for the laser beam having the wavelength λ2, and the diffraction structure of the second area has a second step profile in cross section, of which one cycle is three steps—four levels, and one step of step difference of the second step profile in cross section generates substantially a −0.25 wavelength optical path difference and power of a concave lens for the laser beam having the wavelength λ2, and generates substantially a −0.4 wavelength optical path difference and power of a convex lens for the laser beam having the wavelength λ1.

5. The objective lens according to claim 4, wherein a step difference amount d [μm] of one step of the step difference of the second step profile in cross section satisfies $0.25 \times \lambda 2/(n\lambda 2-1)/1000 \leq d \leq 0.5 \times \lambda 1/(n\lambda 1-1)/1000$, where nλ1 denotes a refractive index of the objective lens at the wavelength λ1, and nλ2 denotes a refractive index of the objective lens at the wavelength λ2.

6. The objective lens according to claim 4, wherein a step difference amount d [μm] of one step of the step difference of the second step profile in cross section satisfies $0.2 \times \lambda 2/(n\lambda 2-1)/1000 \leq d \leq 0.3 \times \lambda 2/(n\lambda 2-1)/1000$, where nλ2 denotes a refractive index of the objective lens at the wavelength λ2.

7. The objective lens according to claim 2, wherein an average level of the diffraction structure in the step profile of the first area matches with an average level of the diffraction structure in the step profile of the second area.

8. The objective lens according to claim 1, wherein the diffraction structure of the third area has a serrated profile in cross section, and generates a less than 0.5 wavelength optical path difference and power of a convex lens for the laser beam having the wavelength λ1.

9. The objective lens according to claim 1, wherein the third area does not converge the laser beam having the wavelength λ2, which passes through the third area, on the information recording surface of the second information recording medium.

10. The objective lens according to claim 1, wherein an effective diameter D of the objective lens corresponding to a numerical aperture of the second information recording medium and an effective diameter Da of the first area satisfy $0.916 \cdot D \leq Da \leq 0.975 \cdot D$.

11. The objective lens according to claim 1, wherein the diffraction structure of the first area has a step profile in cross section, and one step of step difference of the step profile of the first area in cross section generates substantially a 1.25 wavelength optical path difference and power of a convex lens for the laser beam having the wavelength λ1, and generates substantially a 0.75 wavelength optical path difference and power of a concave lens for the laser beam having the wavelength λ2.

12. The objective lens according to claim 11, wherein the diffraction structure of the second area has a serrated profile in cross section, and generates a less than 0.5 wavelength optical path difference and power of a concave lens for the laser beam having the wavelength λ2.

13. The objective lens according to claim 11, wherein the diffraction structure of the third area has a serrated profile in cross section, and generates a less than 0.5 wavelength optical path difference and power of a convex lens for the laser beam having the wavelength λ1.

14. The objective lens according to claim 1, wherein an effective diameter D of the objective lens corresponding to a numerical aperture of the second information recording medium and an effective diameter Da of the first area satisfy $0.916 \cdot D \leq Da \leq 0.958 \cdot D$.

15. The objective lens according to claim 12, wherein an average level of the diffraction structure in the step profile of the first area matches with an average level of the diffraction structure in the serrated profile of the second area, and in a boundary between the first area and the second area, an end of one cycle of the diffraction structure in the step profile formed in the first area and an inclined portion of the diffraction structure in the serrated profile formed in the second area are connected at the average level.

16. The objective lens according to claim 1, further comprising:

a fourth area which has a diffraction structure which is formed inside the first area; and a fifth area which has a diffraction structure which is formed inside the fourth area, wherein the first area, the third area and the fifth area converge a laser beam having an order of diffraction with which diffraction efficiency is highest, out of the laser beams having the wavelength λ1 which are diffracted by the first area, the third area and the fifth area, on the information recording surface of the first information recording medium, the first area, the second area and the fifth area converge a laser beam having an order of diffraction with which diffraction efficiency is highest, out of the laser beams having the wavelength λ2 which are diffracted by the first area, the second area and the fifth area, on the information recording surface of the second information recording medium, and the fourth area and the fifth area converge a laser beam having an order of diffraction with which diffraction efficiency is highest, out of the laser beams having a wavelength λ3 (750 nm≦λ3≦810 nm) which are diffracted by the fourth area and the fifth area, on the information recording surface of a third information recording medium having a light transmission layer having a thickness t3, which is greater than the thickness t2.

17. The objective lens according to claim 16, wherein the second area and the fourth area do not converge a laser beam having an order of diffraction with which diffraction efficiency is highest, out of the laser beams having the wavelength λ1 which are diffracted by the second area and the fourth area, on the information recording surface of the first information recording medium, and converge a laser beam having an order of diffraction which is different from the order of diffraction with which diffraction efficiency is highest, out of the laser beams having the wavelength λ1 which are diffracted by the second area and the fourth area, on the information recording surface of the first information recording medium.

18. The objective lens according to claim 16, wherein the fourth area does not converge a laser beam having an order of diffraction with which diffraction efficiency is highest, out of the laser beams having the wavelength λ2 which are diffracted by the fourth area, on the information recording surface of the second information recording medium, and converges a laser beam having an order of diffraction which is different from the order of diffraction with which diffraction efficiency is highest, out of the laser beams having the wavelength λ2 which are diffracted by the fourth area, on the information recording surface of the second information recording medium.

19. The objective lens according to claim 16, wherein
the diffraction efficiency of the laser beam having the wavelength $\lambda 3$, which is diffracted by the fourth area and converges on the information recording surface of the third information recording medium, is higher than the diffraction efficiency of the laser beam having the wavelength $\lambda 2$, which is diffracted by the fourth area and converges on the information recording surface of the second information recording medium.

20. The objective lens according to claim 16, wherein
the diffraction structure of the fifth area has a step profile in cross section, and
one step of step difference in the step profile of the fifth area in cross section generates substantially a 1.25 wavelength optical path difference and power of a convex lens for the laser beam having the wavelength $\lambda 1$, generates substantially a 0.75 wavelength optical path difference and power of a concave lens for the laser beam having the wavelength $\lambda 2$, and generates substantially a 0.63 wavelength optical path difference and power of a concave lens for the laser beam having the wavelength $\lambda 3$.

21. The objective lens according to claim 16, wherein
the diffraction structure of the first area has a step profile in cross section,
one step of step difference of the step profile of the first area in cross section generates substantially a 1.25 wavelength optical path difference and power of a convex lens for the laser beam having the wavelength $\lambda 1$, and generates substantially a 0.75 wavelength optical path difference and power of a concave lens for the laser beam having the wavelength $\lambda 2$.

22. The objective lens according to claim 16, wherein the diffraction structure of the fourth area has a serrated profile in cross section, and generates a less than 0.5 wavelength optical path difference and power of a concave lens for the laser beam having the wavelength $\lambda 3$.

23. The objective lens according to claim 16, wherein the diffraction structure of the second area has a serrated profile in cross section, and generates a less than 0.5 wavelength optical path difference and power of a concave lens for the laser beam having the wavelength $\lambda 2$.

24. The objective lens according to claim 16, wherein the diffraction structure of the third area has a serrated profile in cross section, and generates a less than 0.5 wavelength optical path difference and power of a convex lens for the laser beam having a wavelength $\lambda 1$.

25. The objective lens according to claim 16, wherein the third area does not converge the laser beam having the wavelength $\lambda 2$, which passes through the third area, on the information recording surface of the second information recording medium.

26. The objective lens according to claim 16, wherein the first area, the second area and the third area do not converge the laser beam having the wavelength $\lambda 3$, which passes through the first area, the second area and the third area, on the information recording surface of the third information recording medium.

27. The objective lens according to claim 1, further comprising a fourth area which has a diffraction structure which is formed inside the first area, wherein
the first area, the third area and the fourth area converge a laser beam having an order of diffraction with which diffraction efficiency is highest, out of the laser beams having the wavelength $\lambda 1$ which are diffracted by the first area, the third area and the fourth area, on the information recording surface of the first information recording medium,
the first area, the second area and the fourth area converge a laser beam having an order of diffraction with which diffraction efficiency is highest, out of the laser beams having the wavelength $\lambda 2$ which are diffracted by the first area, the second area and the fourth area, on the information recording surface of the second information recording medium, and
the fourth area converges a laser beam having an order of diffraction with which diffraction efficiency is highest, out of the laser beams having a wavelength $\lambda 3$ (750 nm$\leqq \lambda 3 \leqq$810 nm) which are diffracted by the fourth area, on an information recording surface of a third information recording medium having a light transmission layer with the thickness t3, which is greater than the thickness t2.

28. The objective lens according to claim 27, wherein
the second area does not converge a laser beam having an order of diffraction with which diffraction efficiency is highest, out of the laser beams having the wavelength $\lambda 1$ which are diffracted by the second area, on the information recording surface of the first information recording medium, and converges a laser beam having an order of diffraction which is different from the order of diffraction with which diffraction efficiency is highest, out of the laser beams having the wavelength $\lambda 1$ which are diffracted by the second area, on the information recording surface of the first information recording medium.

29. The objective lens according to claim 27, wherein
the diffraction structure of the fourth area has a step profile in cross section, and
one step of step difference in the step profile of the fourth area in cross section generates substantially a 1.25 wavelength optical path difference and power of a convex lens for the laser beam having the wavelength $\lambda 1$, generates substantially a 0.75 wavelength optical path difference and power of a concave lens for the laser beam having the wavelength $\lambda 2$, and generates substantially a 0.63 wavelength optical path difference and power of a concave lens for the laser beam having the wavelength $\lambda 3$.

30. The objective lens according to claim 27, wherein
the diffraction structure of the first area has a step profile in cross section, and
one step of step difference of the step profile of the first area in cross section generates substantially a 1.25 wavelength optical path difference and power of a convex lens for the laser beam having the wavelength $\lambda 1$, and generates substantially a 0.75 wavelength optical path difference and power of a concave lens for the laser beam having the wavelength $\lambda 2$.

31. The objective lens according to claim 27, wherein the diffraction structure of the second area has a serrated profile in cross section, and generates a less than 0.5 wavelength optical path difference and power of a concave lens for the laser beam having the wavelength $\lambda 2$.

32. The objective lens according to claim 27, wherein the diffraction structure of the third area has a serrated profile in cross section, and generates a less than 0.5 wavelength optical path difference and power of a convex lens for the laser beam having the wavelength $\lambda 1$.

33. The objective lens according to claim 27, wherein the third area does not converge the laser beam having the wavelength $\lambda 2$, which passes through the third area, on the information recording surface of the second information recording medium.

34. The objective lens according to claim 27, wherein the first area, the second area and the third area do not converge the laser beam having the wavelength $\lambda 3$, which passes through the first area, the second area and the third area, on the information recording surface of the third information recording medium.

35. An optical head, comprising:
a laser light source which emits a laser beam;
the objective lens according to claim 1, which converges the laser beam emitted from the laser light source on an information recording surface of an information recording medium; and
a light receiving unit which receives the laser beam reflected by the information recording medium.

36. An optical disk apparatus, comprising:
the optical head according to claim 35;
a motor which rotates an information recording medium; and
a control unit which controls the optical head and the motor.

37. An information processing apparatus, comprising:
the optical disk apparatus according to claim 36; and
an information processing unit which processes information recorded on the optical disk apparatus and/or information reproduced from the optical disk apparatus.

38. An objective lens for converging a laser beam emitted from a laser light source on an information recording surface of an information recording medium,
the objective lens comprising:
a first area which has a diffraction structure which is formed on a surface on the laser light source side;
a second area which has a diffraction structure which is formed outside the first area; and
a third area which has a diffraction structure which is formed outside the second area, wherein
the first area and the third area converge a laser beam having an order of diffraction with which diffraction efficiency is highest, out of laser beams having a wavelength $\lambda 1$ (390 nm$\leq\lambda 1\leq$430 nm) which are diffracted by the first area and the third area, on an information recording surface of a first information recording medium having a light transmission layer with a thickness t1, and
the first area and the second area converge a laser beam having an order of diffraction with which diffraction efficiency is highest, out of laser beams having a wavelength $\lambda 2$ (630 nm$\leq\lambda 2\leq$680 nm) which are diffracted by the first area and the second area, on an information recording surface of a second information recording medium having a light transmission layer with the thickness t2, which is greater than the thickness t1, and
the diffraction efficiency of the laser beam having the wavelength $\lambda 2$, which is diffracted by the second area and converges on the information recording surface of the second information recording medium, is greater than the diffraction efficiency of the laser beam having the wavelength $\lambda 1$, which is diffracted by the second area, and converges on the information recording surface of the first information recording medium, and
the diffraction structure of the first area and the diffraction structure of the second area have different step profiles from each other in cross section, and
a polarity of the optical path difference generated by one step of the step difference of the step profile of the first area in cross section is different from a polarity of the optical path difference generated by one step of the step difference of the step profile of the second area in cross section.

39. An objective lens for converging a laser beam emitted from a laser light source on an information recording surface of an information recording medium,
the objective lens comprising:
a first area which has a diffraction structure which is formed on a surface on the laser light source side;
a second area which has a diffraction structure which is formed outside the first area; and
a third area which has a diffraction structure which is formed outside the second area, wherein
the first area and the third area converge a laser beam having an order of diffraction with which diffraction efficiency is highest, out of laser beams having a wavelength $\lambda 1$ (390 nm$\leq\lambda 1\leq$430 nm) which are diffracted by the first area and the third area, on an information recording surface of a first information recording medium having a light transmission layer with a thickness t1, and
the first area and the second area converge a laser beam having an order of diffraction with which diffraction efficiency is highest, out of laser beams having a wavelength $\lambda 2$ (630 nm$\leq\lambda 2\leq$680 nm) which are diffracted by the first area and the second area, on an information recording surface of a second information recording medium having a light transmission layer with the thickness t2, which is greater than the thickness t1, and
the diffraction efficiency of the laser beam having the wavelength $\lambda 2$, which is diffracted by the second area and converges on the information recording surface of the second information recording medium, is greater than the diffraction efficiency of the laser beam having the wavelength $\lambda 1$, which is diffracted by the second area, and converges on the information recording surface of the first information recording medium, and
the diffraction structure of the third area has a serrated profile in cross section, and generates a less than 0.5 wavelength optical path difference and power of a convex lens for the laser beam having the wavelength $\lambda 1$.

40. An objective lens for converging a laser beam emitted from a laser light source on an information recording surface of an information recording medium,
the objective lens comprising:
a first area which has a diffraction structure which is formed on a surface on the laser light source side;
a second area which has a diffraction structure which is formed outside the first area; and
a third area which has a diffraction structure which is formed outside the second area, wherein
the first area and the third area converge a laser beam having an order of diffraction with which diffraction efficiency is highest, out of laser beams having a wavelength $\lambda 1$ (390 nm$\leq\lambda 1\leq$430 nm) which are diffracted by the first area and the third area, on an information recording surface of a first information recording medium having a light transmission layer with a thickness t1, and
the first area and the second area converge a laser beam having an order of diffraction with which diffraction efficiency is highest, out of laser beams having a wavelength $\lambda 2$ (630 nm$\leq\lambda 2\leq$680 nm) which are diffracted by the first area and the second area, on an information recording surface of a second information recording medium having a light transmission layer with the thickness t2, which is greater than the thickness t1, and the diffraction efficiency of the laser beam having the wavelength $\lambda 2$, which is diffracted by the second area and converges on the information recording surface of the second information recording medium, is greater than the diffraction efficiency of the laser beam having the wavelength $\lambda 1$, which is diffracted by the second area, and converges on the information recording surface of the first information recording medium, and the diffraction structure of the first area has a step profile in cross section, and one step of step difference of the step profile of the first area in cross section generates substantially a 1.25 wavelength optical path difference and power of a convex lens for the laser beam having the wavelength $\lambda 1$, and generates substantially a 0.75 wavelength optical path difference and power of a concave lens for the laser beam having the wavelength $\lambda 2$.

* * * * *